United States Patent [19]

Barnes et al.

[11] Patent Number: 4,829,554
[45] Date of Patent: May 9, 1989

[54] CELLULAR MOBILE TELEPHONE SYSTEM AND METHOD

[75] Inventors: Michael Barnes, Mendon; Kenneth L. Hagstrom, Fairport; David F. Hayes, Webster; George Helm, Fairport; Anthony Keane, Penfield; Roger Pawlowski; Christopher Percival, both of Rochester; Peter J. Poggi, Webster; Richard E. Rzepkowski; William Skiba, both of Rochester, all of N.Y.

[73] Assignee: Harris Corporation, Melbourne, Fla.

[21] Appl. No.: 697,067

[22] Filed: Jan. 31, 1985

[51] Int. Cl.$^4$ .............................................. H01Q 7/04
[52] U.S. Cl. ....................................... 379/58; 455/31; 379/63
[58] Field of Search ................ 179/2 E, 2 EA, 2 EB, 179/2 EC; 455/33, 8, 34, 12, 72, 31; 378/104, 93; 379/58, 63

[56] References Cited

U.S. PATENT DOCUMENTS

| | | | |
|---|---|---|---|
| 3,913,017 | 10/1975 | Imaseki | 455/33 |
| 4,352,955 | 10/1982 | Kai et al. | 179/2 EB |
| 4,430,755 | 2/1984 | Nadir et al. | 455/77 |
| 4,481,670 | 11/1984 | Freeburg | 455/33 |
| 4,488,486 | 11/1984 | Webb et al. | 455/33 |
| 4,562,572 | 12/1985 | Goldman et al. | 370/80 |
| 4,597,105 | 6/1986 | Freeburg | 455/33 |
| 4,599,490 | 7/1986 | Cornell et al. | 179/2 EB |
| 4,618,998 | 9/1983 | Kawamura | 455/77 |

OTHER PUBLICATIONS

Chadha et al, "Mobile Telephone Switching Office", *Bell System Technical Journal*, pp. 71, 74 and 80, 1/79.

*Primary Examiner*—Robert Lev
*Attorney, Agent, or Firm*—Rogers & Killeen

[57] ABSTRACT

A cellular mobile telephone system and method in which channel assignment and telephone call routing are controlled by a central control station and in which each communications channel is separately controlled at a cell station by a radio interface module ("RIM") associated therewith. Flexibility and security from operational interruptions is provided by dynamic assignment of identical RIMs to monitoring, paging, control and communication functions at the cell station. The system is modular and may be customized to accommodate geographic and demographic considerations, while permitting expansion and modification without obsolescence. The system also includes novel, self-diagnostic testing loops and methods. A novel mobile telephone is also disclosed.

55 Claims, 34 Drawing Sheets

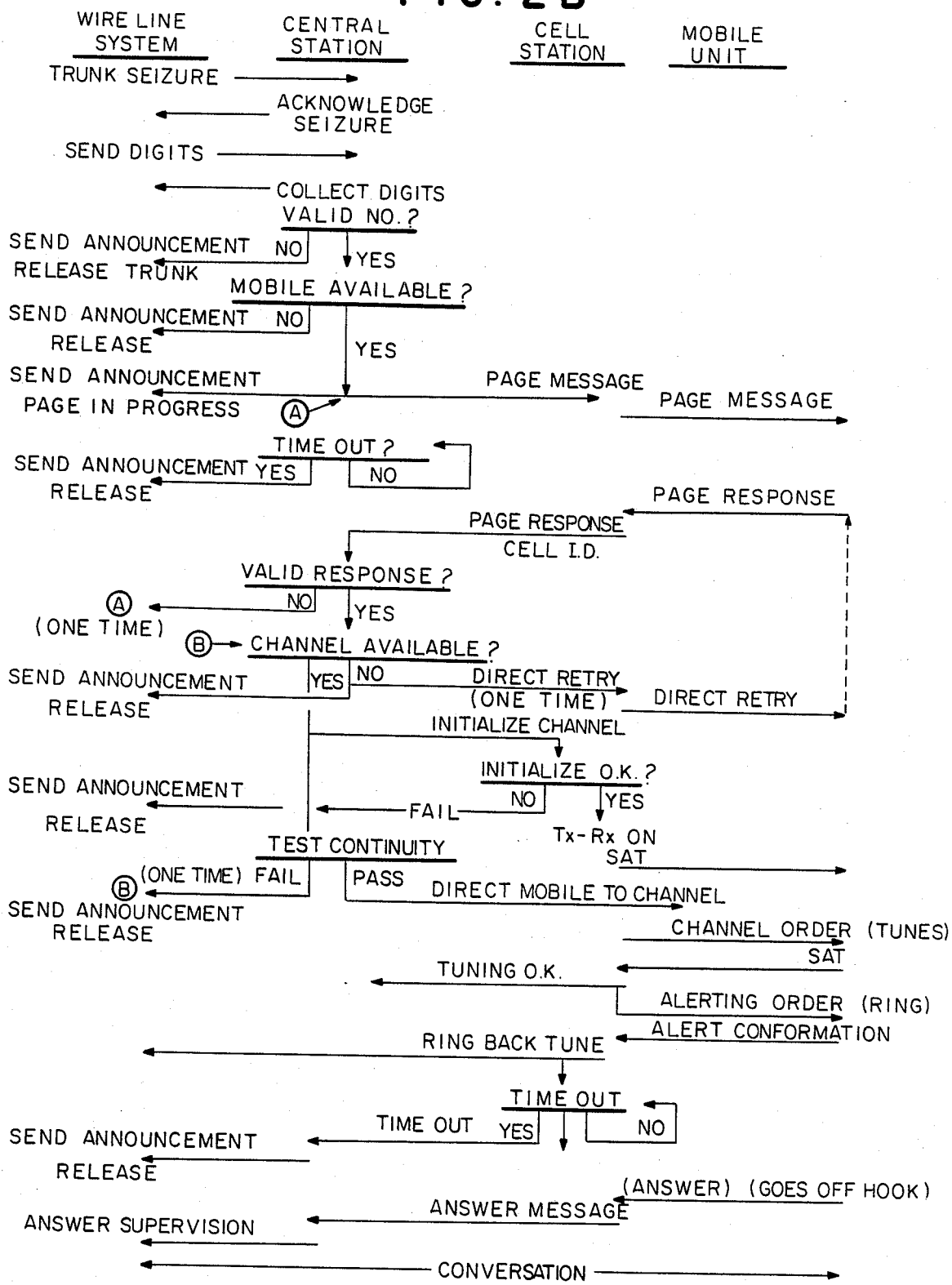

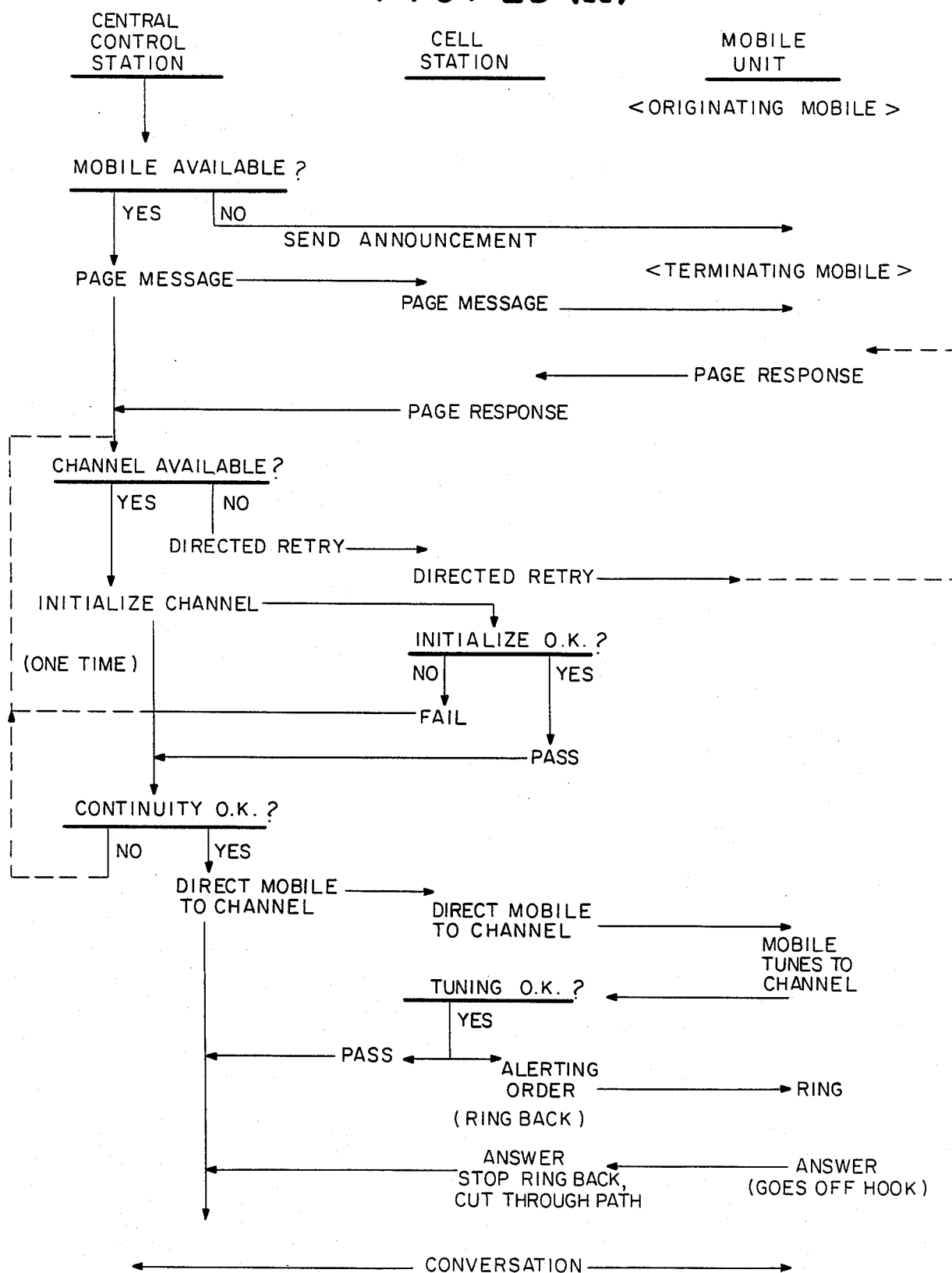

REDUNDANT COMMON CONTROL ARCHITECTURE

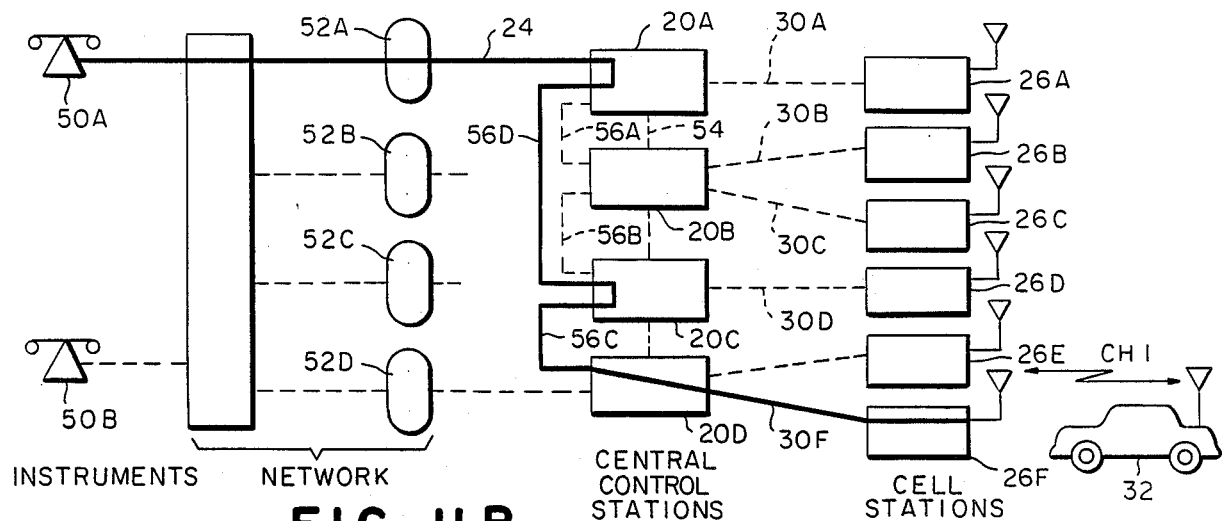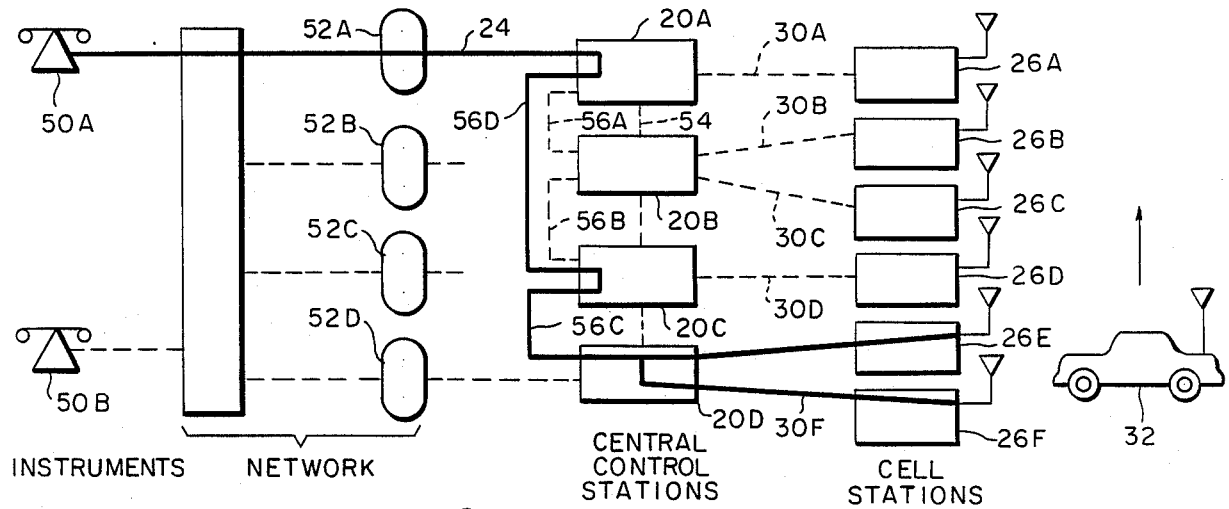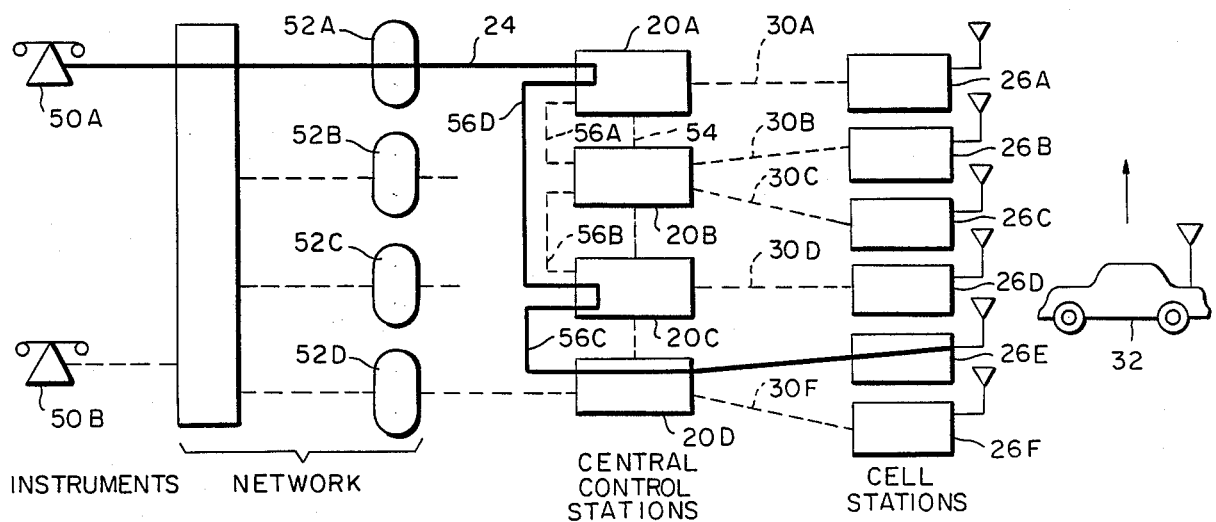

CELLULAR MOBILE TELEPHONE SYSTEM AND METHOD

BACKGROUND OF THE INVENTION

The present invention relates to a cellular mobile telephone system and method, and more particularly to a modular system in which the control functions are largely distributed to the cell stations associated with the individual cells or zones which comprise a service area.

Cellular mobile telephone systems are well known. Such systems use a plurality of cell stations for broadcasting paging signals to and maintaining voice communications with the mobile telephone units within the cell. Control of telephone call routing, channel assignment and the RF communications are typically controlled by a central control station.

The installation of such systems requires an initial installation of control and switching equipment at the central control station having the capacity anticipated for ultimate user saturation of the geographic area. The capital expenditures required for such equipment is often prohibitive where the initial number of subscribers cannot be expected to approach maximum anticipated user density.

An additional problem with generally known systems is the redundancy of the equipment at the central control station necessary to ensure continuous system operation in the event of malfunction, etc. Without duplication of this massive capacity and the accompanying expense, the danger of interrupted service is very real.

Another problem with some known systems is the need to connect the communication channels in all cells to a single central control station. For cells which are relatively distant from the central control station, the costs of such connections can be relatively high.

It is often of some importance that single component failures within a mobile telephone system not be permitted to cause loss of the entire system or a large portion thereof. One method of avoiding such a loss is to duplicate all elements of the system; however, the cost of entire sysetm duplication may be prohibitive.

Because service from a mobile telephone is usually not a necessity and sale of the service is often quite competitive, a mobile telephone system should seldomly be unavailable and unusable communication paths should be avoided. However, some known mobile telephone system have no or limited means to provide for the early detection of component failures and to isolate the failures to modules which can be readily replaced.

These and many other problems of generally known systems are obviated by the modular approach of the present invention and the distribution of many of the control funcitons from the central control station to the cell stations. Duplication of reduced capacity central control station equipment is financially feasible and the dynamic assignment of identical radio interface modules associated with each duplex radio channel for paging, monitoring and voice communication functions provides both security from interrupted service and significantly reduced costs.

More importantly, the modular approach of the present invention permits initial system operation with a capacity commensurate with the minimum number of subscribers expected, and infinite expansion to meet changing system requirements without obsolescence.

Additionally, the approach of the present invention provides for automated tests of various system components and additional tests which can be executed on demand to assist in isolating component failures. Selective duplication and cross-coupling of certain components reduces the impact of many types of component failures.

These and many other objects and advantages of the present invention will be apparent from the claims and from the detailed description of a preferred embodiment when read in conjunction with the appended drawings.

BRIEF DESCRIPTION OF THE DRAWINGS

FIGS 2A-2D are flow diagrams illustrating the operation of the system of FIG. 1;

FIGS. 11A-11I are a series of simplified functional block diagrams of an embodiment of a mobile telephone system according to the present invention illustrating the communication paths;

DETAILED DESCRIPTION OF A PREFERRED EMBODIMENT

A preferred embodiment of the method and apparatus of the present invention is set out below in accordance with the following table of contents.

TABLE OF CONTENTS

I. Basic System Description (FIGS. 1-3)
  A. Initialization of the Mobile Unit (FIGS. 1-2A)
  B. Call Placement to Mobile Unit (FIGS. 1-2B)
  C. Call Placement from Mobile Unit (FIGS. 1-2D)
  D. Call Maintenance During Zone Changes (FIGS. 1-3)
II. Central Control Station Description (FIGS. 4-14)
  A. Plural Central Control Station (FIGS. 7-8)
  B. Call Processing With Plural Central Control Stations (FIGS. 9-14)
III. Cell Station Description (FIGS. 15-21, 28-29)
IV. Mobile Unit Description (FIGS. 22-27)
V. Advantages and Scope of The Invention

I. BASIC SYSTEM DESCRIPTION

In accordance with the invention, telephone calls may be readily established between fixed units and mobile units, as well as between mobile units. As will become apparent from the following detailed description, the use of a modular design is advantageous in that a user need install only equipment having a capacity related to the present size of the desired system.

Figure 1:
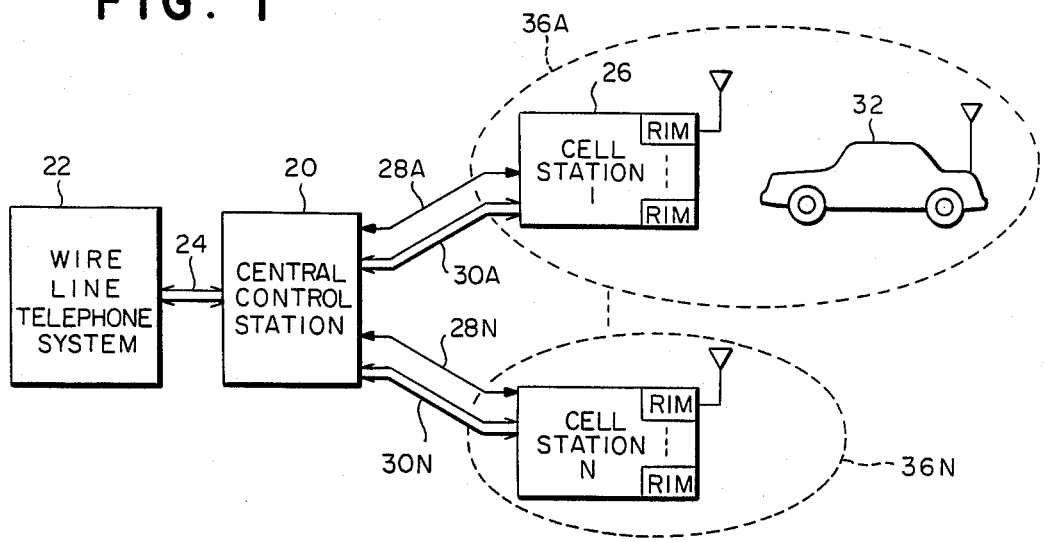
FIG. 1 is a functional block diagram of one embodiment of a mobile telephone system according to the present invention.

With reference to FIG. 1 wherein the basic mobile telephone system embodiment of the present invention is illustrated, a central control station 20 provides centralized, and yet distributed, control of the system. The central control station 20 may be accessed through any suitable telephone switching system, such as the illustrated commercially installed wire line telephone system 22. As will be described in detail hereinafter, another embodiment of the present invention utilizes plural control stations 20 and access between a central control station 20 and the wire line telephone system 22 may be provided to any or all central control stations 20 in those mobile systems employing more than one control station 20.

A plurality of trunk circuits 24 may selectively connect subscribers of the wire line telephone system 22 to the central control station 20 in a conventional manner through the exchange and switching network of the wire line telephone system 22. Additionally, private wire line telephone systems, other mobile telephone systems, and similar telephone switching system may be provided access to the central control station 20 by trunk or other similar voice circuits.

The central control station 20 is communicatively connected to one or more cell stations 26, generally remote from the central control station and typically spaced one in each zone of the mobile telephone service area. The connection between the central control station 20 and each cell station 26 includes a data line 28 and a plurality of voice circuits 30, with each voice circuit 30 comprising four-wire, two-wire or other suitable transmission lines. The data line 28 may be any transmission line suitable for the transmission of digital data and may be simply one of the voice circuits 30 which has been designated to serve as data line 28.

Telephone calls may be selectively placed between the wire line telephone system subscribers and mobile telephone units 32 through the central control station 20 and one of the cell stations 26. The central control station 20 provides some of the necessary supervisory and control functions in accordance with standard telephone protocols for communication with wire line telephone systems 22 and other mobile telephone systems. The control station 20 also assigns the routing of telephone calls to any of its cell stations 26, performs necessary switching functions to interconnect one or more of the trunk circuits 24 to one or more of the voice cicuits 30, and performs any desired statistical traffic data collection, message accounting and billing data collection functions.

Calls may be established between subscribers to the wire line telephone system 22 and one of the mobile units 32 located within a service area associated with one of the cell stations 26. Part of the voice path between the mobile unit 32 and the wire line subscriber includes communication through one of a plurality of radio communication channels assigned to the system. As is further described subsequently in greater detail, calls between fixed telephones of the wire line telephone system 22 and the mobile units 32 are routed through the central control station 20 and one of the cell stations 26, communicative, and perhaps geographically, proximate to the mobile unit 32. Similarly, calls between two mobile units may be routed through the two proximate cell stations 26 (possibley one if both mobiles are themselves proximate) to the central control station 20.

Each of the cell stations 26 includes the equipment required to serve several mobile units 32 simultaneously enaged in telephone calls, i.e., a plurality of transmitters and a plurality of receivers and other equipment under the control of a plurality of radio interface modules ("RIMs") 35.

As will hereinafter be described in greater detail, each cell station 26 is preferably assigned one or more radio communication channels on a non-interfering basis, since the areas served by the cell stations 26 preferably overlap. Each communication channel includes two distinct frequencies, one for communication to the mobile unit 32 and the other for communication from the mobile unit 32, so that two-way radio communication may be simultaneously carried on as in ordinary wire line telephone systems. Each mobile unit 32 preferably includes a single transmitter and single receiver (e.g., a transceiver), both of which may be tuned to the respective transmit and receive frequencies of the communication channels assigned to the system.

In a preferred embodiment of the invention, one or more of the communication channels assigned to a cell station 26 is designated as a control signal channel. Preferably the control signal channels are assigned on a non-interfering basis with the control signal channels of nearby cell stations 26.

The arrangement is such that each channel is controlled by a separate one of the RIM units 24 which are identical. However, the specific function served by the channel (i.e., controller, communications, locating) is determined by an instruction downloaded by the central control station 20 at the time the cell stations are activated for operation or in the case of fault at one of the channels wherein the function of one of the communication channels can be changed to that of a control channel or a locating channel as hereinafter is described.

As is subsequently described in detail, and as an example of signalling over the designated control signal channel, the mobile units may all search for signals being transmitted on all the channels designated as control signal channels. A call initiated to a mobile unit 26 over the wire line telephone system 22 is detected by the central station 20, and an identification of the mobile unit 32 being called sent to all of the cell stations 26 via the data link 28. The identification of the called mobile unit may then be broadcast in a paging signal by all of the cell stations 26 over the control signal channel assigned to each cell station 26.

If the called mobile unit 32 is correctly monitoring one of the control signal channels with the greatest received signal strength, the mobile unit 32 will detect its identification number in the paging signal, and transmit a message to a selected one of the cell stations 26 that it has received the paging signal. The mobile unit will also generate an audible or visual indication to the operator of the mobile unit that a call is waiting to be answered.

When the message that the paging signal was received by the mobile unit 32 is received at one of the cell stations 26, the central control station 20 is notified that the called mobile unit 32 has responded from a particular zone associated with the selected cell station 26. The central control station 20 may then select one of the communication channels assigned to the selected cell station 26 with which the mobile unit 32 is currently communicating, prepare that communication channel for the telephone call, interconnect the trunk circuit on which the wire line telephone subscriber has accessed the mobile telephone system with one of the voice circuits 30 to the selected cell station 26, and send a message to the mobile unit 32 to tune its transceiver to the selected communication channel for the completion of the voice path between the wire line telephone subscriber and the mobile unit 32.

Similarly, when a call is placed from a mobile unit 32 to a subscriber of the wire line telephone system 22, the call is initiated over the control signal channel of the cell station 26 which has been selected by the mobile unit 32 on the basis of received signal strength. The calling mobile unit 32 indicates that it desires to place a call and identifies the telephone number of the subscriber to be called. The selected cell station 26 may then notify the central control station 20 that the mobile unit 32 desires to place a telephone call to the identified subscriber on the wire line telephone system 22. The central control station may then perform appropriate signalling functions to select a particular communication channel, prepare that channel for transmission of the telephone call, notify the mobile unit 32 of the identify of the assigned channel so that the mobile unit may tune its transceiver, seize one of the trunk circuits 24, and notify the wire line telephone system that a call has been placed to one of its subscribers on the seized trunk circuit 24.

To facilitate a general understanding of the overall operation of the system, various functonal aspects of the system of FIG. 1 are described hereinafter in connection with the flow diagrams of FIGS. 2A–2D.

A. Initialization of the Mobile Unit

When a mobile unit first enters or is energized in a particular zone 36A of the service area associated with with a cell station 26A under the control of a central control station 20, the mobile unit 32 determines what type of cellular mobile telephone system is currently operating and communicates with the system to inform the system that the particular mobile unit 32 is ready to accept telephone calls.

Currently, Federal Communication Commision regulations permit two types of independent systems, designated as A and B systems, each having 333 comunication channels, 21 of which are assigned as control signal channels in each system. Periodically, each cell station 26A–26N transmits system messages on their respective control signal channels identifying the type of system, i.e., A or B, and certain system features. By monitoring these system messages, each mobile unit 32 is informed of the types and features of the available cellular mobile telephone systems.

Figure 2A:
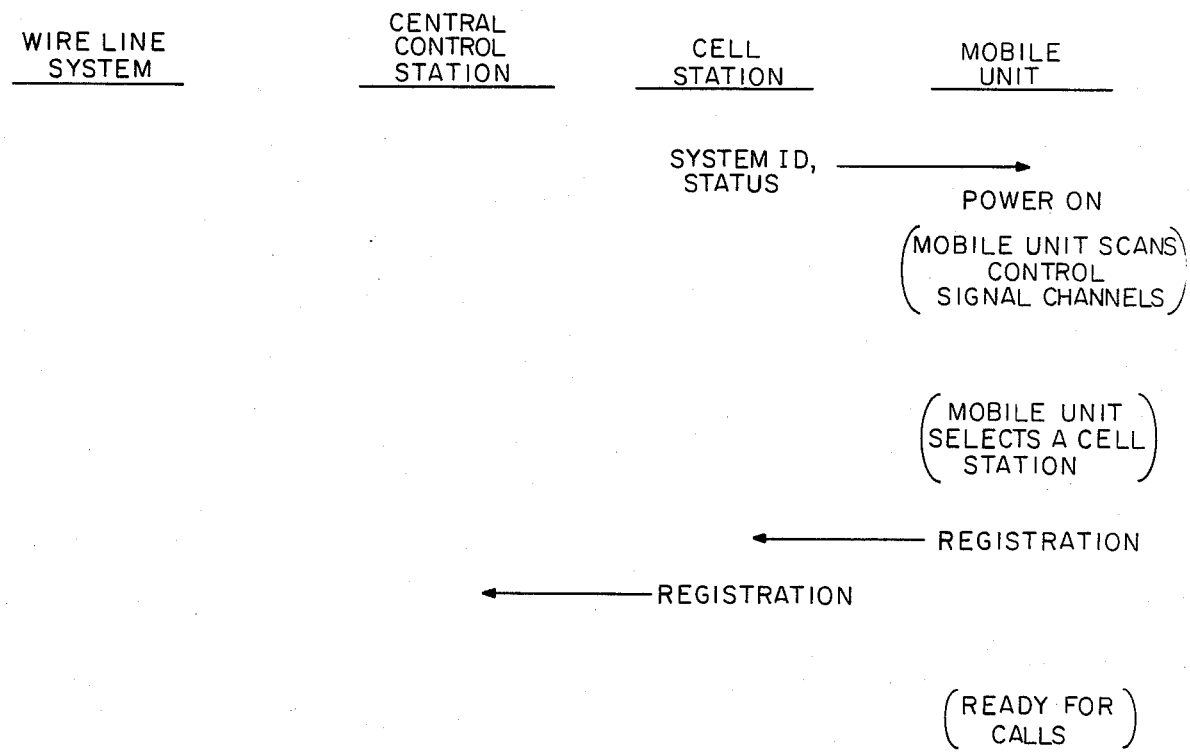

In the flow diagram of FIG. 2A the operation of one embodiment of the invention is illustrated. When a mobile unit 32 first enters or is energized in a particular zone 36A of the service area associated with a cell station 26A and a central control station 20. With continued reference to FIG. 1 and with reference to FIG. 2A, a mobile unit 32 first energized in a zone 36A of the service area will scan the set of control signal channels. The mobile unit 32 may be programmed to search the control signal channels of either, both, or a particular system type. The mobile unit 32 monitors the signals received on the central signal channel from each of the cell stations 26A–26N and measures the strength of the signal received, selecting the cell station 26A associated with the signal having the greatest measured strength and thereafter monitoring the control signal channel of the selected cell station 26A.

The control signal from the cell station contains, among other things, an identifier which uniquely identifies it. Having selected the cell station 26A, the mobile telephone unit transmits a registration signal on the control signal channel of the selected cell station 26A. This registration signal is relayed to the central control station 20 to indicate that the mobile unit 32 is "in service".

The "in service" signal received by the cell station 26A is sent by the cell station 26A to the central control station 20 by way of the data link 28. In this way, the central control station 20 is informed that the particular mobile unit 32 is available to receive telephone calls.

To ensure that the mobile unit 32 selects the cell station 26 providing the strongest control channel signal, each mobile unit 32, not involved in a telephone call; periodically rescans and remeasures the strength of the control signal channels and thus monitors the control channel of the cell station 26 selected on the basis of the most recent signal strength measurements. Additionally, the mobile units 32 rescans the control signal channels and reselect the cell station 26 immediately prior to answering a call and initiating a call.

B. Call Placement to the Mobile Units

Once the mobile unit 32 has selected a cell station, the mobile unit is ready to place and receive calls.

FIG. 2B illustrates a call initiated from a wire line telephone system subscriber to a mobile unit 32. With reference to FIG. 1 and FIG. 2B, the central control station 20 will receive a signal via one of the trunk circuits 24 that a call has been placed to a particular mobile unit 32. The identification of the mobile unit 32 may be verified by the central control station 20 against a previously stored set of valid and current mobile units and against a list of mobile units which are currently "in service" (after the registration signalling described above in connection with FIG. 2A). If the called mobile unit 32 is not valid or the called called mobile unit is not in service, a "not in service" announcement may be returned to the calling party and the call terminated. Similarly, if the called mobile unit 32 is valid and "in service", but is currently already involved in a telephone call and is not marked for "call waiting" service described hereinafter, the central control station 20 may return a "busy" signal announcement to the calling party and terminate the call.

After it has been determined that the called mobile unit is valid, is "in service" and is not busy on another call, the central control unit 20 sends a message to each of its cell stations 26A–26N via the data links 28A–28N commanding that the called mobile unit be paged. Because the central control station 20 does not monitor the location of all "in service" mobile units 32, the "page" command is sent to all cell stations 26A–26N.

Upon receipt of the "page" command, each cell station 26A–26N fomats a paging message for the called mobile unit 32 and transmits the paging message on its control signal channel.

Upon receipt of a paging message directed to it on the control signal channel which it is monitoring, the called mobile unit 32 sends a page response message via the control signal channel associated with its selected cell station 26A. The page response message is detected by the selected cell station 26A and forwarded to the central control station 20 via the data link 28A. The selected cell station 26A ascertains that the page response message is directed to it because the message was broadcast on its control signal channel and contains the unique identifying code associated with that cell station 26A.

If no page response message is received by any cell station 26A–26N and forwarded to the central control station 20 within a predetermined period of time, the cell station 26 may repeat the page command. Repetition of the page message reduces the likelihood that a page message will be unanswered by an available mobile unit 32 because of transient conditions such as atmospheric interference affecting the radio transmission. Because the sending of a page message and the return of a page response message may take many second to complete, the central control station 20 may send a "paging in progress" announcement or similar signal to the calling party via the trunk circuit 24.

If no page response is received within a predetermined time period from the transmisson of a page message and the page message has been repeated, the central control station 20 may send a "not available—try later" announcement or similar signal to the calling party and terminate the call.

When a "page response" is received by the central control station 20, the control station 20 validates that the message came from a valid mobile unit 32 and internally stores an indication of the identification of the selected cell station 26A in which the page response message was received.

If the page response message indicates that the message came from a mobile unit 32 which is not currently valid, or if two or more mobiles respond to a page message as the result of a fraudulent mobile unit or a transmission error, the central control station 20 will deny service to the mobile units, may generate an alarm signal, and may restart the paging process.

When a page response message is received by the central control station 20, the control station 20 selects an idle communication channel at the selected cell station 26A and directs the selected cell station 26A to initialize the selected communication channel.

While the selected cell station 26A is initializing the selected voice channel as explained hereinafter, the central control station 20 selectes one of the voice circuits 30A between the central control station 20 and the selected cell station 26A and tests the voice circuit for continuity between the two stations. The continuity check is important because heretofore in the establishment of the telephone call, communications between the central control station 20 and the selected cell station 26A have been via the data line 28A and thus there is no assurance that the selected voice circuit 30A is ready for voice communication.

If the continuity test of the voice circuit 30A fails, another voice circuit may be selected and tested until all circuits have been selected or are in use.

The central control station 20 may select from among the voice circuits 30A and the communication channels based upon varing strategies such as selection of circuit/channel that has been idle the longest, selection from a subset of the circuits/channels in some or all of the stations 26A–26N which are reserved for priority calls or calls with special handling, e.g., voice security equipment, or selection from a subset of circuits/channels which are used only as a last resort, i.e., circuits/channels on which interference problems may be caused. If no voice circuit or communication channel is available, the central control station 20 may send a "not available—try later" announcement or similar signal to the calling party.

Once the continuity of the selected voice circuit has been verified, the central control station 20 sends a message to the mobile unit 32 via the selected cell station 26A directing the mobile unit to retune its transceiver to the selected communication channel and establish an initial power setting for the transmitter of the mobile unit 32.

The selected cell station 26A sends a message to the mobile unit 32 via the control signal channel instructing the mobile unit 32 to tune to the selected communication channel. Meanwhile, the selected cell station 26A energizes its transceiver associated with the selected communication channel and transmits a SAT signal via the communication channel to the mobile unit 32. The SAT signal preferably is an out-of-band signal, i.e., not imbedded within the band of voice frequencies of 300 to 3400 hertz, and is thus not audible to the calling party.

The mobile unit 32 confirms receipt of the retuning order by tuning its transceiver to the selected communication channel, receiving the out-of-band, SAT signal sent by the cell station 26A on that channel, and transpoinding the out-of-band SAT signal back to the selected cell station 26A. The selected cell station 26A detects retuning of the mobile unit 32 to the selected communication channel by detecting the transponded out-of-band SAT signal on the selected communication channel.

When the selected cell station 26A detects that the transponded signal is correct, it notifies the central control station 20 that the mobile unit 32 has tuned to the selected communication channel. The central control station 20 then interconnects the trunk circuit 24 from which the call originated to the selected one of the voice circuits 30A, completing the voice path from the called party to the selected cell station 26A.

After it has reported that the mobile unit 32 has tuned to the selected communication channel, the selected cell station 26A sends an alerting signal to the mobile unit 32 via the selected communication channel. When the mobile unit 32 receives the alerting signal, it acknowledges the signal by sending a second out-of-band signal to the selected cell station 26A. Upon receipt of the alerting signal acknowledgement, the selected cell station 26A begins to send a "ring-back" signal to the calling party via the voice channel which has already been established by the central control station 20 between the calling party and the selected cell station 26A.

If the alerting signal is not acknowledged within a predetermined period, the selected cell station 26A may repeat the alerting signal as often as desired. If no acknowledgement of the repeated alerting signal is received by the selected cell station 26A, the cell station 26 sends a meassage to the central control station 20 indicating that the mobile unit is not responding. The central control station 20, upon receipt of the no response message from the cell station 26A, sends a "not available" announcement or similar signal to the calling party, deactivates the selected voice circuit 30A and terminates the telephone call.

Upon receipt of the alerting signal, the mobile unit 32 provides an audible or visual indication to the driver of the mobile that a telephone call is waiting, i.e., the mobile unit begins to "ring". The mobile unit 32 continues to transmit the second out-of-band tone to the selected cell station 26A until the handset of the mobile unit is removed from the cradle, i.e., the telephone is "answered" by going "off hook."

The cessation of the second out-of-band signal is detected by the selected cell station 26A and indicates that the telephone has been "answered". Thereupon, the selected cell station 26A can immediately cease transmission of ring-back tone to the calling party and interconnect the selected voice circuit 30A to the selected communication channel, thereby completing the voice path between the mobile unit 32 and the wire line telephone system subscriber.

Because the ring-back tone is being provided by the cell station 26A and the voice path prior to the call being answered is complete from the calling party to the selected cell station 26A, the voice path between the mobile unit and the wire line subscriber can be completed quickly upon the answering of the mobile unit 32. The cessation of the ring-back signal and the through communication path do not have to await intra-system communication delays found in some other mobile telephone systems where ring-back tone and/or final communication path cut-through is performed by a central control unit.

When the selected cell station 26A detects the answering of the mobile unit 32, it sends a message via the data line 28A to the central control station 20 indicating that the call has been answered. The central control station 20 may, in turn, send an "answer" signal to the wire line telephone system 22, if desired.

If the mobile unit 32 is not answered within a predetermined time period, the selected cell station 26A sends a message to the central control station 20 indicating that the ringing signal has timed out. In response, the central control station 20 sends a "not available" announcement or similar signal to the calling party, releases the voice circuit 30A, and terminates the call.

When the call is completed, the central control station 20 may generate a record of the call for billing and history record purposes by saving certain parameters such as the called party's identification, the calling party's identification, the time of the call, duration of the call, resources utilized, etc.

C. Call Placement From Mobile Units

Figure 2C:
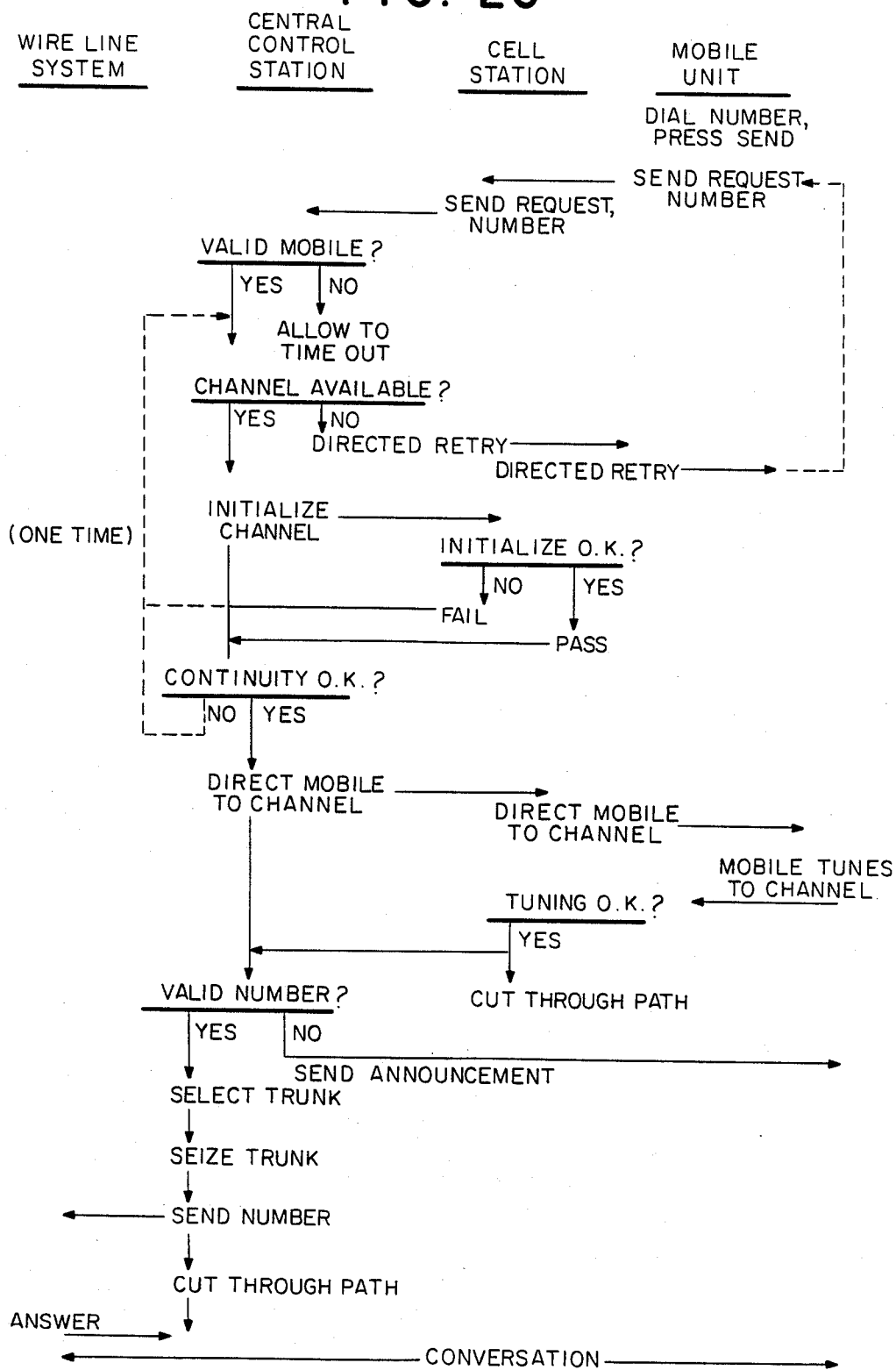
Figure 2D:
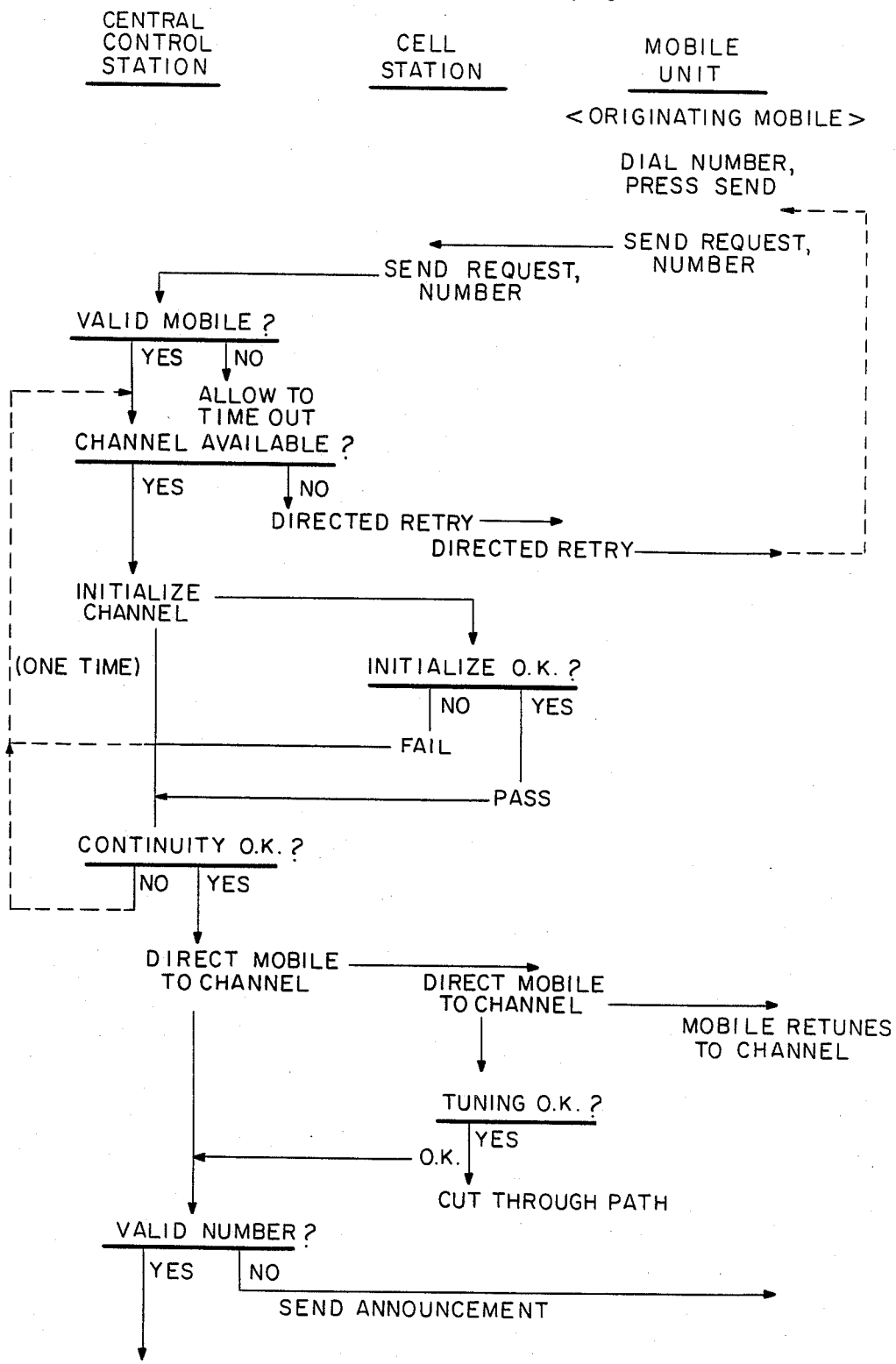

A mobile unit 32 may initiate a telephone call, i.e., transmit a request for service, as illustrated in the flow diagram of FIG. 2C. Referring now to FIG. 2C and to FIG. 1, it will be remembered that mobile unit 32 has previously selected one of the cell stations 26A based upon the relative strength of the control signal channels.

A mobile unit subscriber may indicate that he wishes to place a telephone call affecting the mobile unit in accordance with a predetermined protocol which identifies the called party. One of the ways of accomplishing this protocol in a mobile unit of the preferred embodiment is to dial the digits of the telephone number of the called party followed by activation of a SEND button on a handset 38 of the mobile unit 32. The subscriber need not remove the handset from its cradle in a mobile unit, i.e., need not go "off hook". Upon receipt of the identification of the called party and the SEND command, the mobile unit formats and transmits an origination message on the control signal channel associated with its selected cell station 26A informing the selected cell station 26A that the subscriber wishes to originate a telephone call to the identified called party. The selected cell station 26A, upon receipt of the origination message, measures the power of the signal received from the mobile unit 32 and relays the origination message to the central control station 20.

The central control station 20 verifies that the calling mobile unit 32 is valid and authorized to make telephone calls in this cellular mobile telephone system, and that the telephone number of the called party has a valid format for a wire line telephone system subscriber. If these validity tests are passed, the central control station 20 assigns an idle communication channel associated with the selected cell station 26A to the call. As heretofore described in association with call placement to mobile units, the central control station 20 selects one of the voice circuits 30A associated with the selected cell station 26A, verifies the continuity of the speech path over the selected one of the voice circuits 30A and sends a message to the selected cell station 26A identifying the selected communication channel and voice circuit 30A.

The selected cell station 26A initializes the selected communication channel, transmits a SAT signal on the channel, and sends a channel direct message via its control signal channel to the mobile unit 32, instructing the mobile unit to tune to the selected communication channel. Mobile unit 32 tunes its transceiver to the selected communication channel and transponds the out-of-band SAT signal being transmitted by the selected cell station 26A. When the selected cell station 26A detects the transponded out-of-band SAT signal, the cell station 26A interconnects the select communication channel with the selected voice circuit 30A, and notifies the central control station 20 that the voice path from the central control station 20 to the mobile unit 32 has been established.

Concurrently with the establishment of the voice path between the mobile unit 32 and the central control station 20, the control station 20 completes the telephone call to the wireline telephone system 22. In particular, the central control station 20 seizes one of the idel trunk circuits 24 to the wire line telephone system 22 and transmits signals identifying the telephone number of the called party on the seized trunk circuit 24. The selection of a particular trunk circuit for seizure can be made based on a set of selection criteria, such as even distribution of utilization, priority of use, and/or least cost routing. For example, some of the trunk circuits 24 may connect to a local public telephone exchange and others of the trunk circuits 24 may connect to a private long distance carrier. Under these circumstances, the central control station 20 may choose to route all local calls on one of the trunk circuits connected to the local public telephone exchange and all toll or long distance calls on one of the trunk circuits connected to the private long distance carrier.

Once the dialing signals have been transmitted on the selected trunk circuit by the central control station 20, the selected trunk circuit 24 and the selected voice circuit 30A are interconnected by the central control station 20, thus providing a voice path from the mobile unit to the wire line telephone system 22. At this point, all call progress tones and messages are provided by the wire line telephone system 22 and the call proceeds in a fashion customary to wire line telephone systems.

When the telephone call is answered by the called party, the wire line telephone system 22 typically provides a signal to the central control station 20 indicating that the call has been "answered." Upon receipt of the answer signal, the central control station 20 may update its billing and administrative records to show the start of the conversation stage of the call.

If a voice channel 30A is not available to the selected cell station 26A at the time of the request by the mobile unit 32 to place a telephone call, the central control station 20 may send a "directed retry" signal to the mobile unit 32 via the selected cell station 26A, directing the mobile unit 32 to select another cell station 26. The mobile unit 32 can then rescan the signal strength on each of the control signal channels of the cell stations 26B–26N and select the cell station 26 having the next strongest signal. In most instances, the mobile unit 32 will select a cell station 26B geographically adjacent to the first selected cell station 26A. The telephone call and its voice path connections can then be made through the second selected cell station 26B.

Prior to transmitting the "directed retry" signal, the central cell station 20 may first determine that a communication channel is available in an adjacent cell station 26. If no communication channels are available in the first selected cell station 26 or adjacent cell stations 26, the central control station 20 may send a message to the mobile unit 32 informing it that the available channels are all busy and terminate the call.

Normally, telephone calls be terminated when either the called or calling party goes "on hook" or otherwise indicates to its telephone system that the call is to be terminated. If the terminating party is the party on the wire line telephone system 22, the system 22 may provide an indication to the central control station 20 that the call has terminated. The control station 20 closes out the billing record of the call, idles the selected trunk circuit 24 and voice circuit 30A involved in the call, and notifies the selected cell station 26. The selected cell station 26 idles the transceiver on the selected communication channel and notifies the mobile unit 32 that the call has been terminated.

If the mobile unit 32 is the first party to terminate the call by either going "on hook" or otherwise indicating to the selected cell station 26A that the call is terminated, the cell station 26A notifies the central control station 20 and the control station 20, in turn, notifies the wire line telephone system 22 that the call has been terminated. The central control station 20 and cell station 26A idle the trunk circuit 24, voice circuit 30A and transceiver on the selected communication channel involved in the now-terminated call.

The call processing heretofore described applies not only when one of the parties to the telephone call is a wire line telephone system subscriber but also when both parties are mobile units 32 within the cellular mobile telephone system. With reference to FIG. 1 and to FIG. 2D, the originating portion of the telephone call, proceeds as described above for call placement from mobile units. It is at that point in the "call placement from mobile unit" call processing that the central control station 20 seizes a trunk circuit 24 and dials the telephone number of the called party on the wireline telephone system 22. In a case of a mobile-to-mobile call, the central control station 20 performs for the called mobile the same functions described above in relation to a call placed to a mobile from a wire line telephone system subscriber.

D. Call Maintenance During Zone Changes

In accordance with the invention, provision is made for maintaining service to a mobile unit 32 which moves from one zone 36A associated with a cell station 26A to a zone associated with a second cell station 26N while engaged in a telephone call.

With continued reference to FIG. 1, and with reference also to FIG. 3 where a first embodiment of the call maintenance technique according to the present invention is functionally illustrated, the strength of the signal received from a mobile unit 32 engaged in a call is monitored by the cell station 26A through which the call is established and reported to the central control station 20 in the form of periodically reoccurring digital signals indicative of the instantaneous signal strength of the radio frequency signal. Likewise, cell stations 26B and 26C in zones geographically adjacent to the zone 36A may also periodically monitor the signal received from the mobile unit 32 and report the strength of the signal to the central control station 20. By comparison of the relative strengths of the received signals from the various cell stations 26A, 26B, and 26C, the central control station 20 can determine when a mobile unit 32 engaged in a call is about to leave one zone 36A for another zone and to identify the zone 36B into which the mobile unit 32 is entering. Based upon the received signal strength reports, the geographic relationship of the cell stations, and the current utilization of the voice channel circuits 30 in each cell station 26, among other factors, the central control station 20 may determine when a switchover or handoof from the first cell station 26A to a second cell station 26B is desired.

Figure 3A:
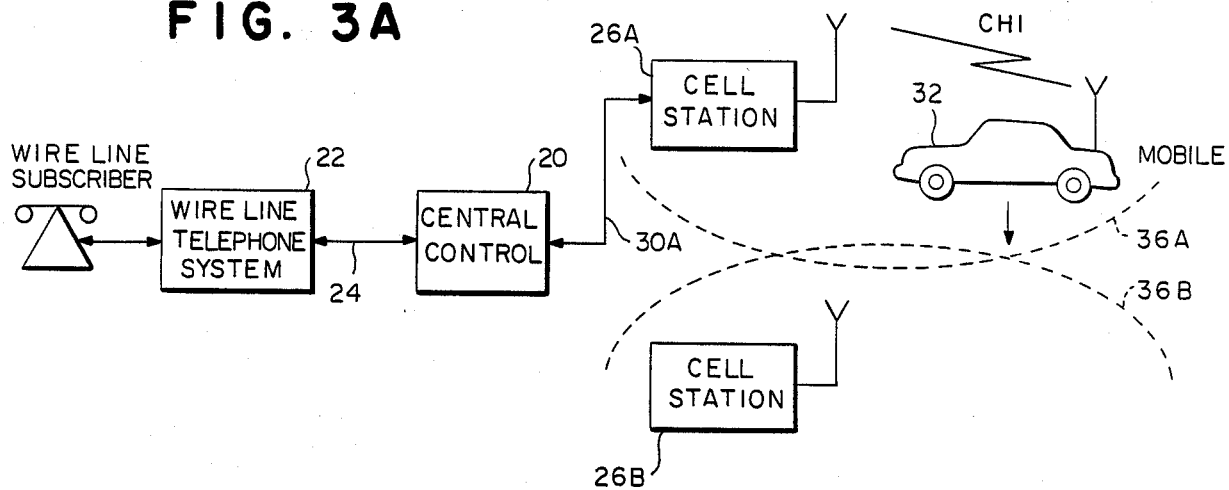
FIGS. 3A-3C are diagrammatic illustrations of the operation of the system of FIG. 1.

With reference to FIG. 3A, an established telephone call is depicted between a wire line subscriber and a mobile unit 32 using a moble telephone system of FIG. 1. A voice path has been established from a wire line subscriber through the wire line telephone system 22 to the central control station 20 of the mobile telephone system, and through one of the voice circuits 30A to the first cell station 26A for transmission via a communication channel CH1 to the mobile unit 32. As the call continues, the first cell station 26A continuously monitors and all adjacent cell stations, e.g., including cell station 26B, periodically monitor the strength of the signal being transmitted by the mobile unit 32 on the first communication channel CH1 and report the strength to the central control station 20. Since the mobile unit 32 is travelling toward the adjacent cell station 26B, there comes a time when the central control station 20 determines that the mobile unit 32 is leaving the first zone 36A and is moving into an adjacent zone 36B and that it would be advantageous to continue the telephone call through the adjacent cell station 26B, controlling the adjacent zone 36B.

Figure 3B:
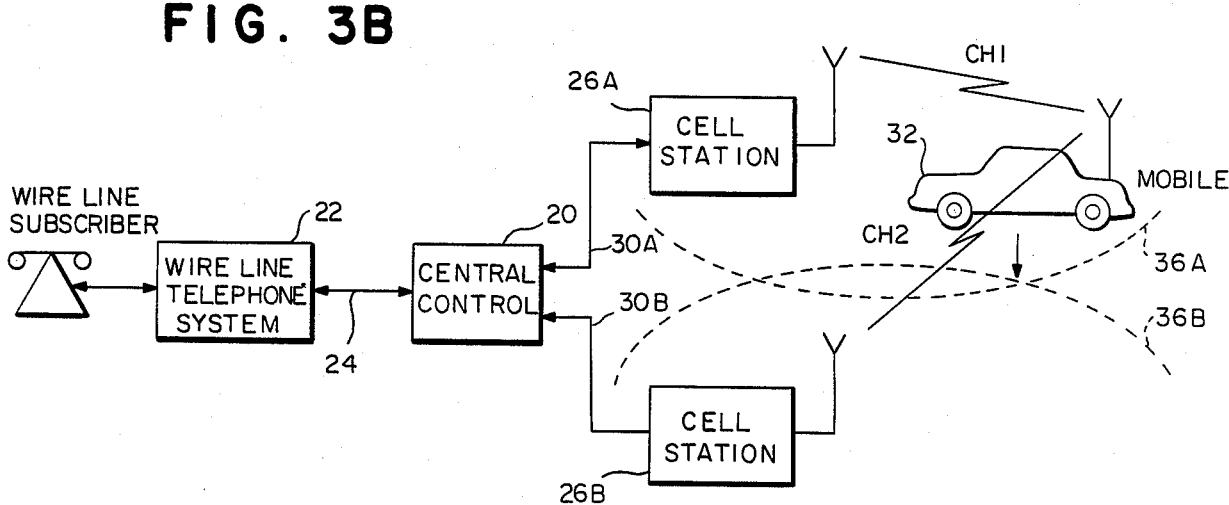

With reference to FIG. 3B, the central control station 20 implements the changeover or handoff from the first cell station 26A to the adjacent cell station 26B by selecting an idle voice circuit 30B between the central control station 20 and the adjacent cell station 26B and selects an available communication channel CH2 at the adjacent cell station 26B. As described above in relation to establishing an incoming telephone call to a mobile unit, the central control station 20 verifies the continuity of the second voice circuit 30B and commands and adjacent cell station 26B to initialize the second communication channel CH2 (the "handoff" channel).

Once the handoff channel has been initialized and its continuity verified, the central control station 20 removes the direct interconnection between the trunk circuit 24 and the first voice circuit 30A and reconnects the call using one of its conference bridges 40 by tying the trunk circuit 24 and the first voice circuit 30A to two of the ports of the conference bridge.

The conference bridges are elecommunication bridging devices having at least three ports which can be commonly tied together. Because the disconnection and reconnection of the call is accomplished by the central control station 20 through the use of electronic switches, only a minor, minimally noticeable interruption in the voice path occurs during switching.

To the third port of the conference bridge 40, the central control station ties the second voice circuit 30B, i.e., the voice circuit to the adjacent cell station 26B. Since the mobile unit 32 has not tuned to the handoff channel CH2, the transceiver at the adjacent cell station 26B will receive only noise or weak signals from distant cell stations utilizing the same channel frequencies as the handoff channel. To prevent the noise received on the handoff channel CH2 from interferring with the ongoing conversation, the adjacent cell station 26B may mute the voice circuit 30B.

Once the call has been established on the conference bridge 40, the central control station 20 sends a handoff message to the mobile unit 32 through the first cell station 26A, instructing the mobile unit 32 to tune its transceiver to the handoff channel CH2. In response, the mobile unit 32 retunes its transceiver to a handoff channel, and the conversation continues with only a small, nearly undetectable interruption during the time intereval that the mobile unit 32 was retuning.

Figure 3C:
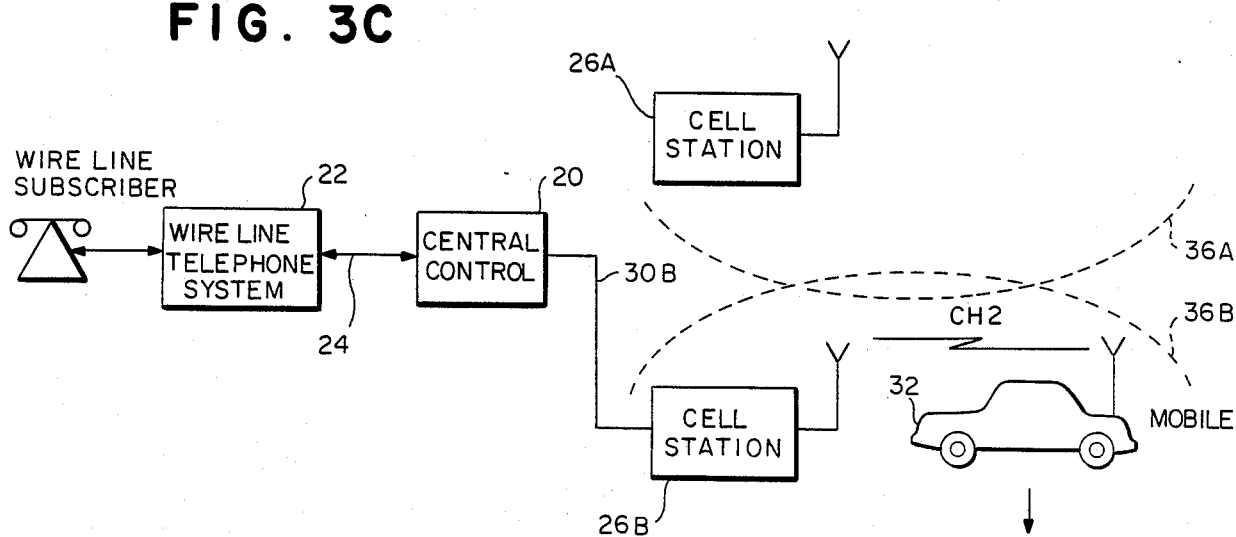

The adjacent cell station 26B monitors the received signal on the handoff channel CH2 and when the adjacent cell station 26B detects the signal from the mobile unit 32, the adjacent cell station 26B removes the "silence" from the voice circuit 30B and notifies the central control station 20. The central control station forms a new communication path by directly tying the trunk circuit 24 to the second voice circuit 30B, idles the conference bridge 40, idles the first voice circuit 30A and directs the first cell station 26A to idle the transceiver on the first communication channel CH1. After the handoff is complete, the communication path illustrated in the mobile system of FIG. 3C is established.

Should the mobile unit 32 continue to travel through the system, repeated handoffs from one cell station 26 to another may occur, with the transferee cell station becoming an original cell station once the handoff procedure is complete.

The conference call technique of establishing telephone switching prior to switching the radio chennels significantly reduces the detectable switching time because the RF switching time is significantly less than the telephone switching time.

II. Central Control Station Description

Figure 4:
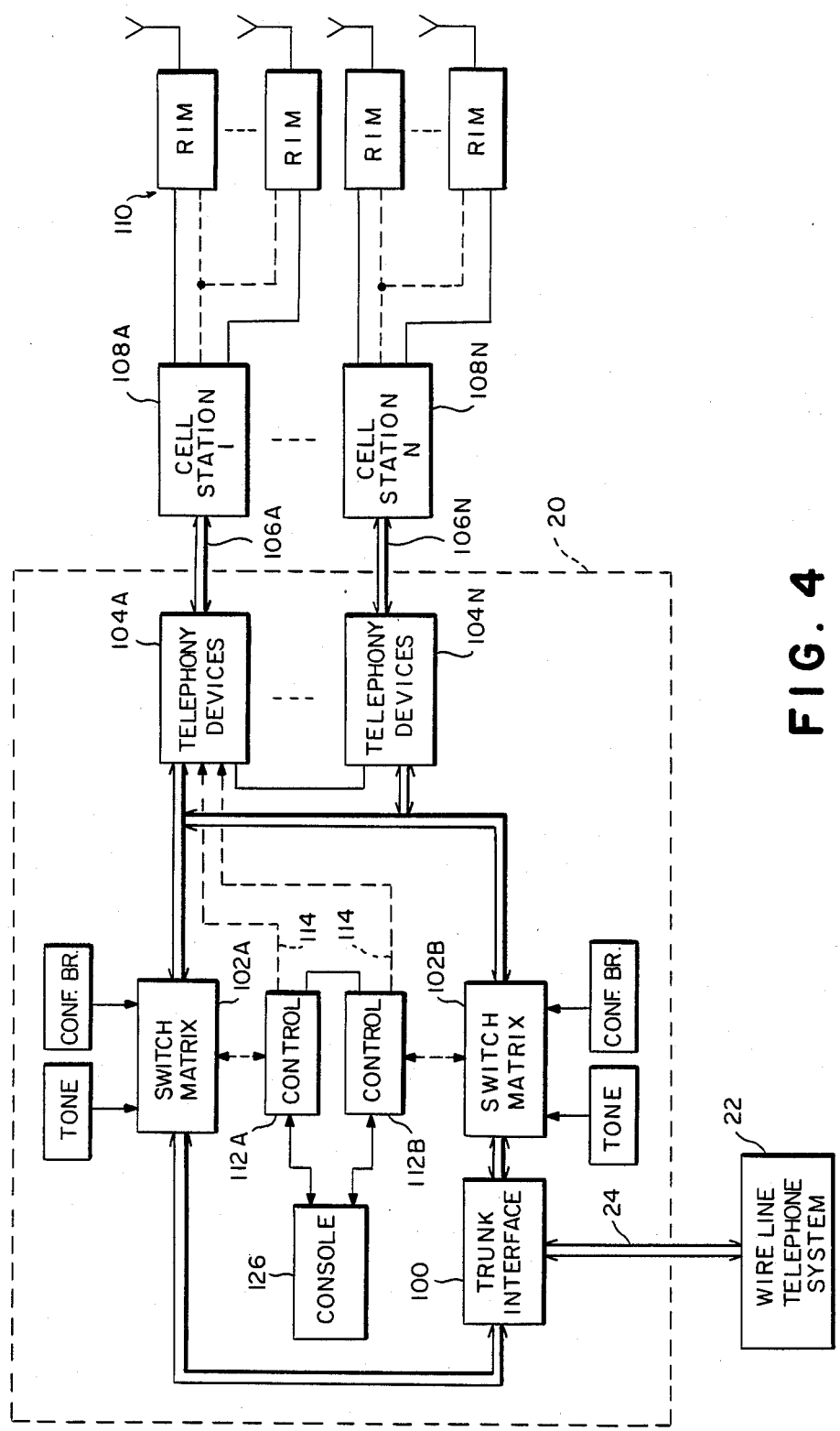
FIG. 4 is a functional block diagram of one embodiment of the central control station of FIG. 1.

The central control station 20 of FIG. 1 is illustrated in greater detail in the functional block diagram of FIG. 4.

Referring now to FIG. 4, each of the trunk circuits 24 from the wireline telephone system 22 of FIG. 1 may be connected through a conventional trunk interface module 100 to the fully redundant central control station 20. The central control station 20 provides the switching functions required for operation of the mobile telephone system and for interfacing the mobile cellular system to other telephone systems and networks.

The elements of the central control statio 20 are redundant to reduce the possibility of a single failure causing loss of the entire cellular mobile telephone system. The central control station 20 is designed as two independent control halves, each half of which is capable of controlling the entire central control station and the cellular mobile telephone system. Only one-half of the central control station 20 is active at any given time; the other half may operate in a hot standby mode, i.e., energized and receiving data, so that it is ready to assume active control of the system at any time. Any common control subsystem failure in the elements of the central control station 20 will cause a transfer of control from the active to the inactive control half. During the transfer to control, all interconnections already in a stable state are retained in that state.

The trunk circuits 24 are connected to the central control station through the trunk interface module 100. The trunk circuits 24 are then provided to redundant switch matrices 102A, 102B. The switch matrices 102A, 102B are conventional voice communication circuit switching matrices. The switch matrices 102A, 102B are also connected to plural sets of telephony devices 104A, 104N. The telephony devices 104A, 104N each provide a plurality of voice circuits 106A, 106N to remotely located cell stations 108A, 108N. Each voice circuit 106A–106N is connected to a radio interface module (RIM) 110 at the cell stations 108A–108N. Each RIM 110 controls a radio transceiver which can broadcast to and receive signals from the radio transceivers located in mobile units.

With continued reference to FIG. 4, overall control of the central control station 20 is provided by redundant control circuits 112A, 112B. The control circuits 112 control the operation of the switch matrices 102A, 102B and the telephone devices 104A–104N. Additionally, the control circuits 112 communicate through a data line or lines 114 to each RIM 110. One or more data line 114 are connected from the control circuit 112 through the telephony devices 104A–104N to a cell station 108A–108N and are bussed to each RIM. Thus, there is a separate voice path from each RIM 110 to a telephony device 104A–104N and a control path, using the data lines 114, bussed to each RIM 110 from each control circuit 112A, 112B to each RIM 110.

Figure 5:
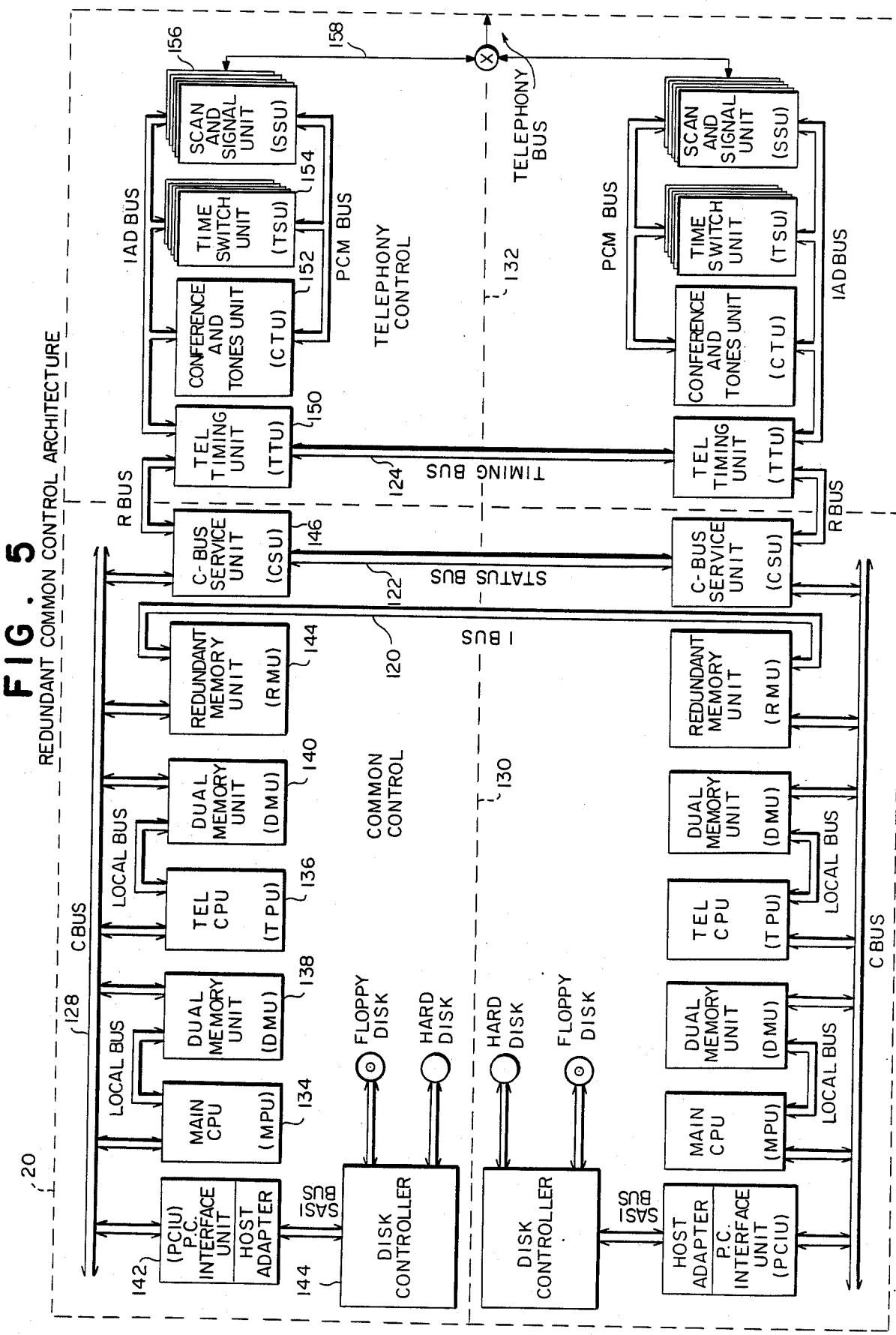
FIG. 5 is a functional block diagram of one embodiment of the redundant control unit of FIG. 4.

The operation of the central control station 20 may be more clearly understood with reference both to FIG. 4 and to FIG. 5. The redundant equipment of the central control station 20 is connected by three cross-coupled data busses, an IBUS 120, a STATUS BUS 122, and a TIMING BUS 124. The IBUS 120 provides a path by which pertinent data may be passed between the redundant halves of the central control statio 20. The STATUS BUS provides a means of switchover control and current information pertaining to the functional state of either redundant half of the central control station 20. The TIMING BUS 124 provides synchronization control between the redundant halves so that in the case of switchover timing of other critical functions would be maintained.

A console 126 may be connected to each of the redundant control circuits 112 equipments. If the console 126 should fail, the central control station can continue to operate. Since the console 126 is connected to both control circuits 112A, 112B, no switchover mechanism or circuitry is required for the console 126.

As shown in FIG. 5, the central control station 20 consists of two functional complexes, i.e.;
   a common control complex that provides the system control processors, a switching matrix, and control logic;
   a telephone interface complex which provides trunk circuit and data link interface functions.

The telephone interface complex includes a plurality of telephony devices each connected to a trunk circuit, voice circuit or data link for providing electrical interface between the trunk and voice circuits, data links and the central control station 20. The telephony devices are connected to a telephony bus 158 which forms a composite signal so that the other components of the central control station 20 are presented with a standard signal appearing on the telephony bus 158.

With continued reference to FIG. 5, there are two major groups of common control equipment in the common control complex: the common control group 130 and the telephony controller group 132.

The common control group 130 includes two central processors 134, 136 and associated random access memory units, 138, 140, a peripheral interface 142, a redundant memory unit 144, and a CBUS service unit 146 which provides a gateway to the telephony controller group 132. The central processors 134, 136 are a microcomputer based, single board computer comprising a common control group. The two central processor 134, 136 in the group work together under the control of a multi-task operating system. Each central processor 134, 136 is tied by a dedicated local bus to its associated memory units 138, 140. The memory units 138, 140 may also be accessed by other components within the common control group by use of the CBUS 128. The memory units 138, 140 are used primarily for program storage and interprocessor communication.

Each end of the redundant control halves contains a redundant memory unit 144 which has access to the CBUS 128. The purpose of the redundant memory unit 144 is to provide both a cross-coupled data base mailbox communication between the redundant halves of the central control station 20. There is one redundant memory unit 144 per half of the station. Each redundant memory unit 144 is coupled to the other side through a private bus identified as the IBUS 120. Either half of the system may write to both redundant memory units 144 and thereby pass messages and share common data.

The common control group 120 also includes a disk drive subsystem 144 which may be accessed by the central processors 134, 136 through the CBUS 128 and the peripheral interface 142. The disk drive subsystem is used by the central control station for program and data storage.

The CBUS service unit 146 provides circuitry for arbitration of priority disputes between the various units communicating on the CBUS 128. Additionally, the CBUS service unit 146 contains data regarding the status of its half of the central control station 20. The status data is cross-coupled via the STATUS BUS 122 to the CBUS service unit 146 on the other system half.

The telephony control group 132 provides the system timing, tone generation, and signalling interfaces to the data lines and voice circuits and the switching matrix. The telephony controller group 132 contains four principal units: a telephone timing unit 150, a conference and tone unit 152, a time switch unit 154, and a scan and signal unit. Each of the units of the telephony controller are linked by a data bus known as the IAD BUS.

The telephony timing unit provides the common functions required by the other telephony control group units such as system timing and synchronization. In the redundant architecture of the central control station, the timing bus 124 is provided between the telephony timing units 150 of the two halves to synchronize the standby telephony control group with the active telephony control group.

Together the time switch unit 154 and the scan and signal unit 156 form a pulse-code-modulation (pcm) switching matrix. The matrix is able to switch telephone calls and data appearing at its input ports, i.e., telephone calls on the Telephony Bus 158.

The time switch unit 154 switches a pulse coded modulation encoded voice or data between its various ports. The switch function is provided by time slot interchange circuits.

The signalling and scanning unit 156 transmits and receives signalling information from its ports. The signalling information obtained by the signalling and scanning unit may be sent via the IAD BUS to inform the central processors 134, 136 of the status of the telephony devices on the telephony bus.

The conference and tone unit 152 provides a plurality of conference circuits which may selectively be tied to telephony devices on the telephony bus. Additionally, the conference and tone unit provides the plurality of tones needed by the central control station 20 for supervisory and address signalling.

Additional understanding of the elements and operation of the central control station may be obtained from U.S. patent application Ser. No. 696,829, "Centralized Image Responsive Telephone Time Slot Interchange System", filed Jan. 31, 1985, issued on Aug. 18, 1987 as U.S. Pat. No. 4,688,212 and assigned to the assignee of the present invention, which application is herein incorporated by reference.

A. Central Control Stations Configurations

Depending upon the geographic and demographic characteristics of the area to be served by the cellular mobile telephone system of the present invention, there are numerous arrangements for interconnecting the various elements of the system to provide the desired geographic coverage without the necessity of installing equipment which is not be utilized. The series of diagrams in FIGS. 7A-7B illustrate different types of arrangements of the elements of the present invention which may also be combined to provide a system tailored to meet a specific geographic and demographic contour.

Figure 7A:
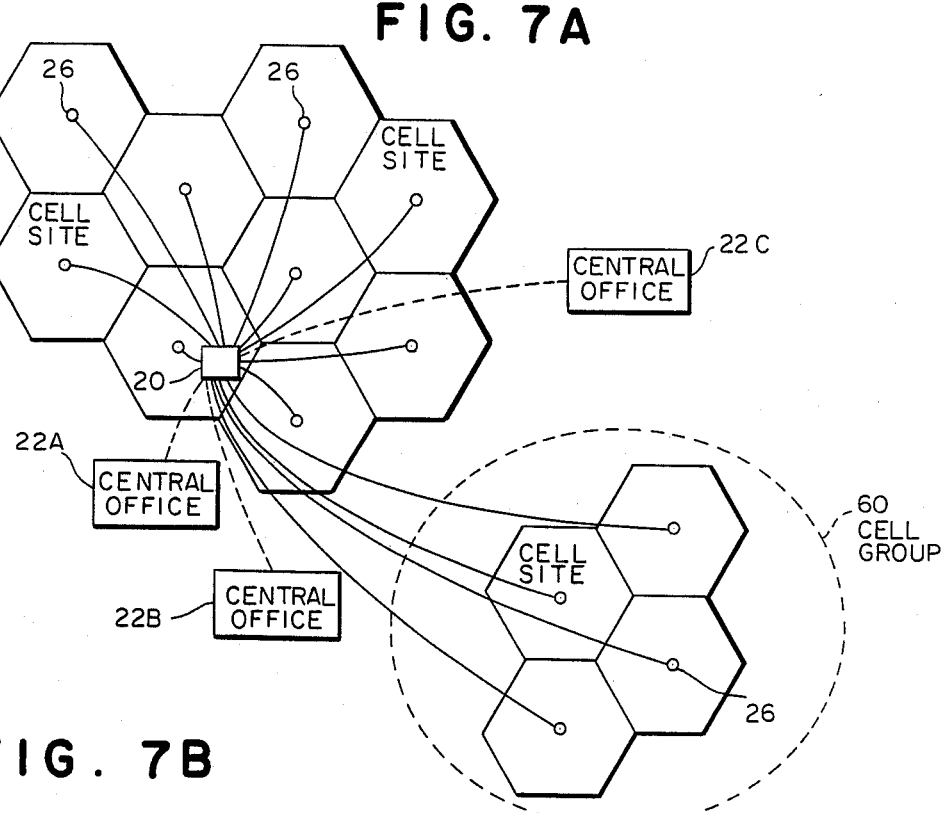
FIGS. 7A-7B is a plan view of a mobile telephone service area illustrating communication coverage patterns of two embodiments of a mobile telephone system according to the present invention.

Referring now to FIG. 7A, a geographic area to be served by the cellular mobile telephone system of the present invention may be provided such service through a plurality of cell stations 26. Although the antenna propagation pattern of each cell station 26 is dependent upon a number of factors, including topography and buildings, for purposes of illustration, the cell stations are shown located near the center of a hexagonally shaped service area. Usually, although not necessarily, within the areas covered by the plurality of cell sites 26, a central control station 20 is located. The central station 20 is connected by voice circuits and data links to each of the cell sites 26.

To provide access to a public switch telephone network, the central control station 20 is connected via voice and data circuits to one or more central offices 22A, 22B, 22C of a wire line telephone system. A geographically isolated cell station or stations, such as the illustrated cell group 60, may be included within the cellular mobile telephone system, but at a considerable backhaul cost for the interconnections between each cell site 26 of the cell group 60 and the central control station 20. Note also that if a telephone call is made by a mobile unit within the service area served by one of the cell stations 26 in the cell group 60 to a wire line telephone served by the second central office 22B, the call must be routed a considerable distance from the cell site 26 within the cell group 60 to the central control station 20 and then back to the central office 22B.

Figure 7B:
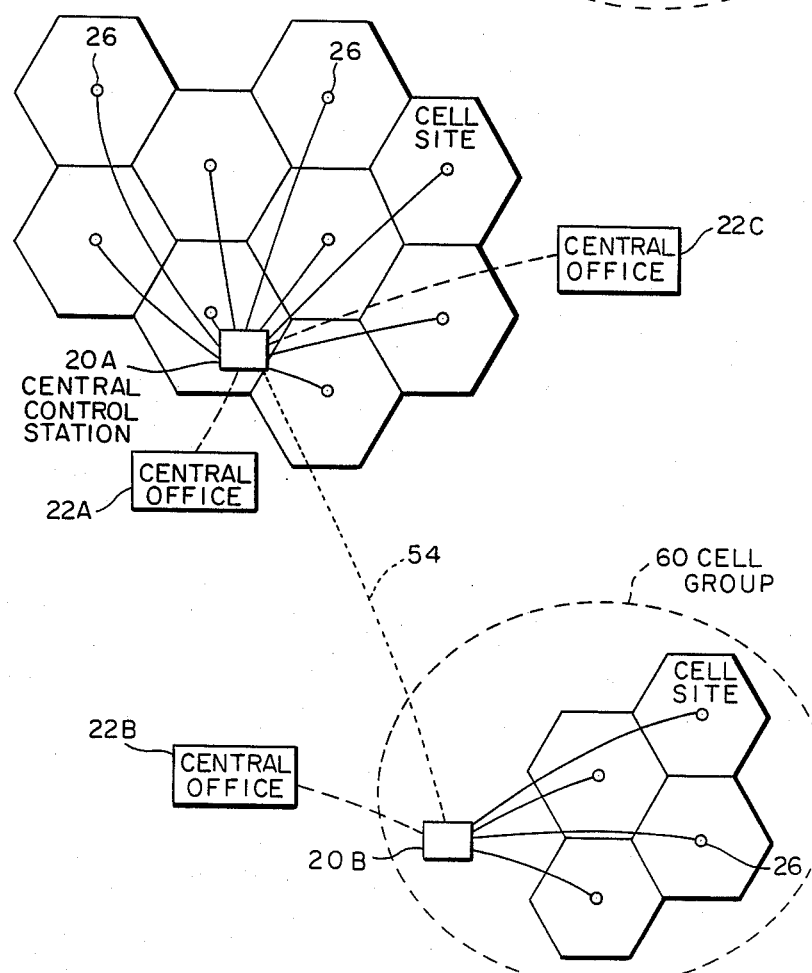

The diagram in FIG. 7B depicts a telephone system using an alternative arrangement of the elements of the present invention to form a mobile telephone system which provides service to the same cell sites as are served in the system of FIG. 7A. With reference to FIG. 7B, each cell site 26 in the main cluster of cells is connected to a fist central control station 20A. The first central control station 20A is interconnected to two central offices 22A, 22C of the wire line telephone system. A group of cell sites 26 forming a remote cell group 60 are controlled by a second central station 20B. The second central control station 20B, physically located outside the zone served by the cell sites 26 of the cell group 60, accesses the public telephone system through a third central office 22B. To provide a single system, the two central control station 20A, 20B communicate via a data line 54 and may also be interconnected by a plurality of interstation voice circuits (not shown), as explained hereinafter. Note in the cellular mobile telephone system depicted in FIG. 7B that a mobile unit operating within one of the zones controlled by the cell sites 26 of the cell group 60 places a call to a wire line subscriber controlled by the third central office 22B, the call may be placed directly from the central control station 20B to the third central office 22B and the long distance carriage of the telephone call, used in the cellular mobile system of FIG. 7A is avoided.

The modular elements of the cellular mobile telephone system of the present invention enable a cellular mobile telephone system designer to implement a cellular telephone system which is tailored to the specific geographic and demographic needs of the system location by using the various elements to provide service where needed. As shown in FIG. 8, there are four basic configurations into which the elements of the present invention may be arranged. Thus the system of the present invention may be either centralized or distributed as desired.

Figure 8A:
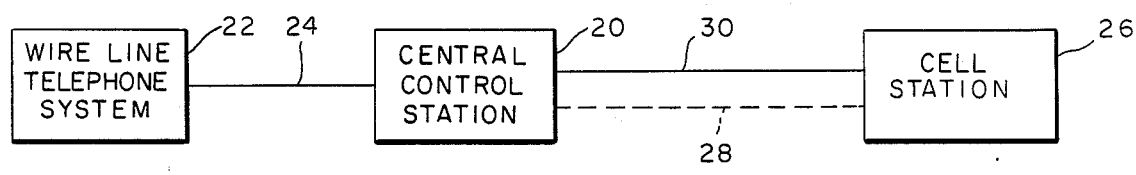
FIGS. 8A-8D are functional block diagrams of alternative embodiments of a mobile telephone system according to the present invention.

Referring now to FIG. 8A, the smallest configuration of a system of the present invention includes a single central control station 20 controlling a single cell site 26. Control of the cell site 26 is obtained through a data link 28, and voice communications from mobile units operating within the service area of the cell site 26 are passed to the central control station 20 via one or more voice circuits 30. The central control station 20 is also connected to a central office of a wire line telephone system 22 through one or more trunk circuits 24.

Figure 8B:
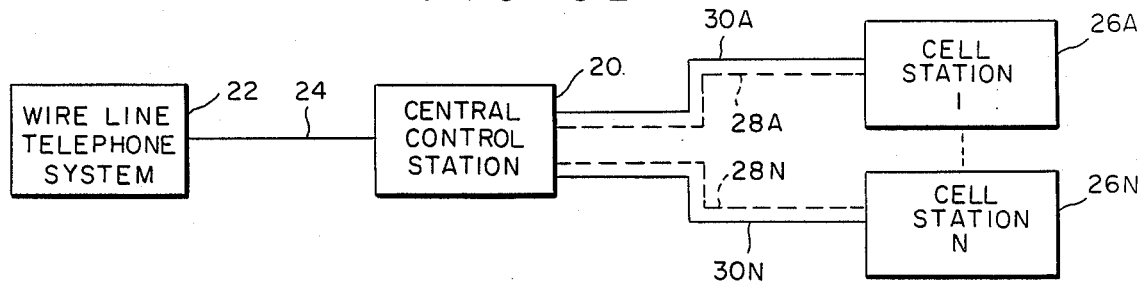

Referring now to FIG. 8B wherein is depicted a mobile telephone system of the present invention in a centralized configuration, a single central control station 20 communicates with a central office of a wire line telephone system 22 through one or more trunk circuits 24. The central control station 20 also communicates with a plurality of cell stations 26A-26N generally remote from the central station 20 and together provide mobile telephone service throughout the service area.

The central control station 20 controls each cell station 26 through one or more of a plurality of data links 28A-28N. Voice communications being received from and transmitted to mobile units from the cell stations 26A-26N are carried by a plurality of voice circuits 30A-30N interconnecting each cell station 26A-26N with the central control station 20.

Figure 8C:
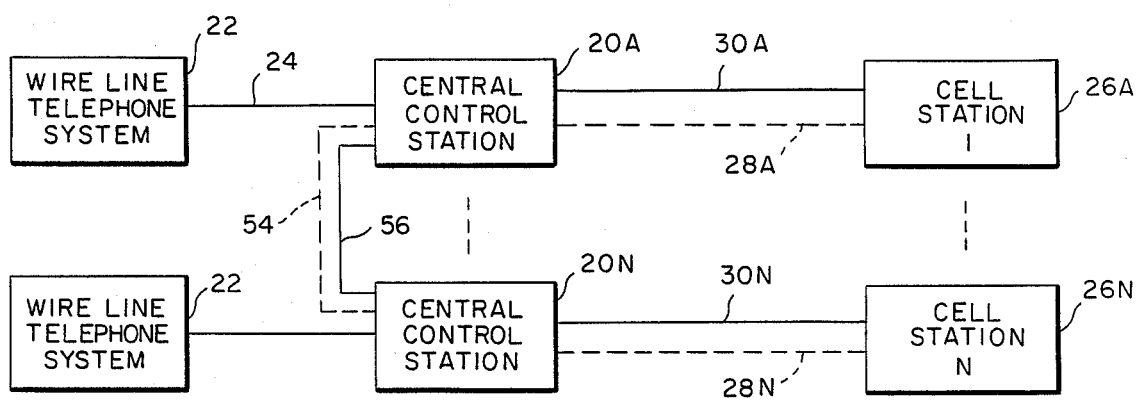

The elements of the system of the present invention may also be arranged in a distributed configuration in which two or more central control stations 20 are interconnected via data links. As shown in FIG. 8C, a plurality of central stations 20A-20N, each connected via voice circuits 30A-30N and data links 28A-28N to a cell station 26A-26N under its control, are interconnected via a data link 54. Some or all of the control stations 20A-20N may be tied via one or more trunk circuits 24 to a wire line telephone system central office 22. As described hereinbefore, the wire line central office 22 may also be a private switching network or another mobile telephone system. Each of the central control stations 20A-20N may also be interconnected by a plurality of interstation trunk circuits 56 which carry telephone communications among the central control stations 20A-20N.

Figure 8D:
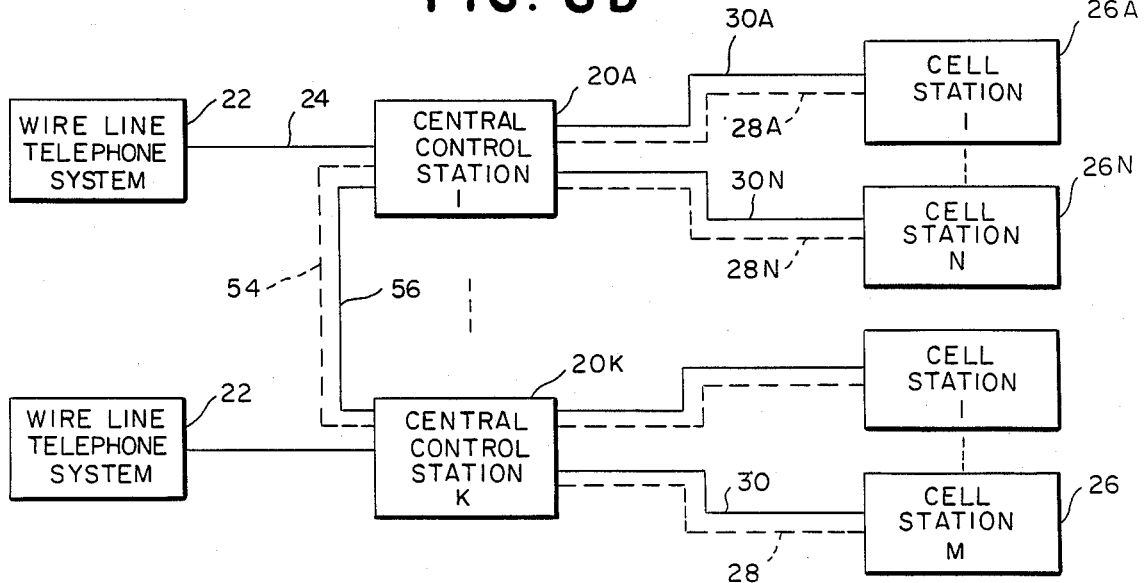

The configuration of elements shown in FIG. 8D forms yet another distributed configuration. Referring now to FIG. 8D, a plurality of central control stations 20A-20K, each controlling a separate plurality of cell stations 26, may be interconnected via a data link 54. The number of cells 26 which are connected to a particular central control station 20A-20K is a function of the need for telephone service of the service area served by the particular central station 20A-20K and cell stations 26.

In the detailed embodiments of FIG. 8, up to 32 central control stations 20 may be interconnected in a single system. Similarly, the number of cell stations per central control station may be any number up to 32. However, it is understood that the specific number of central control stations 20 in the present is not so limited.

The number of voice circuits 30 interconnecting one of the central control stations 20 with one of the cell stations 26 may vary from cell site to cell site, to the maximum size of the central control station 20. For example, a relatively large number of voice circuits 30 may interconnect the central control station 20 and a cell station 26 is located in a densely populated urban center, and a relatively fewer number of voice circuits interconnecting the same central station 20 and a cell station in a remote, more sparsely populated area.

Each of the central control stations 20 may be interconnected via a plurality of interstation trunk circuits 56. As explained hereinafter, the use of interstation trunk circuits 56 is entirely optional and the circuits 56 may be replaced either in whole or part by use of the wire line telephone system.

When a system is built in a distributed configuration, each of the central control stations 20 acts as an autonomous node in a cellular network. The basic call processing and maintenance functions of each central control station 20A-20K are independent of all other central control stations 20A-20K. The central control stations 20A-20K rely on each other only for call routing, call maintenance and network maintenance functions.

A centralized configuration, such as those illustrated by the systems in FIGS. 8A and 8B, may be expanded to a distributed configuration by the addition of one or more central control stations 20 and cell stations 26, or by the addition of one or more cell stations 20 and the reconnection of some of the existing cell stations 26 to the new central control station 20, or by a combination of new central conrol stations 20, new cell stations 26, and the reconnection of some of the existing cell stations 26.

In changing or expanding from a centralized configuration to a distributed configuration, none of the elements used in the previous configuration is wasted or unused. Rather, by simple interconnection, each of the elements finds a place within the expanded or converted configuration. The architecture of the system of the present invention allows a system to be implemented with minimum investment and yet be able to expand to a system capable of serving extremely large service areas. The system architecture of the present invention also allows the system designer to emplace a mobile cellular system which is efficient in terms of minimizing the back haul costs due to cell station to central control station interconnection, and due to central control station to wire line telephone system interconnection.

The data link 54 in the system of the preferred embodiment comprises a commercially available data packet switching system. However, the data link 54 may be implemented through any of several conventional high-speed data transfer techniques, such as direct interconnection transmission lines of all central control stations 20A-20K, with data, shared media polled systems or high-speed data bus transmission systems.

B. Call Processing With Plural Central Control Stations

The previous sections in this specification described the signalling methods and communication paths utilized by the system of the present invention in placing calls to mobile units, placing calls from mobile units, and in maintaining calls as a mobile unit changes zones while in the midst of an on-going call. Previously, these call processing schemes were described in relation to a system of the present invention having a single central control station 20 and plural cell sites 26. As explained above, the elements of the cellular mobile telephone system of the present invention may be combined in a number of different ways including combinations having multiple central control stations 20 interconnected by a data link and, in sum applications, by a plurality of interstation trunk circuits.

Reference may be had to FIG. 9 wherein a simplified block diagram of a distributed configuration cellular mobile telephone system in accordance with the present invention. For purposes of simplifying the diagram, some elements not directly related to the communication paths utilized by a system of the present invention are not illustrated, such as the data link between each central control station 20 and each cell station 26 under its control. The communication lines available in the system are shown as dashed lines while the communication path being used by the call being described below is shown as a solid line.

The mobile telephone system illustrated in FIG. 9 includes three central control stations 20A, 20B, 20C interconnected by a data link 54 and each connected to a central office 52A, 52B, 52C of the wire line telephone system 22 by a plurality of trunk circuits 24. Plural wire line telephone instruments 50A, 50B are connected to the wire line system 22 and are, accordingly, able to be connected through the wire line system to any one of the central offices 52A, 52B, 52C.

The first central control station 20A controls two cell stations 26A, 26B; the second central control station 20B controls a third cell station 26C; and, the third central control station 20C, controls two cells stations 26D, 26E. The control of each of the central control stations 20A, 20B, 20C of their respective cell stations 26 may be performed in accordance with the present invention heretofore described, by utilizing a data link or links (not illustrated) and by interconnecting by a plurality of voice circuits 30. Each of the voice circuits may be connected to one of the transceivers of the cell station 26 operating on one of a plurality of communication channels there available.

Figure 9A:
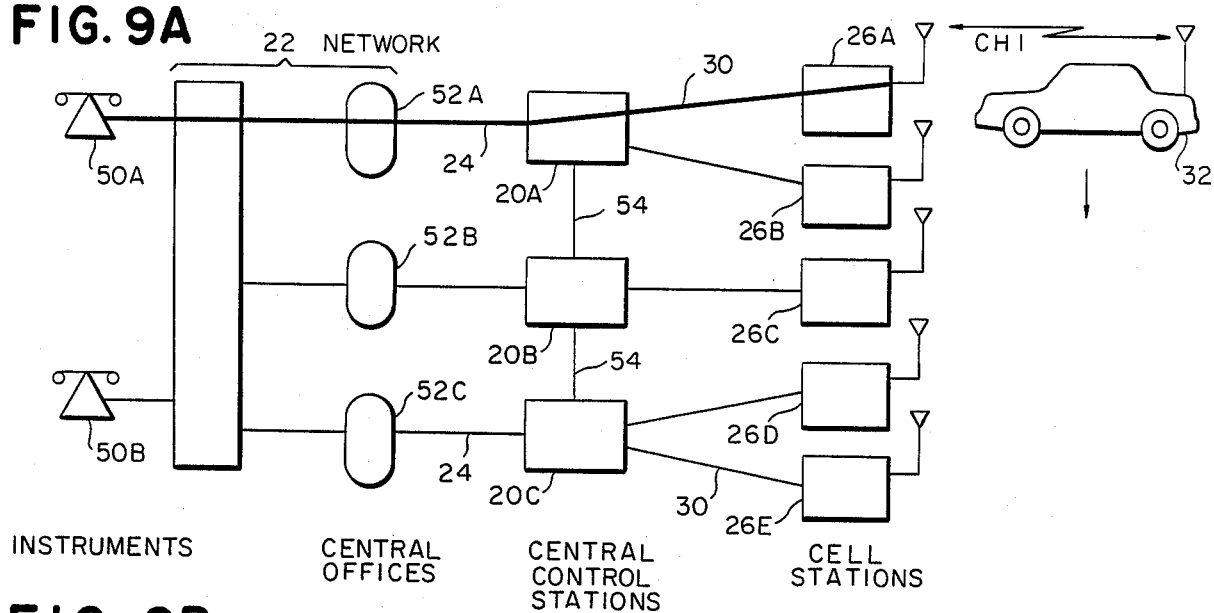
FIGS. 9A-9I are a series of simplified functional block diagrams of one embodiment of a mobile telephone system according to the present invention illustrating the communication paths established with a moving mobile unit.
Figure 9B:
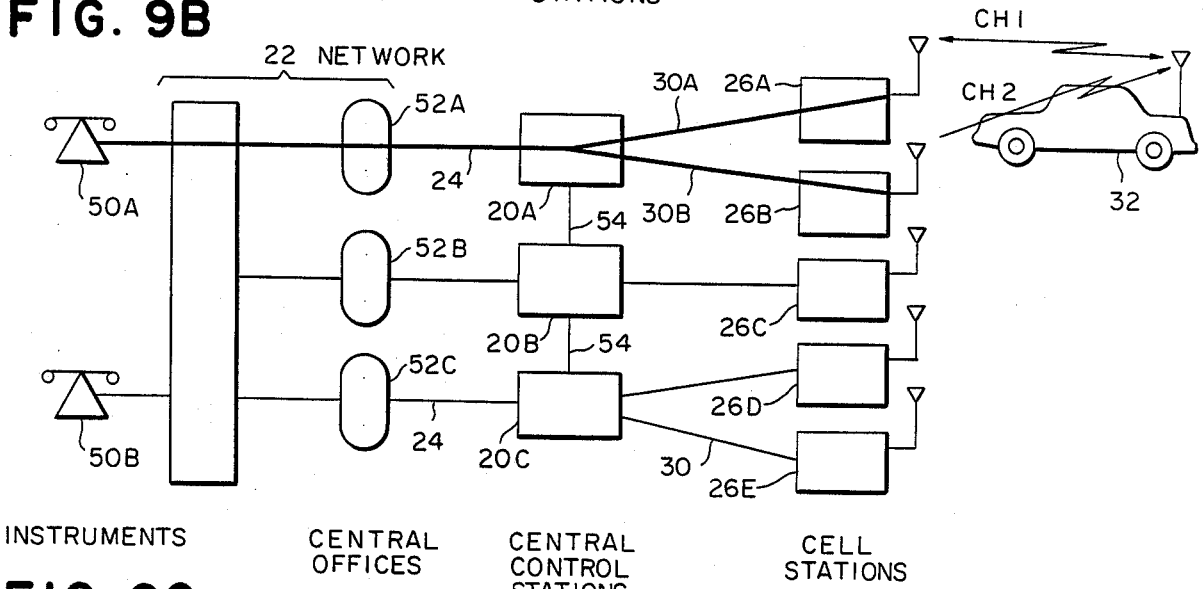
Figure 9C:
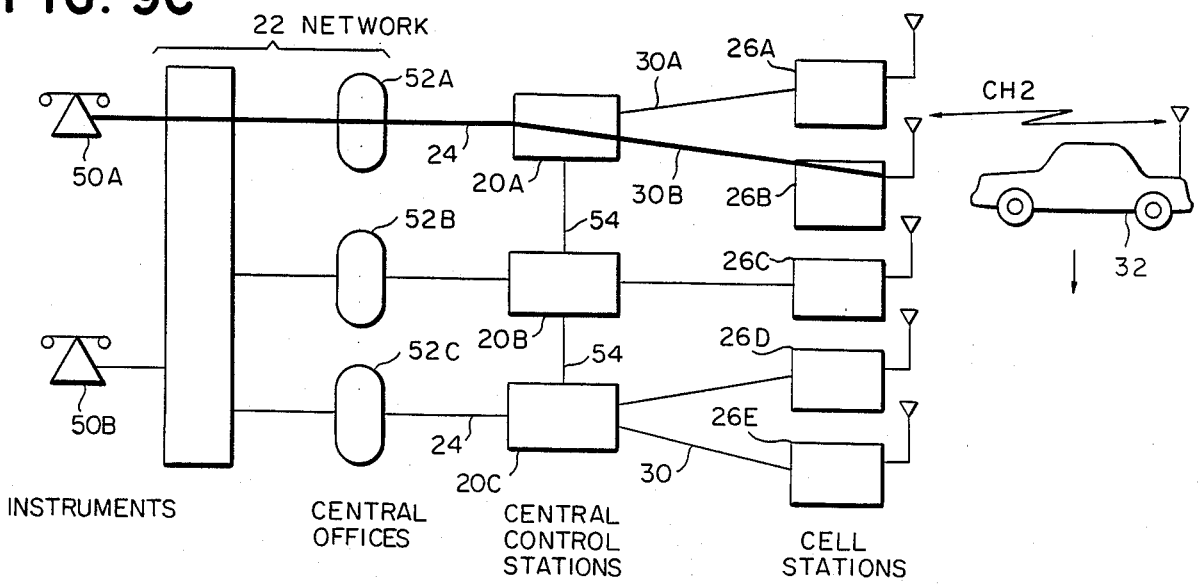

Referring to FIG. 9A, a telephone call is shown ongoing in a mobile telephone system between the first wire line instrument 50A and a mobile unit 32 via a first communication path including a first RF channel CH1 with the first cell station 26A. It makes no difference whether the call was placed by the mobile unit 32 or by the wire line instrument 50A.

If the mobile unit moves in a direction toward the bottom of FIG. 9, i.e., away from the zone controlled by the first cell station 26A and toward a zone controlled by the second cell site 26B, the first central control station 20A will utilize the measurements of the strength of the signal received from the mobile unit as measured by the first and second cell stations 26A, 26B, among others, to determine when a handoff to the second cell station 26B is needed.

As described hereinbefore, as the mobile unit 32 moves within the zone controlled by the second station 26B, the first central control station 20A establishes a second communications path through cell station 26B and a second RF channel CH2. The first conferences both the first and second communication paths. When the conference has been established, the communication path will appear as indicated in FIG. 10B.

Once the mobile unit hs been directed to retune its transceiver to the second channel CH2 and the mobile unit 32 has complied with the direction, the first communication channel CH1 and the voice circuit 30A interconnecting the control station 20A and the first cell station 26A may be idled and made available for other telephone calls.

Each central control station 20 maintains within its data base a map of the cell stations 26 within its control and of the cell stations 26 adjacent to its controlled cell stations. Accordingly, as the mobile unit 32 enters the zone controlled by the second cell station 26B, the first central control station 20A knows that one of the zones adjacent to the zone controlled by the second cell station 26B is controlled by a cell station not under its control. To obtain information regarding the need for handoff of the telephone call, the first control station 20A sends a message via the data link 54 to the second control station 20B requesting power measurements of the mobile units transmissions from the third cell station 26C.

With a measurement of signal strength from the zone controlled by the second cell station 26B and the adjacent cell stations 26A, 26C, the first central control station 20A is able to determine when handoff of the call to the third cell station 26C is necessary. When the first central control station 20A determines that a handoff is necessary to the third cell station 26C, the central control station 20A cannot set up the transferee cell station, because that cell station is not under its control and because the first central control sation 20A has not direct communication path, such as voice circuis 30A, 30B, to the third cell station 26C.

Each central cell station 20 mainains a map of the zones controlled by its cell stations and the zones controlled by the cell stations adjacent to the area at controls. If the mobile unit 32 is in a zone controlled by a central control station other than the central control station through which the telephone call originated, the controlling central control station controls the handoff from one cell station to another within its control area, just as if a routine cell station transfer within the control of the same a central control station.

As the controlling center control station detects that the mobile unit 32 is about to leave a cell iste under its control to a cell site under the control of another central control station, the controlling central control station sends a handoff coordination message to each adjacent central control station. The adjacent central control stations direct their appropriate cell stations to take power measurements of the received RF signal from the mobile 32.

Based on the measured power report from the cell stations, the adjacent central control stations each select a candidate cell site for handover, and reserve a communication channel and a voice circuit within that cell station. The adjacent central control station notifies the controlling central control station that a communication channel and voice circuit have been reserved and the received signal power at the reserved cell stations. When the controlling central control station receives the handoff coordination response from all the adjacent central control stations, a controlling central control station selects one of the candidate cells and channels, notifies the nonselected cell stations central control stations that the reserved candidate channels may be released. The controlling central control station also sends a message to the originating central control station that handoff is required and identifies the selected candidate cell and its central control station.

Upon being notified that the handoff from one central control station to another is required, the originating central control station seizes one of the trunk circuits to one of its associated central offices, and requests from the receiving central control station the identification of a trunk circuit. When the receiving central conrol station replies with the identification of the requested trunk circuit, the originating central control station places a telephone call from the originating central control station through the wireline telephone network to the receiving central control station.

Meanwhile, the central control station has established a communication path through the previously reserved voice circuit and communication channel. When the communication path is established through the receiving central control station to the mobile unit, the receiving central conrol station notifies the originating control station, and the originating control station sends a request to the controlling central control station to command the mobile to switch to the previously reserved channel. Once the mobile unit has tuned to the previously selected channel, the communication path from the originating central control station through the controlling control station is idled and the receiving control station thereafter becomes the controlling central control station. The sequence of commands between control stations is set forth in tabular form in FIG. 10.

When the first control station 20 determines that handoff is imminent, it sends a message via the data link 54 to the second central control station 20B requesting handoff coordination. As described above, the second control station returns with a candidate cell station and communication channel. After receipt of the handoff information from the second central control station 20B, the first central control station 20A selects one of the candidate cell stations, e.g., third cell station 26C, and seizes one of the trunk circuits 24 connecting it to the wireline network. A telephone call is placed to the trunk circuit which the second central control station 20B has identified. The telephone call is switched via a wire line telephone system to the indicated one of the trunk circuits 24 connecting the second central office 52B to the second central control station 20B.

Figure 9D:
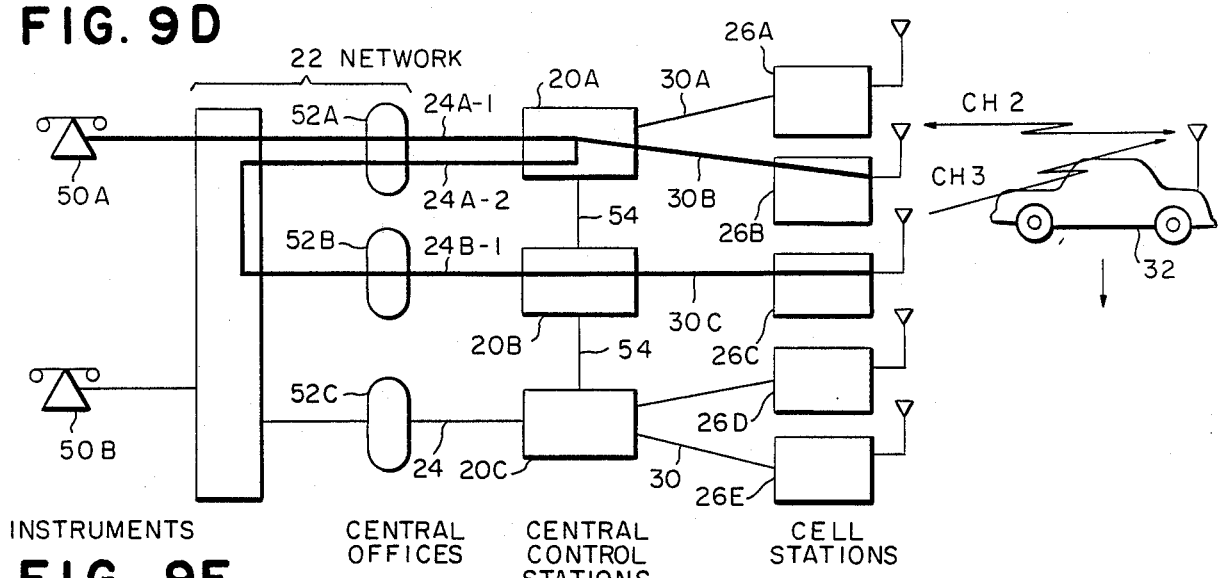
Figure 9E:
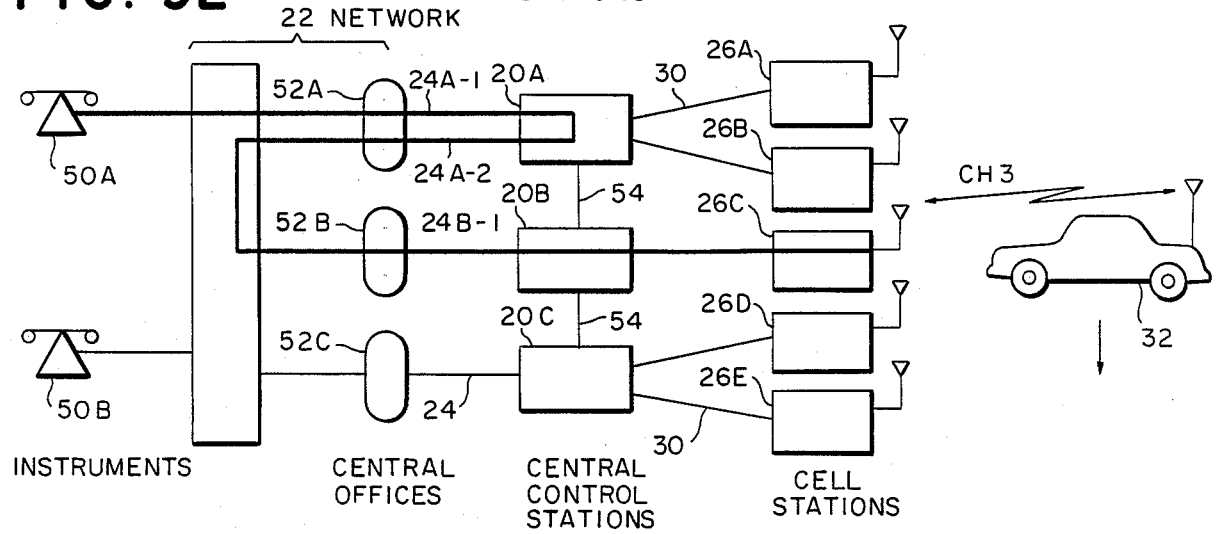

Referring now to FIG. 9D, the first central control station 20A seizes one of the trunk circuits 24A-2 and places a call through the network 22 to a telephone number which lands on trunk circuit 24B-1 at the second control station 20B. Because the second control station 20B had identified trunk circuit 24B-1 to the first central control station 20A for use in the handoff procedure, the second central control station 20B knows that the incoming call on trunk circuit 24B-1 is for the handoff and not an originating call from a wire line instrument.

While the first central control station 20A was placing the telephone call to the second central control station 20B, second control station 20B selected a voice circuit 30B interconnecting it and the third cell station 26C, verified the continuity of the voice circuit, and performed, in general, the functions which the central control stations normally perform in the establishment of a handoff transferee. As illustrated in FIG. 10D, the second central control station 20B instructs the third cell station 26C to connect the voice circuits 30C to a transmitter/receiver operating on the selected channel CH3. The selected channel may be any of the available channels including the first communication channel CH1.

When the second control channel 20B verifies the continuity of the communication path under its control, it notifies the first central control station 20A that the communication path through the second control station 20B is ready. In a similar fashion to that utilized when handing off between cell stations sites of the same central control station, the first central control station 20A places the original call utilizing trunk circuit 24A-1 and the voice circuit 30B on two legs of a conference bridge and then connects the third leg of the conference bridge to trunk circuit 24A-2. By use of a conference bridge, interruptions in the speech path will be significantly shortened. Once the bridge circuit has been established, the first central control station 20A sends a message to the second central control station 20B via data link 54 requesting that the second control station 20B send an order through the third cell station 26C commanding the mobile unit 32 to retune its transceiver from the second communications channel CH2 to the third communications channel CH3.

Once the mobile unit 32 has retuned its transceiver and begins communicating on the third communications channel CH3, the third cell site 26C detects the mobile unit's transmission and notifies its control station, central control station 20B. The second control station 20B, in turn, notifies the first central control station 20A that the handoff procedure has been completed. Once the handoff has been completed, the first control station 20A removes the call from the conference bridge by directly connecting through its matrix switch trunk circuit 24A-1 and and trunk circuit 24A-2. The conference bridge, voice circuits 30B and the second communications channel CH2 may all be idled by the first central control station 20A and made available for other calls. At this time in the call, the communication path is depicted in the system diagram of FIG. 9E.

If the mobile unit 32 continues to move in a direction down the diagram, i.e., away from the third cell stations 26C and toward the fourth cell station 26D, there will come a time when a faster handoff is required from cell station 26C to the fourth cell station 26D. At that time, the second central control station 20B will request handoff coordination from the adjacent control stations and once a transferee cell station is identified, leaves control to the first control station 20A.

Figure 9F:
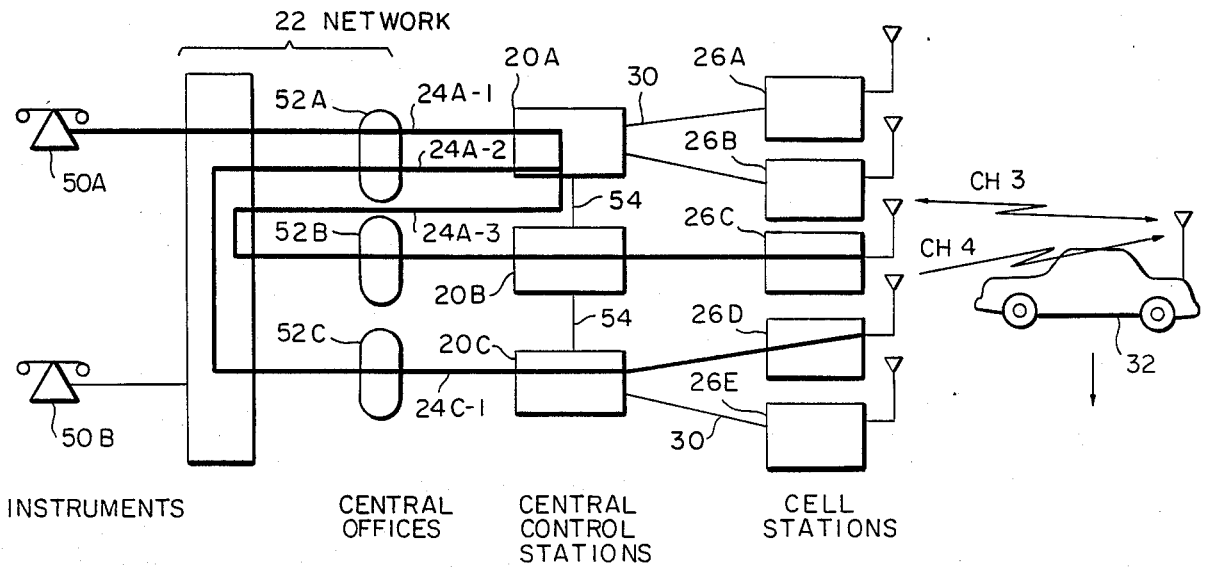
Figure 9G:
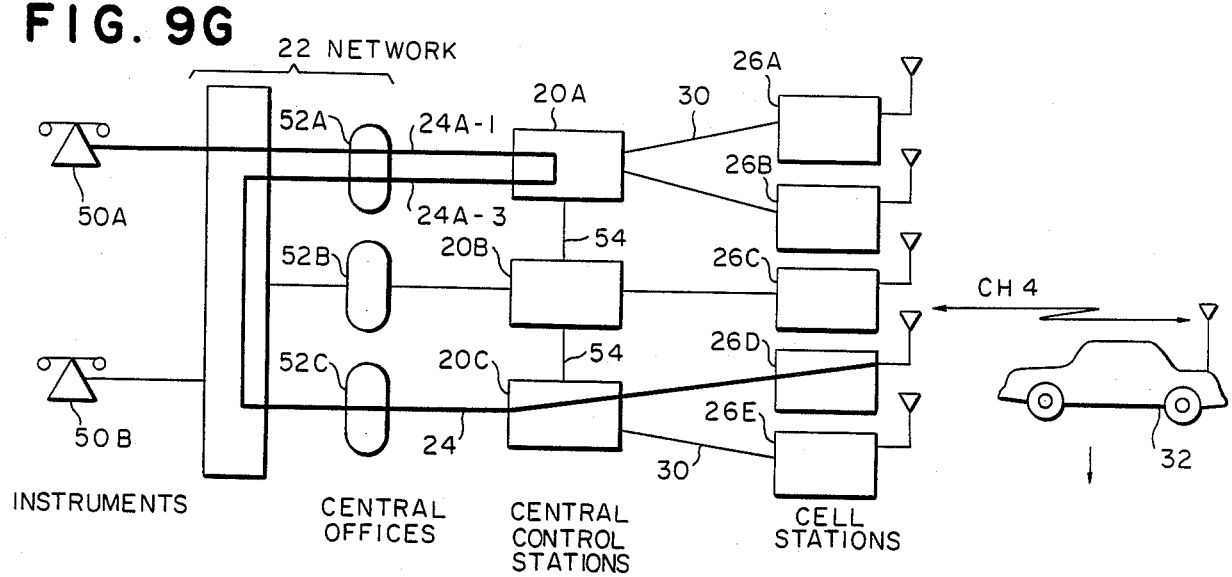
Figure 9H:
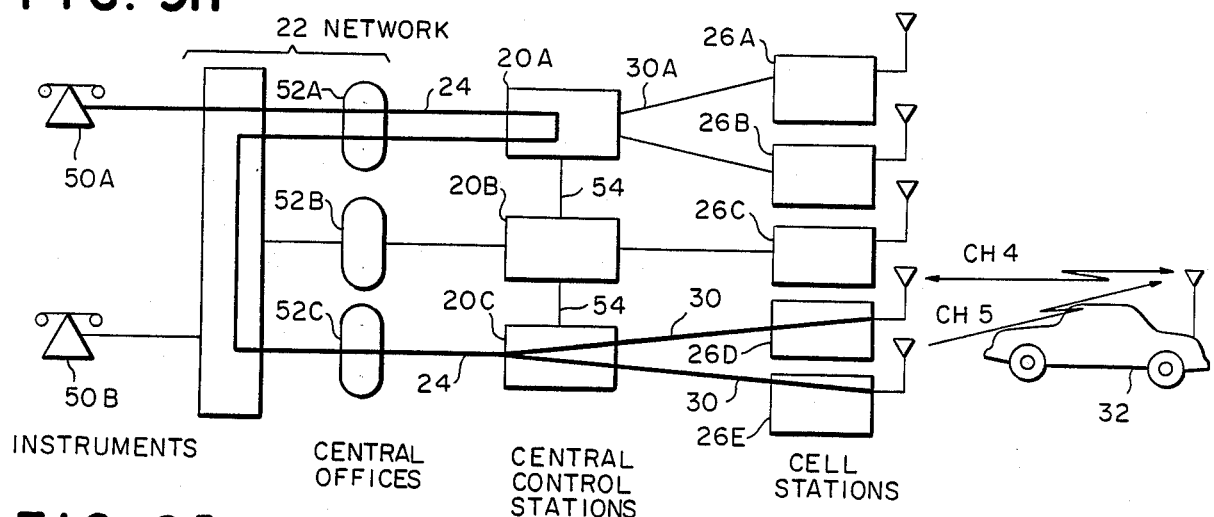

As depicted in FIG. 9F, the first central control station coordinates the handoff procedure with the third central control station 20C and requests an available trunk circuit 24C-1 and a fourth communications channel CH4. Once the central control station 20C has reported data identifying the trunk circuit 24C-1 and the fourth channel CH4, and has been informed by the third central control station 20C that the communication path has been established, the first central control station 20A utilizes one of its conference bridges to form a conference call between the wireline instrument 50A, the voice path routed through the third cell station 26C and the voice path routed through the fourth cell station 26D.

As soon as the conference is established, the first central control station 20A sends a message via the data link 54 to the second central control station 20B requesting that the second central control station 20B send a message to the mobile unit (through the third cell station 26C via the third communication channel CH3) requesting that the mobile unit retune to the frequencies associated with the fourth communications channel CH4.

After the fourth cell station 26D has detected that the mobile unit 32 has tuned its transceiver to the fourth communications channel CH4 and reported the retuning to the third central control station 20C (which in turn reports that handoff has taken place to the first control station 20A), the first central control station 20A directly connects the voice path from the wireline instrument 24A-1 to the most recently established trunk circuit 24A-3. The first central control station also idles the conference bridge and terminates the telephone call to the second control station 20B thereby idling trunk circuits 24A-2 and 24B-1. The second control station 20B idles the voice circuit 30C between it and the third cell station 26C and idles the now unused communication channel CH3. At the completion of the handoff, the mobile cellular system has established the communication path diagrammed in the system of FIG. 10G.

Figure 9I:
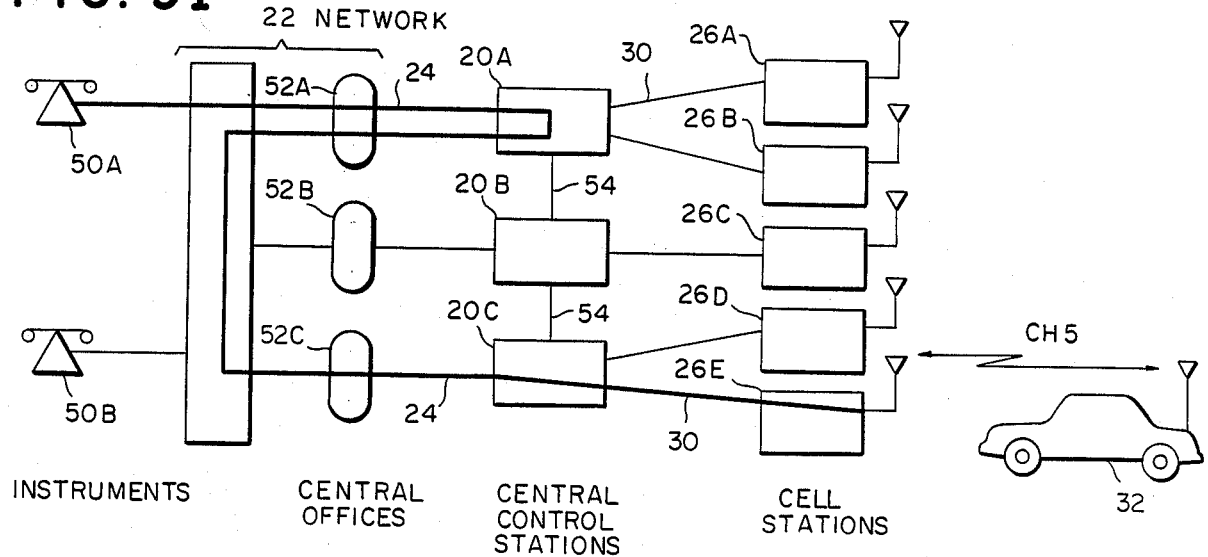
Figure 10:
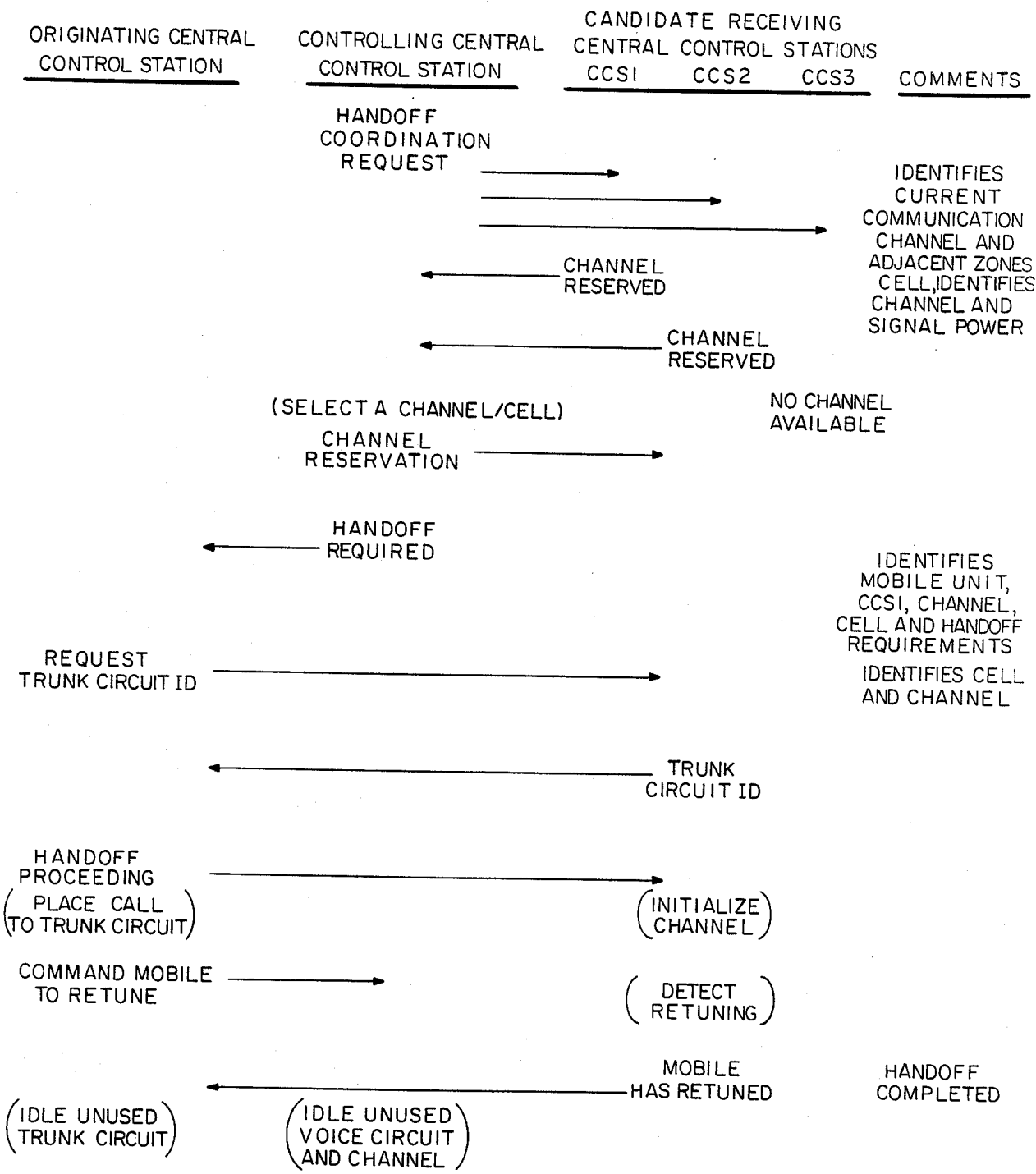
FIG. 10 is a flow diagram illustrating the operation of the system of FIG. 9A.
Figure 11D:
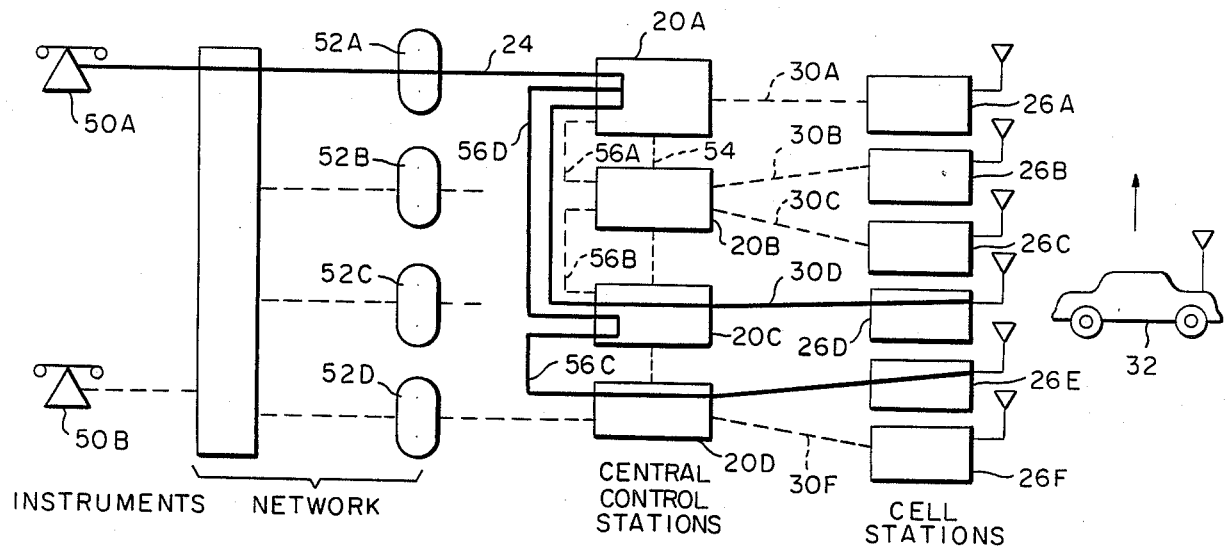
Figure 11E:
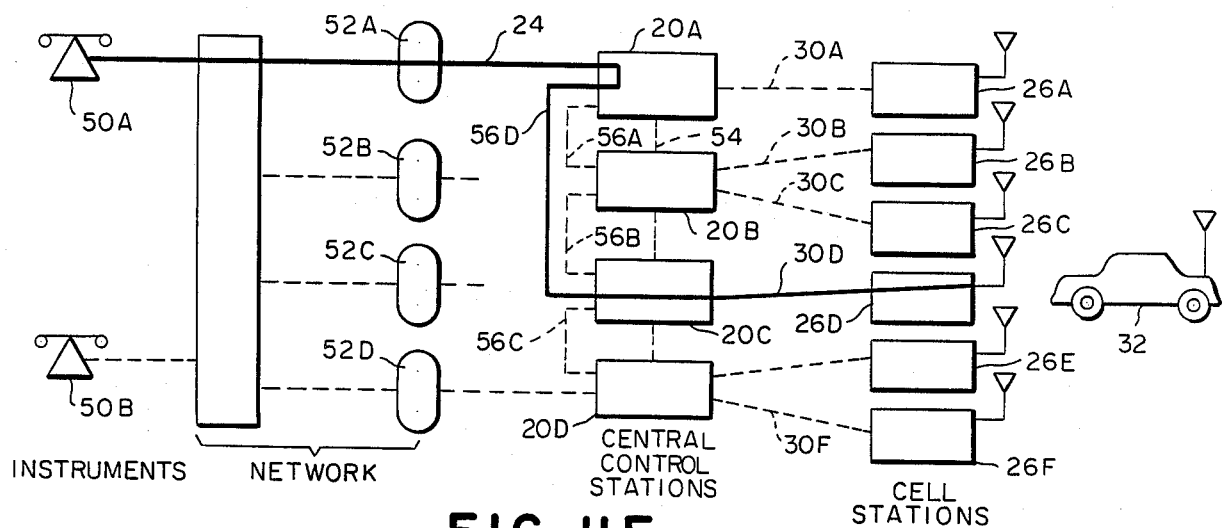
Figure 11F:
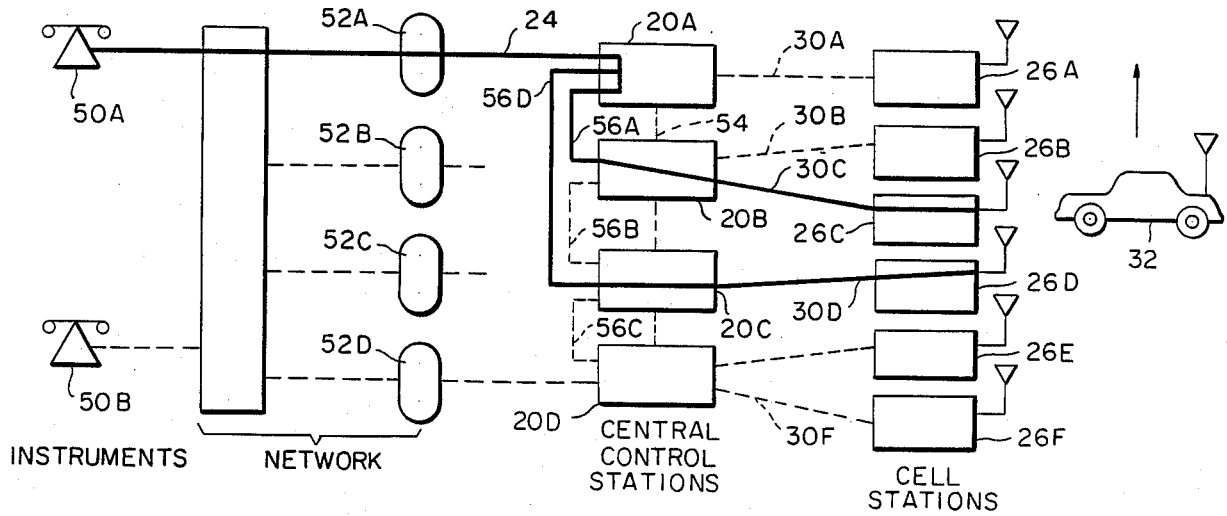
Figure 11G:
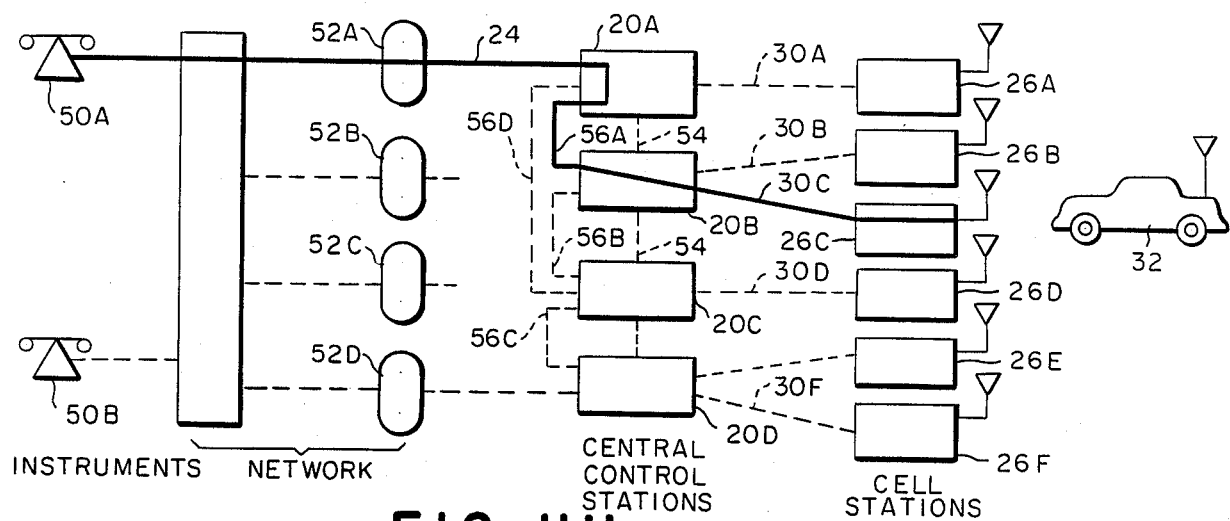
Figure 11H:
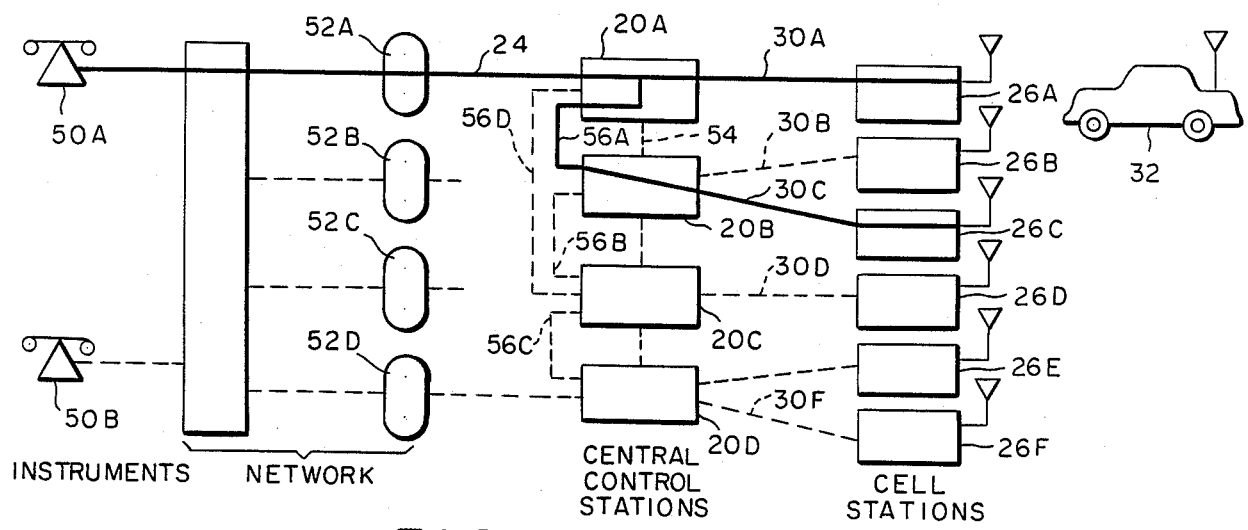
Figure 11I:
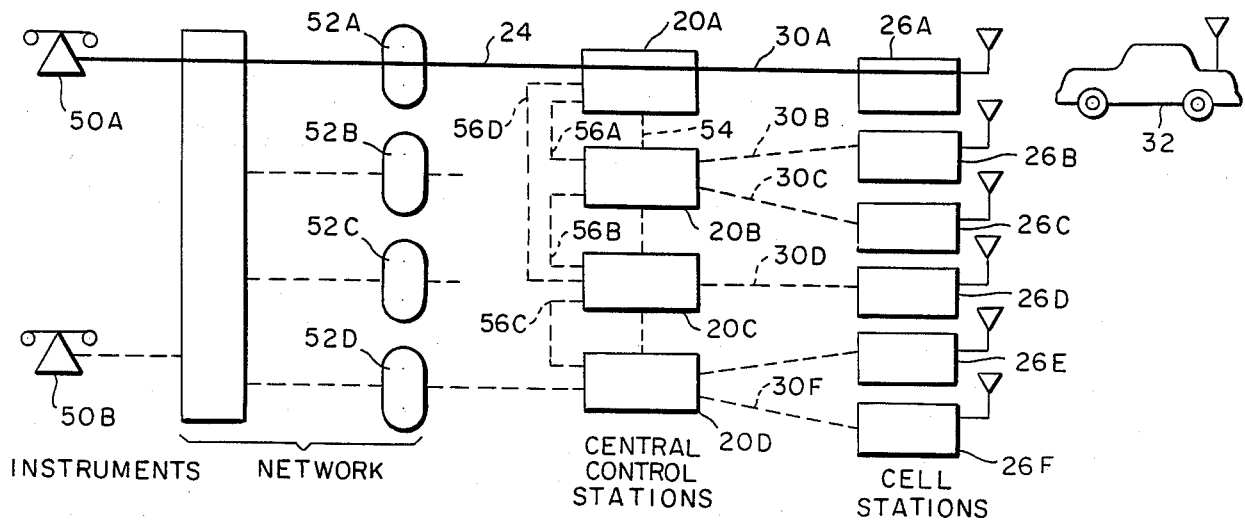

If the mobile unit 32 moves to a different zone within the same central control station 20C, the handoff is controlled entirely by the third central control station 20C by bridging the voice circuits 30 communicating with the fourth and fifth cell stations 26D and 26E, by establishing a new, fifth communication channel CH5 at the cell station 26E, by commanding the mobile unit to retune its transceiver to channel CH5 and by idling the unused voice circuit 30 and fourth communications channel CH4 of the cell station 26D once the mobile has switched to channel CH5 at the cell station 26E. The resulting voice path is depicted in FIG. 9I.

As discussed previously, communication paths among plural central control stations within a cellular mobile system can be provided by the wireline telephone system or by a plurality of interstation trunk circuits. Refer now to FIG. 11 wherein is shown a cellular mobile telephone system in which the voice communications among four central control stations 20A-20D are provided by a plurality of interstation trunk circuits 56A-56D.

The interstation trunk circuits 56 may be conventional switched trunk circuits and need not directly connect each of the control stations to each other, but may be placed in tandem between two or more stations. For example, each of the four central control stations 20A-20D may be serially linked, one to another, by interstation trunk circuits 56A, 56B and 56C. A voice path could be connected between the first and fourth central control stations by switching within the second and third control stations 20B, 20C to connect the three interstation trunk circuits 56A, 56B, 56C. Alternatively, to avoid excess use of switches within the central control stations, additional interstation trunk circuits may be connected between various central control stations. For example, the fourth interstation trunk circuit 56D directly connects the first and third central control stations 20A, 20C. The selection of which central control stations should be directly connected by interstation trunk circuits 56 may be made in view of expected traffic requirements between particular central control stations.

With continued reference to FIG. 11 and particularly to FIG. 11A, the distributed control of the central control stations 20A-20D may be illustrated by reference to the communication paths established to allow a mobile unit 32 physically within a zone of one of the cell sites 26 of the cellular mobile system to communicate with a wire line instrument controlled by a wire line network 22.

When a wire line instrument 50 A places a telephone call, it is detected by its associated central office 52A and if the digits of the dialed telephone number appear to be one of the numbers reserved for the cellular mobile system, the call is routed by the central office 52A through one of its trunk circuits 24 to one of the central control stations 20A-20D.

If, for purposes of illustration, the telephone call lands on the first central control station 20A, the control station 20A will formulate a paging message and transmit it to each of its cell stations for broadcast within the zones controlled by these cell stations. Additionally, because the first central control station 20A is a part of a multi-central control station configuration, the first central control station 20A also sends a paging request to the other central control stationd 20B, 20C, 20D via a data link 54. Each of the second through fourth central control stations 20A-20D upon detecting the paging request, initiates a page command through the cell stations 26 under its control. Thus, the paging message is repeated and broadcast throughout the entire area served by the cellular mobile system.

If, for example, a mobile unit which has been paged is located within the zone served by the sixth cell station 26F, the mobile unit 32 has previously selected the sixth cell station 26F as its control cell station and is monitoring the control signal channel assigned to the sixth cell station 26F. Upon recognizing its paging address, the mobile unit transmits a paging response on the control signal channel associated with the sixth cell stations 26F, which response is detected by the sixth cell station 26F and relayed to its central control station, i.e., the fourth central control station 20D. The fourth central control station 20D, in turn, notifies the first central control station 20A that the page response has been received and that the mobile unit 32 is in the zone associated with the sixth cell station 26F.

When the first central control station 20A is notified of the location of the mobile unit within the control area of the fourth central control station 20D, the first central control station attempts to route a communication path through the interstation trunk circuits 56 between the first central control station 20A and the fourth central control station 20D. The selection of a communication path using the interstation trunk circuits 56 can be made in any of the conventional manners for selecting a particular path out of a plurality of path options, and may be made based upon expected traffic conditions, least cost, etc.

In the system of the preferred embodiment, the set up of the communication path through the interstation trunk circuits 56 is made on an ad hoc basis by each central control station involved in the communication path. For example, in the configuration shown in FIG. 11A, the first central control station 10A 10 selects the first leg of the communication path to the fourth central control station 20D. In the example shown in the system of FIG. 11A, the first central control station 20A selects the fourth interstation trunk circuit 56D. The first central control station 20A then interconnects the trunk circuit 24 on which the call has come from the wire line instrument 50A to the selected interstation trunk circuit 56D and notifies the third central control station, i.e., the central control station at the terminus of interstation trunk circuit 56D, that the fourth interstation trunk circuit 56D is in use for a telephone call destined for the fourth central control station 20D.

When the communication path has been established to the third central control station 20C, the third central control station 20C selects the next leg of the communication path. In this case, the third central control station selects interstation trunk circuit 56C and connects the third and fourth interstation trunk circuits 56C, 56D to form the last leg of the communication path to the fourth central control station 20D.

Meanwhile, the fourth central control station 20D has established one of its voice circuits 30F to the sixth cell station 26F as the voice circuit to handle the telephone call, and has tested continuity of the voice path from the fourth central control station 20D to the sixth cell station 26F. Once the communication path is set up, the fourth central control station 20D requests the sixth cell station 26F to send alerting tone to the mobile unit and the call is established between the fourth central control station 20D and the mobile unit in the manner described above.

As the mobile unit 32 moves while the conversation is ongoing, the fourth central control station controls all handoffs between cell stations 26 under its control. As illustrated in FIGS. 11B-11C, to effect handoff between its cell stations the fourth central control station 20D conferences communication paths between the two cell stations 26E, 26F to minimize interruption during handoff and idles the unused communication path once the handoff has occurred.

When the mobile unit is moving outside of the zones controlled by its cell stations 26, the fourth central control station 20D requests handoff coordination for an inter-central control station handoff. As was described previously in association with FIGS. 9 and 10, the originating central control station, i.e., the first central control station 20A, establishes a conference using the existing communication path through the fourth interstation trunk circuit 56D and a second communication path through another circuit within that group of fourth interstation trunk circuits 56D. Handoff between cells controlled by different central control stations 20A-20B proceeds as previously described, the change being that the originating central control station 20A selects a transferee communication path from one of the interstation trunk circuits 56 rather than seizing a trunk circuit 21 through the wire line network and placing a telephone call to establish the transfer communication path. Illustrated in FIGS. 11D-11I are examples of the communication paths for the cellular mobile system which may be used during a telephone call to a mobile unit which is moving toward the top of the Figures.

The distributed arrangement possible in systems embodying the present invention allow for alternative, least cost routing within the system. With reference to FIG. 12, a mobile cellular telephone system may be geographically distributed so that portions of the system are located in a first number planning area NPA1 and portions of the system are physically located in a second number planning area NPA2. Frequently, inter-number planning area telephone calls result in long distance or toll charges being levied by the wire line telephone system provider.

Figure 12A:
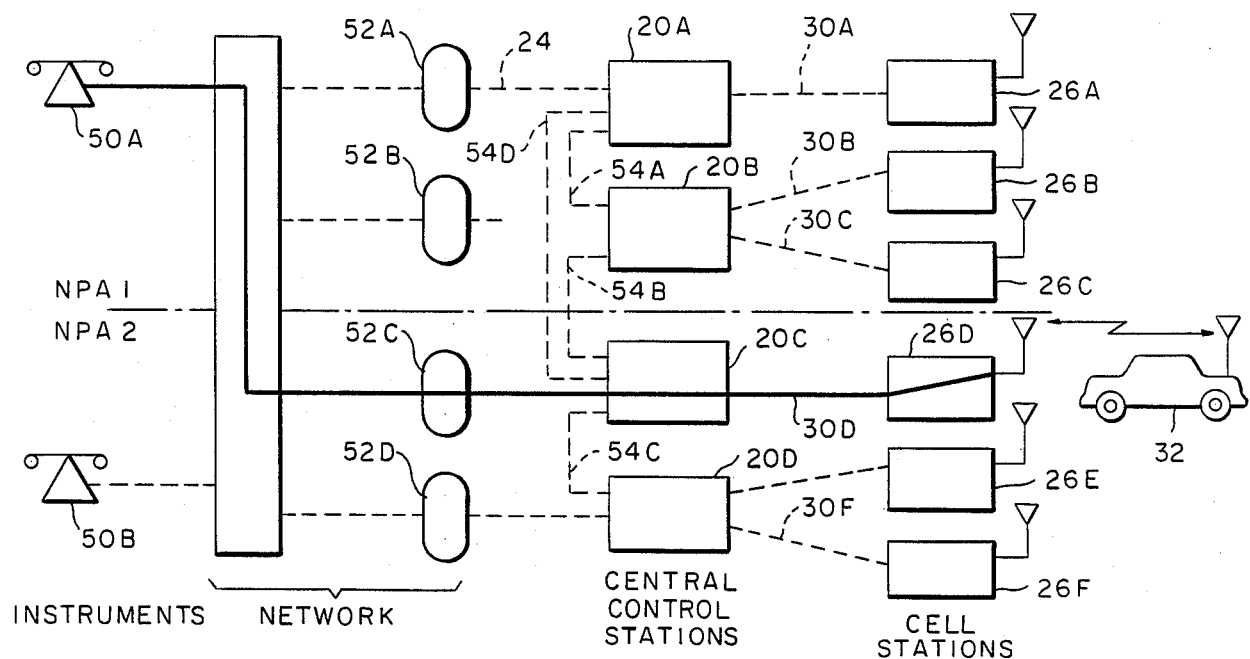
FIGS. 12A-12B are a series of simplified functional block diagrams of the system of FIG. 11A illustrating the communication paths used in least cost routing.

Referring now to FIG. 12A, a telephone call may be placed by a mobile unit 32 as described above, through its cell station 26D and through the central control station 20C associated with the cell station 26D to the central office 52C associated with the control station 20C. If the wire line instrument 50A to which the call has been placed is physically located in a number planning area different from that in which the first central office 52C is located, the wire line telephone system net 22 will complete the call only at the imposition of toll charges.

Figure 12B:
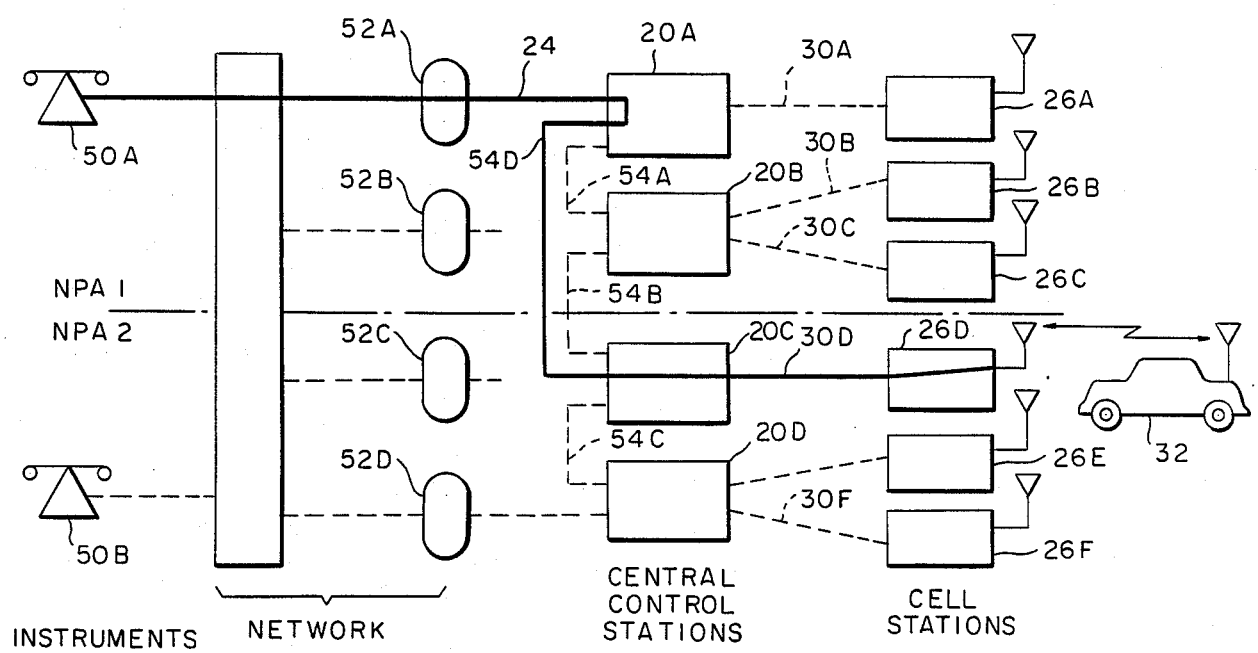

In a system in accordance with the present invention, the central control station 20C controlling the area in which the mobile unit 32 is located may be instructed to place telephone calls to wire line and other telephones using a least cost algorithm. In the system illustrated in FIG. 12B, the central control station 20C in which the mobile unit 32 resides recognizes that the telephone call is bound for a wireline instrument for which a second central office 52A is the closest and that a second central control station 20A communicates with the second central office 52A. As illustrated in FIG. 12B, the first central control station 20C, in accordance with its least cost algorithm, selects a interstation trunk circuit 56D and completes the call to the wire line unit, using the central control station closest to the wireline unit, i.e., the second central control station 20A. The call placed from the central control station 20A to the wireline instrument 50A through the second central office 52A is a "local" call and no charge should result. In accordance with its tariff, the cellular mobile telephone system operator may charge its own tolls for use of the interoffice trunk circuits; but the call may still result in lower cost to the mobile unit 32.

The distributed architecture possible in a system constructed in accordance with the present invention permits telephone calls to be placed, transferred, conferenced, and held; all without the need for additional equipment. For example, it may be desirable during an ongoing telephone call to transfer the call from a mobile unit 32 to another mobile unit or to another telephone instrument controlled by the wireline telephone system 22. FIGS. 13A—13D depict a call processing technique which may be utilized in a system of the present invention to transfer a telephone call from a mobile unit to another telephone instrument.

Figure 13A:
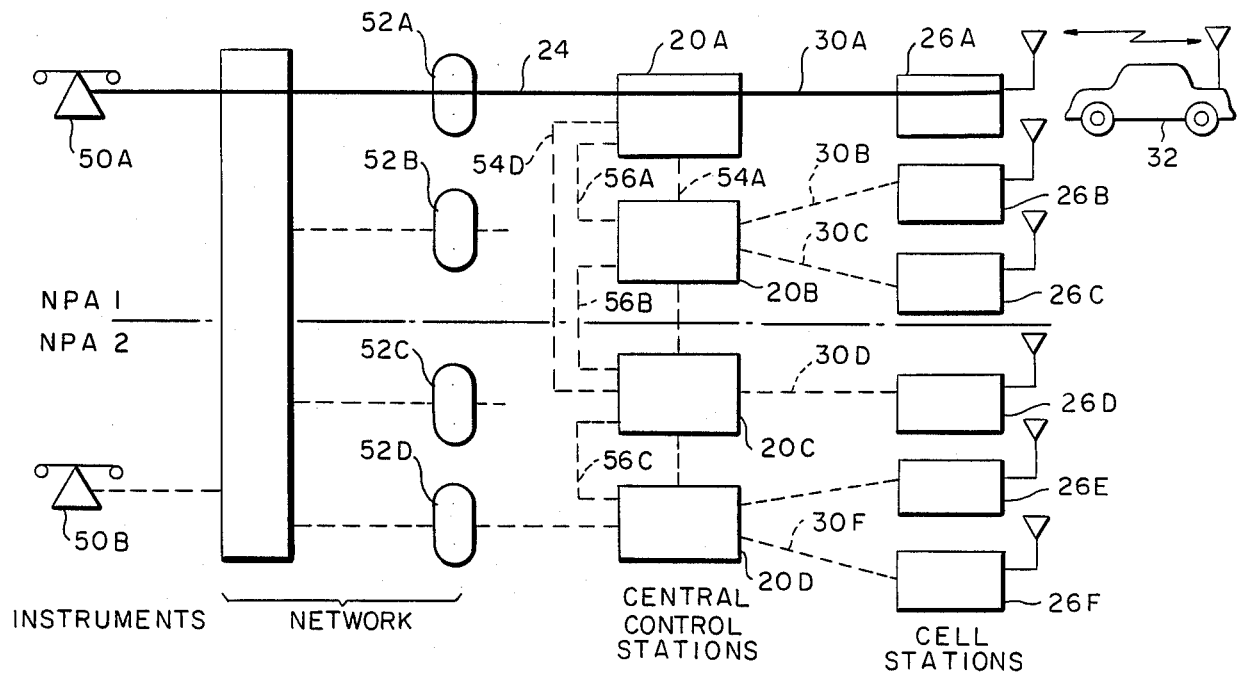
FIGS. 13A-13D are a series of simplified functional block diagrams of the system of FIG. 11A illustrating the communication paths usd for call transfer.

With reference to FIG. 13A, a telephone call may be ongoing between a first wire line telephone instrument 50A and a mobile unit 32. The call is routed through a first central office 52A, one of a plurality of trunk circuits 24, a first central control station 20A, and a first cell station 26A under the control of the first central control station 20A. At the time that the mobile unit desires to transfer the call to another instrument, the operator of the mobile unit may send a special signal to the first cell station 26A indicating that the call is to be transferred and identifying the telephone number of the transferee instrument.

The command can be sent by the operator of the mobile unit 32 using any of a number of conventional manners, including a brief depression of the telephone hook (i.e., a hook flash) or a separate command button on the telephone instrument followed by the telephone number of the transferee telephone instrument. The request for a call transfer may be forwarded by the cell station 26A to its central control station 20A, at which time the central control station 20A may disconnect the two halves of the telephone call and establish an outward telephone call in the manner described previously.

Figure 13B:
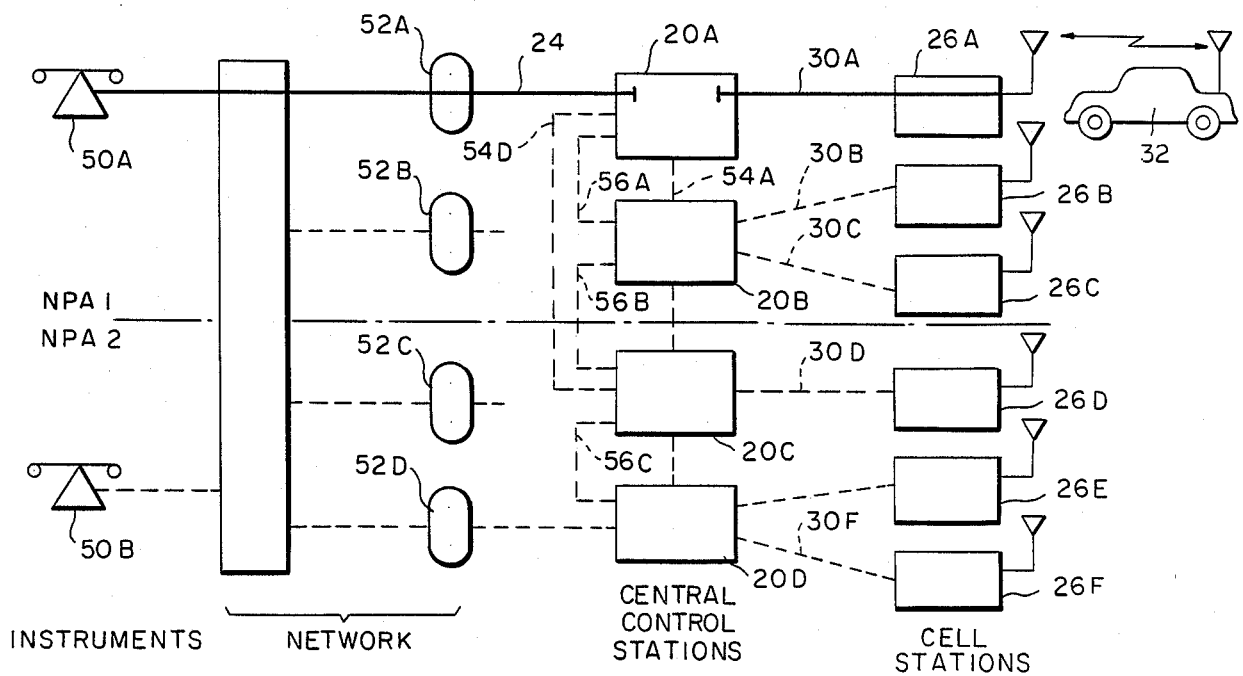
Figure 13C:
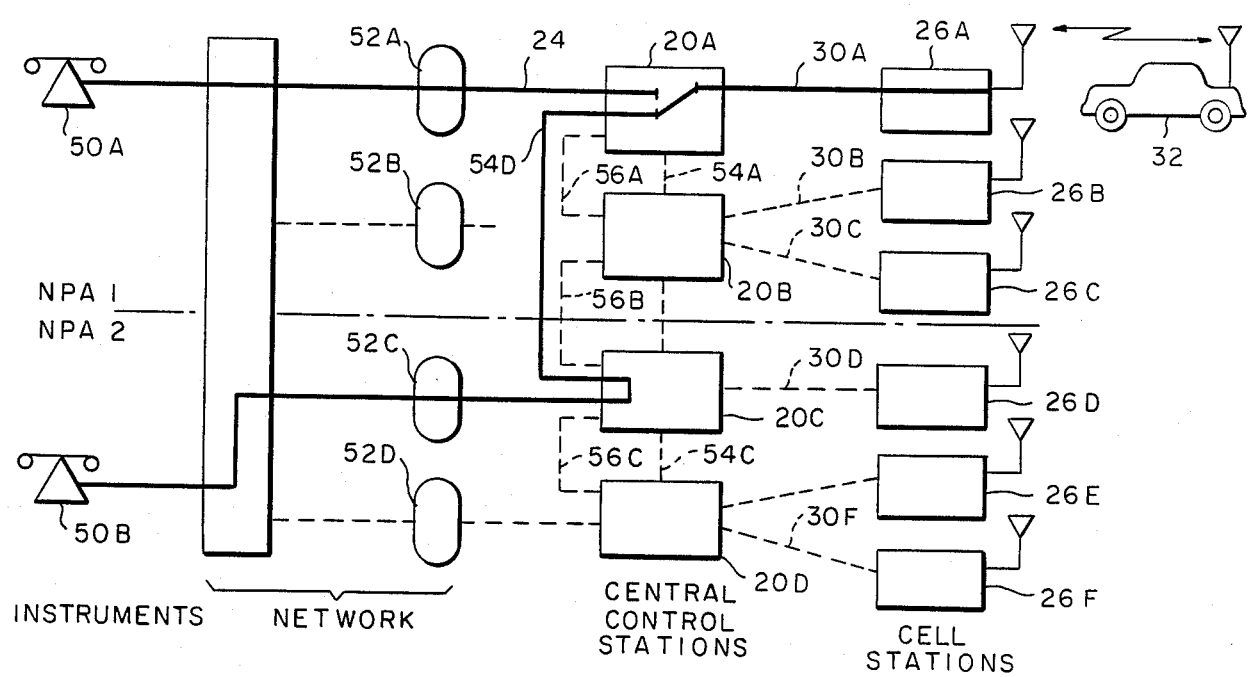
Figure 13D:
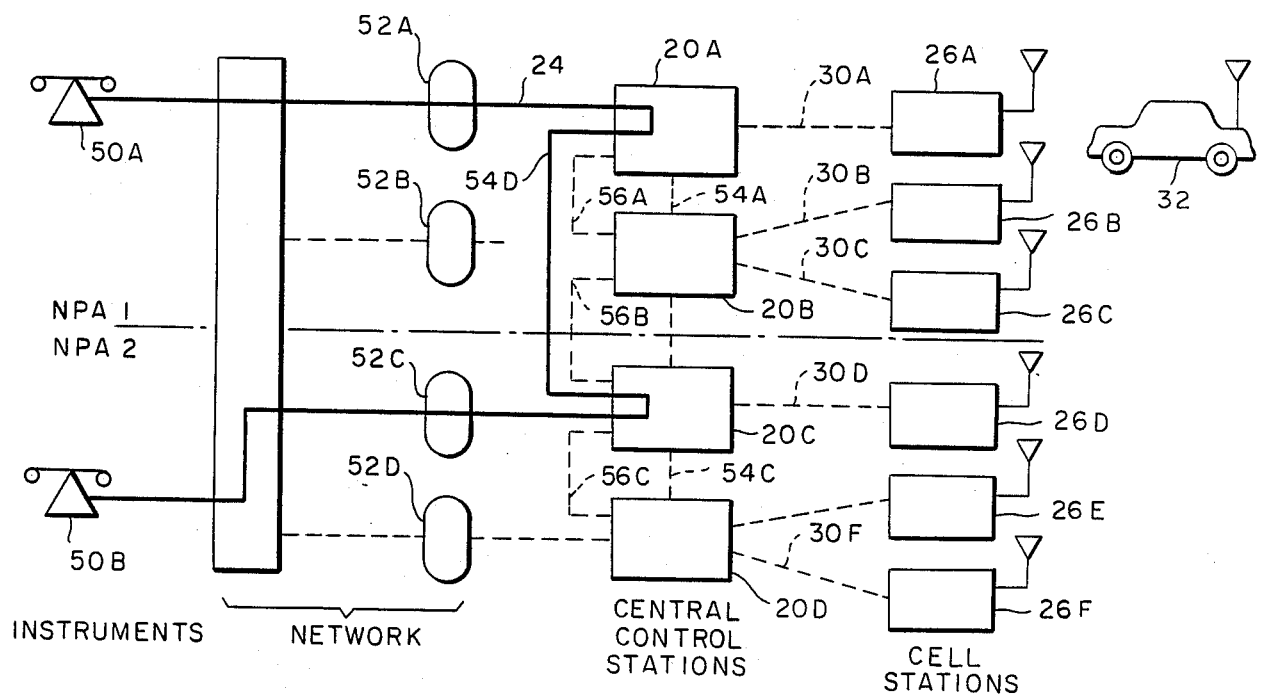

In the system illustrated in the FIGS. 13A-13C, the first central control station 20A seizes one of the interstation trunk circuits 54D which is routed to a second central control station 20C associated with a second central office 52C controlling the transferee instrument 50B. When the communication path has been established between the first central control station 20A and the wireline telephone system 22, the communication path may be connected by the first central control station to enable the operator of the mobile unit 32 to communicate with the transferee instrument 50B. When the transferee instrument 50B is answered by the lifting of its receiver off the hook or otherwise, the mobile unit 32 can communicate with the person at the transferee instrument and announce his intention to transfer the telephone call.

Meanwhile, the communication path from the first wireline instrument 50A remains placed on hold and may be provided with music or a distinctive progress tone by the first central control station 20A to indicate that the transfer is still under way.

When the mobile unit desires to effect the transfer of the call to the second telephone instrument 50A, the mobile unit sends completion message such as a hook flash to indicate that the transfer is to be completed. Once the first cell site 26A has recognized the completion message from the mobile unit 32 and relays that message to the first central control station 20A, the first central control station 20A disconnects the telephone call (idling the voice circuit 30A and the communication channel being used to communicate with the mobile unit 32) and connects the trunk circuit 24 involved in the call to the interstation trunk circuit 54D. This completes the communication path between the first telephone instrument 50A and the second telephone instrument 50B.

Note that the mobile telephone cellular system is now handling a call entirely between two wireline telephone instruments 50A, 50B, and that the telephone call between the two wireline telephone instruments located in differing number plan areas has been placed without incurring toll charges in the wireline telephone system 22.

Figure 14A:
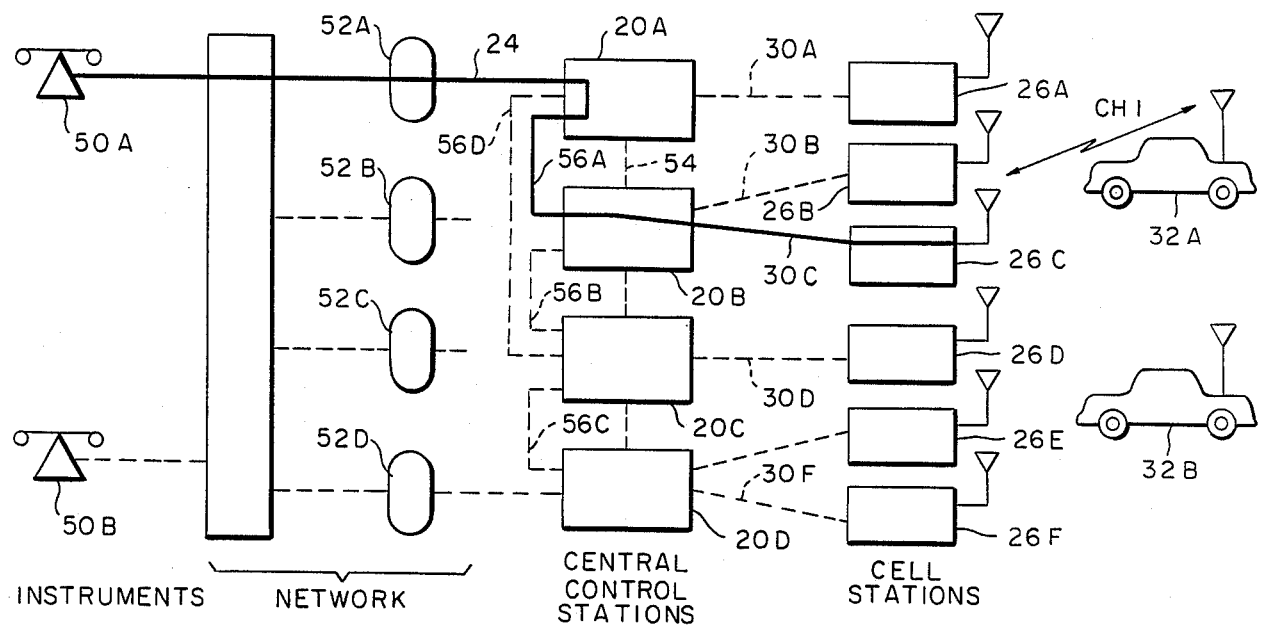
FIGS. 14A-14B are a series of simplified functional block diagrams of the system of FIG. 11A illustrating the communication paths used for conferencing.

The distributed configuration of the system in accordance with the present invention includes the ability to engage more than two telephone instruments in a telephone call simultaneously, i.e., to conduct a conference call. With reference to FIG. 14A, a mobile cellular telephone system is depicted with an ongoing telephone call being conducted between a wireline telephone instrument 50A and a first mobile unit 32A. The communication path for the telephone call includes a first central office 52A, a trunk circuit 24 communicating between the central office 52A and a first central control station 20A, an interstation trunk circuit 56A communicating between the first central control station 20A and a second central control station 20B, a first voice circuit 30C connected between the second central control station 20B and a first cell station 26C, and a first communication channel CH1 carrying the radio communications between the first cell site 26C and the first mobile unit 32A.

If the first mobile unit 32A desires an add an additional telephone instrument to the ongoing telephone call, the user of the mobile unit 32A may indicate his desire to establish a conference call by performing a hook flash or other signalling method, indicating the request for a conference and the telephone number of the telephone instrument to be added to the conference.

Upon detection of the request for conference, the first cell site 26C relays the request to the second central control station 20B which in turn relays the conference request to the first central control station 20A via a data link 54. Preferably, the signals indicating that a conference is desired and identifying the telephone number of the telephone instrument to be added to the telephone call are "out of band" signals so that the ongoing conversation between the first mobile unit 32A and the wireline telephone instrument 50A are not disturbed.

Figure 14B:
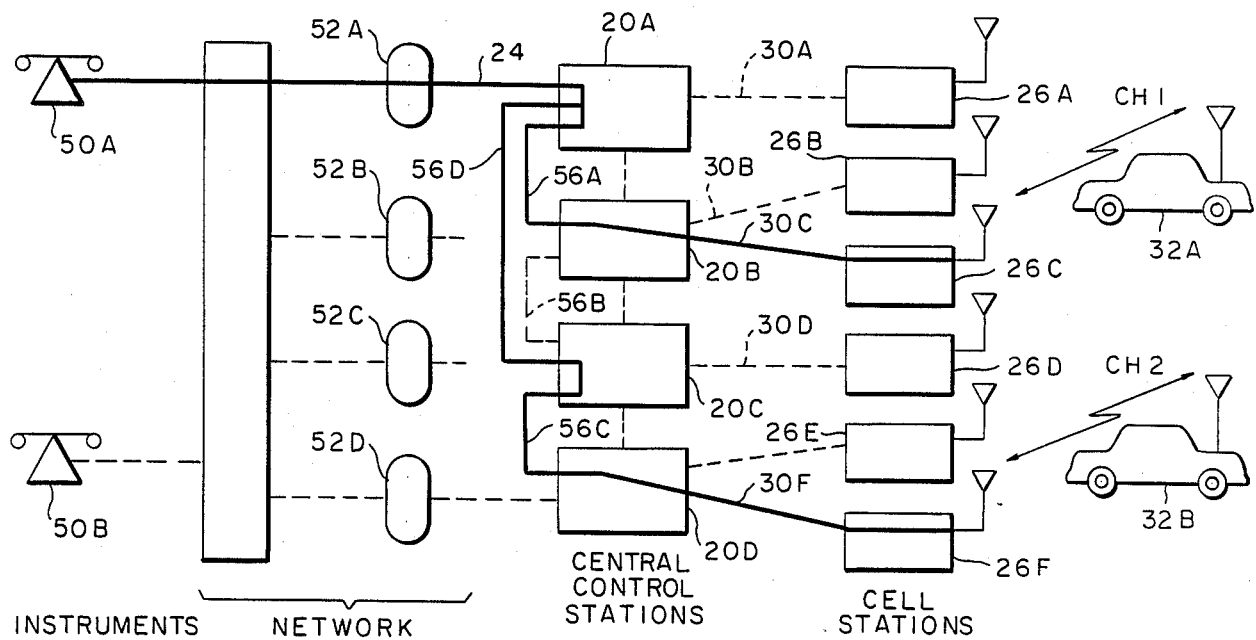

Upon receipt of the conference request, the first central control station 20A examines the telephone number of the party telephone instrument to be added to the telephone call and places a telephone call to the telephone instrument to be added, in the system of FIGS. 14A–14B to a second mobile unit 32B. The call to the second mobile unit 32B from the first central control station 20A may be placed in the manner described above and, as shown in the system of FIG. 14B, is placed through one of the interstation trunk circuits 56D to a third central control station 20D to the second mobile unit 32. Once the telephone call to the second mobile unit 32B has been placed, the first central control station 20A may use one of its conference bridge units to interconnect the communication paths from the first mobile unit 32A, the wireline telephone instrument 50A, and the second mobile unit 32B.

If desired, when the first central control station 10 is notified of the request for a conference call, the first central control station 10 may first place the communication path from the wireline telephone instrument on hold while the added party, the second mobile unit 32B, is dialed and has answered. Additional telephone instruments may be added to the ongoing telephone call by repeating the process described above for each telephone instrument to be added to the call.

During each call, the received signal strength from the mobile unit 32 is constantly monitored by its controlling cell station 26. The cell station 26 attempts to keep the received signal strength level within predefined limits by sending data messages to the mobile unit 32 via the forward voice channel. When the output power limit of the mobile unit has been reached and the signal strength drops below a defined level, the handoff from one cell station 26 to another way be initiated by the central control station 20.

III. CELL STATION DESCRIPTION

Figure 15:
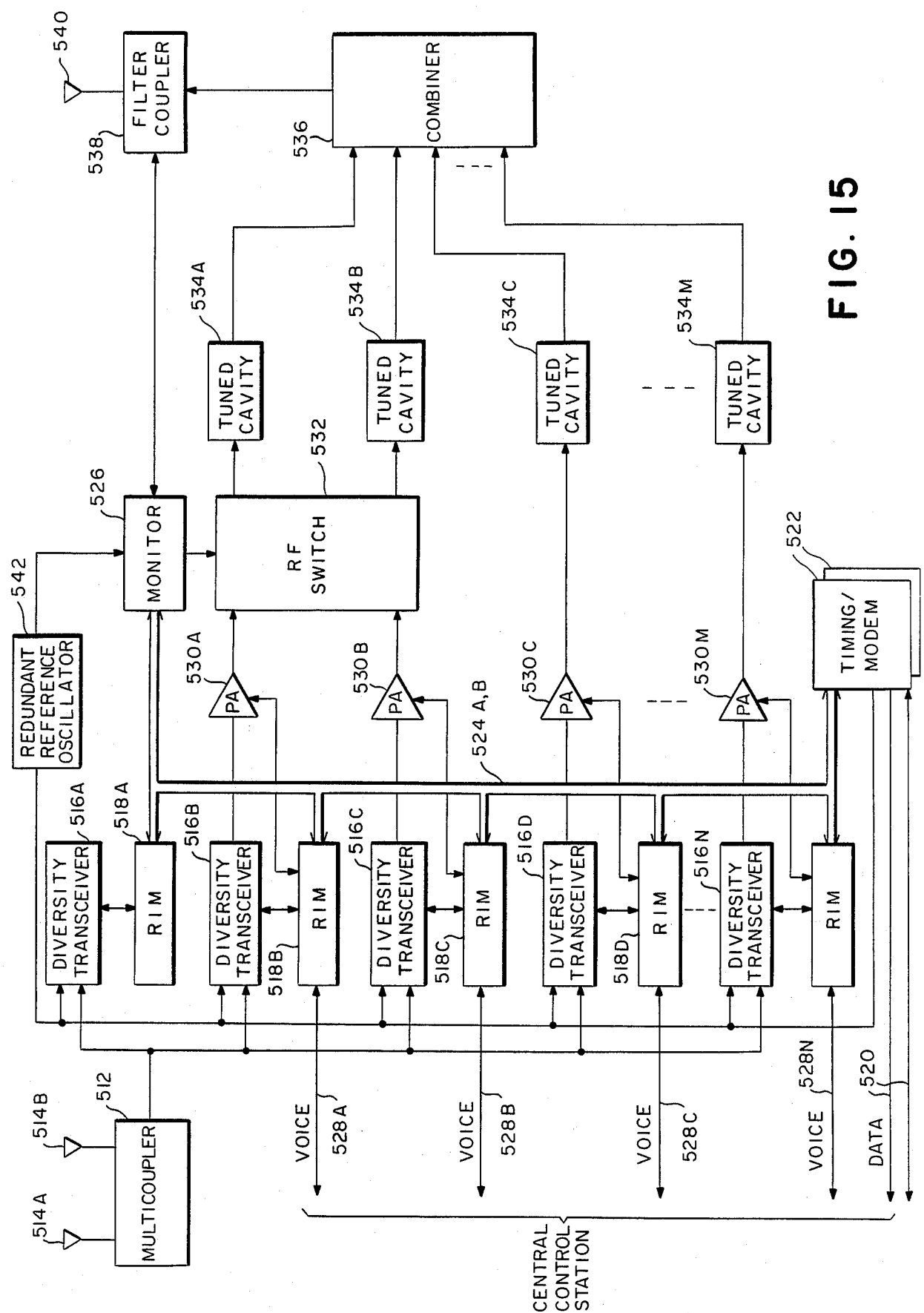
FIG. 15 is a functional block diagram of one embodiment of the cell station of FIG. 1.

FIG. 15 is a block diagram of the cell station 26 of FIG. 1 for use in a cellular mobile radio telephone system. The cell station 26 provides the communication and control functions for processing telephone calls between a central control station and various mobile units operating within the cell station's zone of control.

The cell station 26 includes a plurality of radio frequency communication channels that are involved in setting up and maintaining communications paths between a plurality of mobile units and the central control station, or via the central control station to other mobile units in different zones for control by other cell stations. In the specific embodiment disclosed, the design criteria included up to 64 radio frequency channels; however, it is understood that this arrangement can be used for many numbers of radio frequency channels, depending upon the system requirements.

The arrangement is such that the channel becomes, in itself, an independent operating unit once a communications link is established through a selected radio frequency channel under the control of the central control station. As such, the channel is capable of maintaining the communications path and controlling the flow of communication of data and voice signals without any interaction between the other channels in the cell station, or control by the central control station, except for connection, disconnection, handoff and monitoring purposes.

With reference to FIG. 15, the cell station 26 includes a receiver multicoupler 512 interconnecting a pair of receive antennas 514A and 514B to a plurality of diversity transceivers 516A–516N. The diversity transceivers are well known units having receivers capable of continuously receiving signals from two separate antennas and selecting the strongest of the two signals. Each diversity transceiver 516A–516N is connected to separate radio interface modules (RIMs) 518A–518N that provide the various control functions involved in the operation of each channel.

Data and control signals from the central control station 20 are sent from, and received by, the cell station 26 via a plurality of redundant 4-wire voice grade trunk lines 520. The trunk lines 520 are connected via a pair of redundant timing/modem units 522 to redundant cell station busses 524 for providing data and control signal communications among the central control station 20, various RIM units 518A–518N and a monitor unit 526. Voice communications between the central control station 20 and the cell station 26 are conducted over a plurality of 4-wire telephone voice grade lines 528A–528M, each of which are connected to separate RIMs 518B–518N. Control signal tone and reference clocks are supplied to all RIMs 518A–518N by the timing/modem unit 522.

The transmitter outputs of the diversity transceivers 516B–516N are connected to separate radio frequency power amplifiers 530A–530M. The two power amplifiers 530A and 530B are connected via a radio frequency switch 532 to separate tuned cavities 534A and 534B. The remaining power amplifiers channels 530C–530M may be directly connected to separate tuned cavities 534C–534M. However, it should be understood that only two such direct connections are illustrated for purposes of simplification. The output signals from all of the tuned cavities 534A–534N are coupled via a combiner circuit 536 and a filter coupler 538 to a transmit antenna 450. The cell station 26 also includes a redundant reference oscillator system 542 for providing the timing functions for the cell station 26.

The redundant timing/modem circuits 522 arbitrate between themselves which circuit will be active; the other circuit is inactive and stands by. If needed because of a failure on the active timing/modem circuit 522, the inactive circuit becomes active automatically or upon command from the central control station.

With continued reference to FIG. 15 as previously mentioned, each channel is essentially autonomous and operates under the control of the associated RIM unit 518A–518N that controls all the communications (data and voice) between the central control station 20, the cell station 26 and the mobile units 32. Each RIM 518A–518N has the capability, in response to connection requests from the central control station or mobile unit, to establish or be involved in maintaining a communications connection. The circuits of all the RIM 518A-518N are essentially identical. Each RIM can be commanded to provide one of the specific functions commanded upon receipt of instructions from the central control station 20 via the data and control lines 520, the timing/modem 522, and buss 524.

Each cell station 26 includes at least one combination of diversity transceiver 516A and its associated RIM 518A that is specifically dedicated to operating as a locating channel. The locating function essentially is limited to receiving and measuring the strength of signals from mobile units 32. In response to commands from the central control station 20, the receiver section of the transceiver 516A in the locating channel monitors the radio frequency signal strength being transmitted on a selected frequency and transmits such information, via the RIM 518A, the buss 524, and the modem unit 522 to the central control station 20. As described above, the information regarding signal strength is monitored by the central control station 20 to determine when a handoff is needed and to which cell station handoff should occur in the event a mobile unit is moving between zones controlled by different cell stations.

At least one channel such as that including diversity transceiver 516B and the RIM 518B is downloaded with instructions from the central control station 20 for operation in a mode dedicated to transmitting data between the central control station 20 and the mobile units 32 for the purpose of establishing connections and is called the paging/access or control channel. The term "paging" refers to the operation of calling mobile units for establishing a connection thereto in response to a request from the central control station 20. The term "access" refers to the operation of establishing communication connections to the central control station 20 at a request of a mobile unit 32 by a mobile unit 32 or in response to a "page."

The remaining channels and their diversity transceivers 516C-516N with their associated RIM units 518C-518N are downloaded with instructions from the central control station 20 for operation in the communications mode used in providing voice and data communications connections between the central control station 20 and the mobile units 32 once initial communications between the paging/access channel has been completed and the call transferred to a selected communication channel. Each communication channel then operates to translate the voice and data signals between the central control station 20 and the mobile units by converting the same in the proper format for transmission therebetween. It is understood that the voice signals include all manners communication over a conventional telephone system such as speech, music, tones, and data encoded tones.

The communication channel also monitors the communications path for data signals from the mobile units 32 and the central control station 20 which can designate a change of operations, or request for notification of a call, such as hook switch flash for special features, etc. In addition, each RIM unit 518C-518N, while involved in a communication connection, periodically monitors the strength of the radio signals from the mobile unit 32 communicating therewith to provide the central control station 20 information to determine when a hand-off operation should be initiated.

As illustrated in FIG. 15, the voice channel diversity transceiver 516C and its associated RIM unit 518C and power amplifier 530B are connected to the radio frequency switch 532, so that, in the event there is a fault in the paging/access channel (transceiver 516B, RIM Unit 518B and power amplifier 530A), then, under the control of downloaded instructions from the central control station 20, RIM 518C can be converted from operating as a communication channel to operation as a paging/access channel. Simultaneously therewith, instruction from the central control station 20 will be downloaded to RIM unit 518B to deenergize the transceiver 516B and power amplifier 530A of the access channel. The central control station 20 also send instructions to the monitor unit 526 to provide a switchover signal to the radio frequency switch 532 to connect power amplifier 530B to tuned cavity 534A so that the prior communication channel can now operate on the paging/access channel frequency.

The arrangement of FIG. 15 wherein each channel is controlled by a separate but identical RIM unit allows for an added advantage of local control for each channel. Each RIM unit in response to separate commands from the central control station 20 independently sets up the radio frequency portion of the link (control in the case of RIM unit 518B and communications in case of RIM units 518C-518N) and maintains and monitors the link, including both communications and control signals. The arrangement, in which there is no sharing of control facilities (other than the control channel), allows each call to proceed with minimum delay. Furthermore, in the event of a fault, such fault only impacts the specific channel involved, since each channel essentially operates as an atonimous unit. This is a contrast with other arrangements wherein the control for the set up of the radio frequency link is shared by many channels. In which case a fault in the control will deactivate a plurality of channels or the entire base station unless a redundant control arrangement is provided.

Furthermore, as mentioned above, since each of the RIM units are essentially identical, if the locating channel or the paging access channel have a fault, communications channel can be converted to function as a backup locating or paging an access channel by merely downloading the proper instructions from the central control station 20. Of course, in addition to the advantage of speed of operation, independent control and ease by which functions can be controlled, there is also the added advantage of ease of maintenance since a large number of units are identical in a base station that can be readily substituted for each other, greatly reducing the number of spare parts needed to be kept at hand and thereby further reducing the cost involved in that system.

Figure 16:
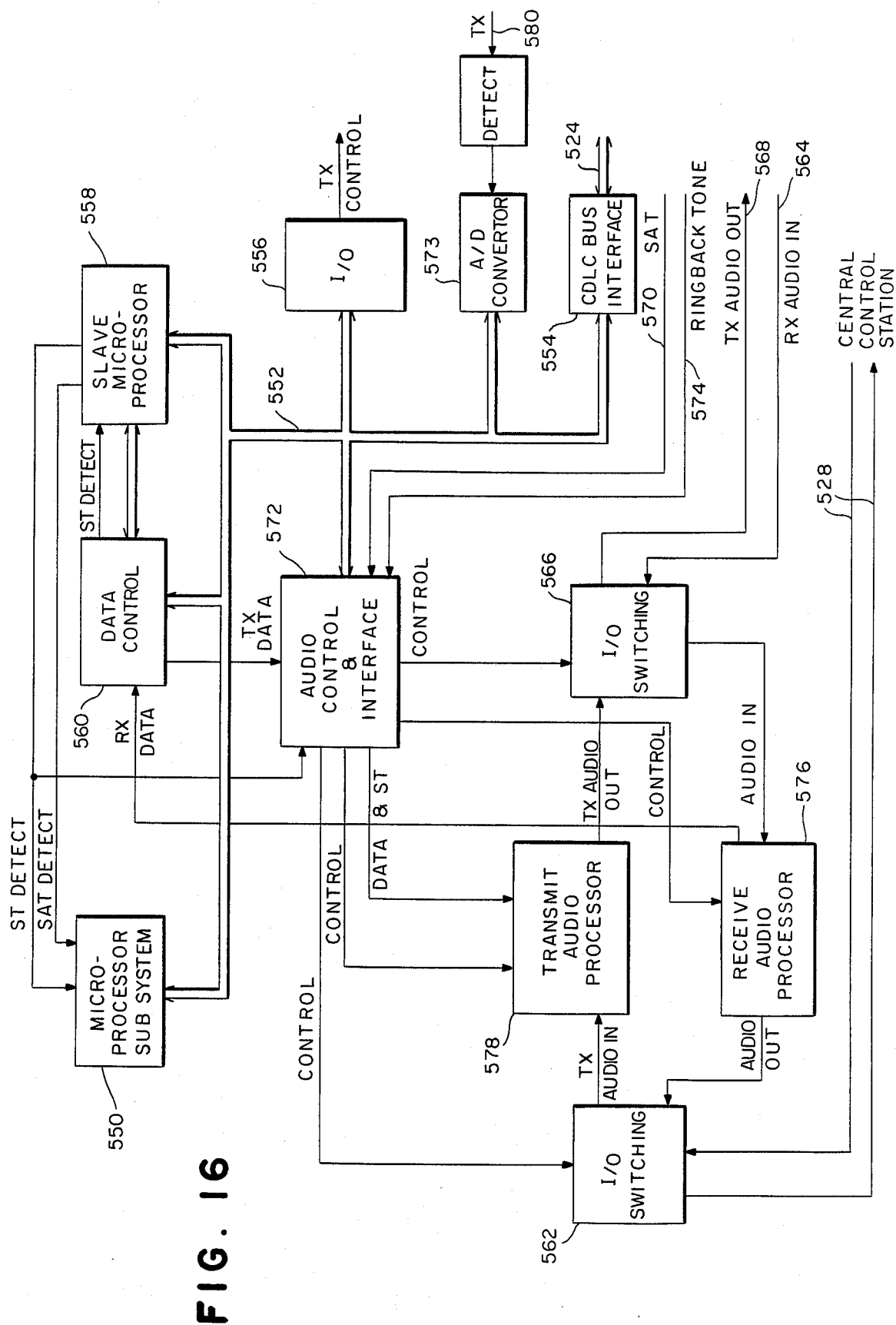
FIG. 16 is a functional block diagram of one embodiment of the RIM of FIG. 15.

With reference to FIG. 16, wherein is depicted a block diagram of one embodiment of the RIM units 518A-518N of FIG. 15, all of the RIM units 518A-518N may be identical and their specific function depends upon instructions that are downloaded from the central control station 20. Each RIM unit 518A-518N includes a digital section (that processes digital signals) and an audio section (that processes audio signals), both under the control of a microprocessor subsystem 550.

The microprocessor subsystem 550 communicates via a bus 552 to the central control station through an interface circuit 554 and the cell station bus 524. The microprocessor subsystem 550 also provides various control signals that are transmitted from the RIM unit via an input/output unit 556 to enable the associated diversity transmitter to key the associated power amplifier, and the other control signals involved in establishing a radio frequency communications path through the equipment associated with a channel.

The microprocessor subsystem 550 also communicates with a slave microprocessor 558 via the bus 552. The microprocessor 550 controls data communications to the mobile units 32 through the slave microprocessor 558. The slave microprocessor circuit 558 operates to control a data control circuit 560 which functions to synchronize the operation of the RIM unit with the signals transmitted by the mobile unit 32, detects the presence of signal tones signifying change in operation and formats all data and signals in proper form for transmission to the mobile unit 32 and the central control station 20.

Audio signals from the central control station 20 are received by the RIM unit over a 4-wire trunk line 528 and applied to an audio input/output switching circuit 562. Audio signals and signal tone signals from the transceiver are applied via a pair of lines 564 to an audio input/output switching circuit 566. Audio signals and signal tone signals to be sent from the RIM unit to the transceiver are provided by the audio input/output switching circuit 566 via TX audio out lines 568. Tone signals received from the transceiver are applied via an SAT line 570 to an audio input/output interface circuit 572, while ringback tone is applied via a ringback tone line 574.

Transceiver receive audio from the audio input/output switching circuit 566 is applied to a receive audio processing circuit 576 and thereafter applied to the audio input/output switching circuit 562 to the receive lines of the 4-wire trunk lines to the central control station 528. Received audio signals from the central control station are applied through the audio input/output 562 to a transmit processing circuit 578 and thereafter transmitted via the audio input/output circuit 566 to the TX audio out lines to the transceiver.

The transmit audio processing circuit 578 and the receive audio processing circuit 576, under the control of the audio control and interface circuit 572 (which in turn is controlled by the microprocessor subsystem 550) function to provide muting, compander and expander functions necessary to process the audio signal in accordance with cellular system specifications. The audio control and interface circuit 572 also provides the transformer amplifier and buffer circuit for efficient transfer of signals between the various circuits and applies central control station signaling tones as control signals to the microprocessor subsystem 550.

With continued reference to FIG. 16, the transceiver receive data (applied to the RIM unit) is received in manchester serial encoded form on RX AUDIO IN lines 564 and is applied through the input/output switching circuit 566 where it is separated from the voice signals and applied to the data control circuit 560. The data control circuit 560 converts the data to parallel digital form and, under the control of the slave microprocessor 558 and the microprocessor subsystem 550, transmits the data to the central control station via the interface circuit 554. The data control circuit 560 also detects signaling tones received from the mobile unit and applies them as control signals to the microprocessor subsystem 550 through the slave microprocessor 558.

The data transmitted from the central control station are received in parallel digital form and are applied to the microprocessor subsystem 550 via interface circuit 554 and bus 552. The data control circuit 560, under the control of the slave microprocessor 558, receive the transmitted data and convert the data to manchester encoded serial form. The encoded serial data is applied to the audio control and interface circuit 572, mixed with signaling tones and voice by the transmit processing circuit 578, and the mixture applied to the transceiver TX AUDIO OUT lines 568 via the input/output switching circuit 566.

The operation of the audio control interface 572 is controlled by the microprocessor subsystem 550 via the bus 552. Signals indicative of the instantaneous power or signal level of the radio frequency signals received by the transceiver from the mobile unit 32 are constantly monitored by a detection circuit 580 and applied to the RIM via an A/D converter circuit 573. The A/D converter circuit 573 provides to the microprocessor subsystem 550 the digital data representing the power or signal level of the signals being received from the mobile unit 32. The microprocessor subsystem 550 transmits such data to the central control station via bus 552 and interface 554 for use in determining when a handoff is appropriate.

Figure 17:
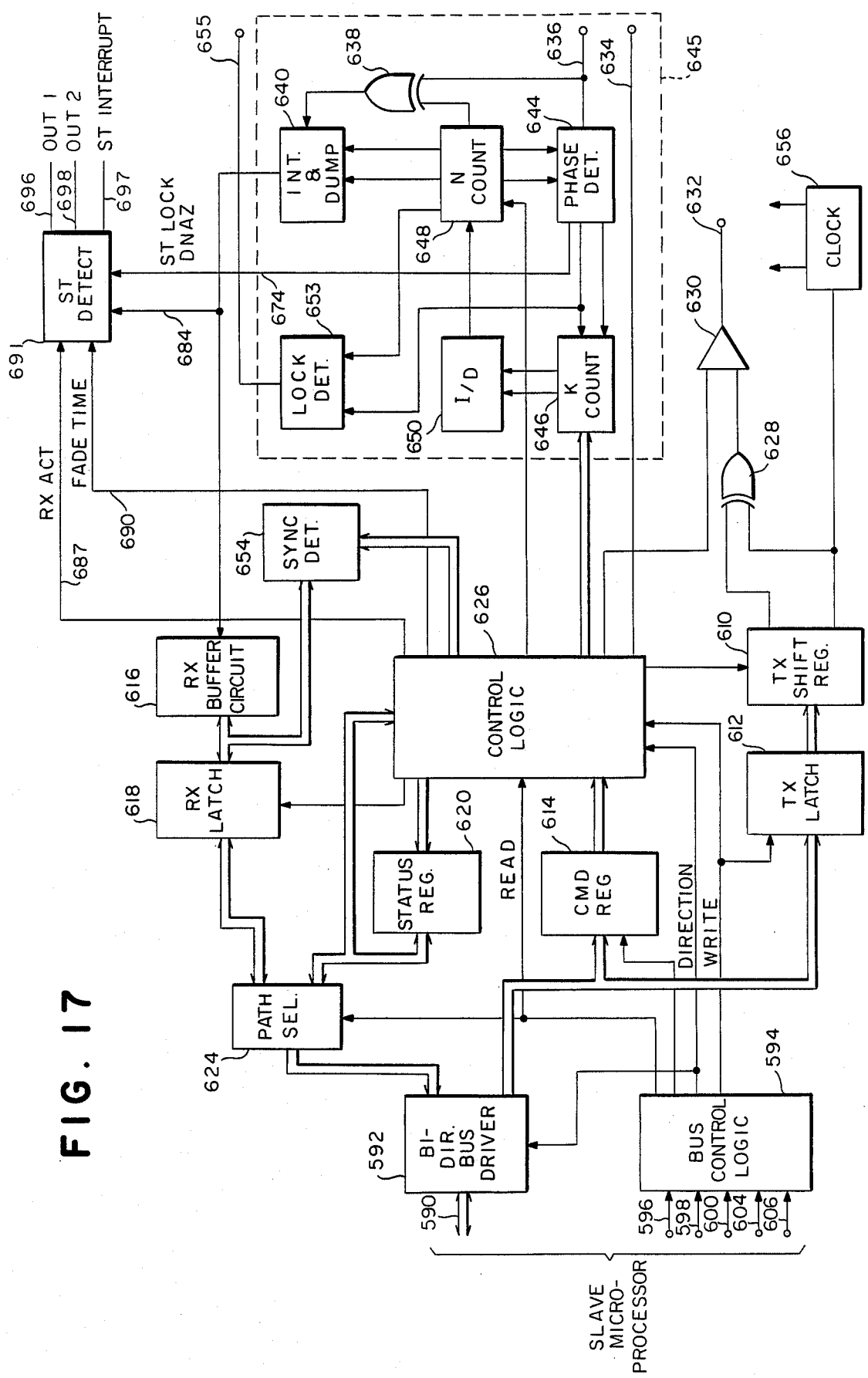
FIG. 17 is a functional block diagram of one embodiment of the data control circuit of FIG. 16.

Reference may be had to FIG. 17 where a block diagram of the data control circuit 560 of FIG. 16 is shown. As previously mentioned, the data control circuit 560 is under the control of the slave microprocessor circuit 558. The data control circuit 560 includes four functional sections, i.e., a processor interface, a data receiver section, a data transmission section, and a signaling tone processing section.

The microprocessor interface section allows for the transfer of data and control words to and from the data control circuit. This is accomplished by a bi-directional bus 590 connected to bi-directional bus driver circuit 592. Various microprocessor bus control signals from the slave microprocessor 558 are applied to a buss control logic circuit 594. The slave microprocesor circuit 554 sends commands to read the status of the data control circuit, controls the operation of the data control circuit, sends transmit commands and data to the data control circuit when data is to be sent out by the slave microprocessor, and sends read commands to the data control circuit when data is to be received by the slave microprocessor circuit 554.

Although the data control circuit 560 is described as part of the RIM unit in a cell station 26, it can be used as well as a control circuit for the control of similar functions required for proper operation of a mobile unit 32. Only a change in the sequence of operation, as required by cellular system specifications, would be needed to modify the data control circuit 560 for use by a mobile unit 32. The major change would be to provide instructions so that the data control circuit 560 would operate to receive signals continuously and transmit signals intermittently, in contrast to a cell station operation in which the data control circuit 560 transmits signals continuously and receives signals intermittently.

The following control signals are received from the slave microprocessor unit 558:

(1) a SELECT signal is applied to a line 596 enabling the data control circuit to read data from, or write data to, the bus 590;

(2) a READ command is applied to a line 598 when data is to be read from the data control circuit;

(3) a WRITE command is applied to a line 600 when data is to be written into the data control circuit;

(4) a RESET signal is applied to a line 602 to reset all the circuitry in the data control circuit;

(5) an ADDRESS signal is applied to a line 606 which selects between (a) sending data to a transmit buffer 610 via a transmit latch circuit 612, or (b) sending data to a command register 614, or (c) reading data from a receiver buffer 616 via a latch circuit 618 and data selector 624, or (d) reading data from a status register 620 via a data selector circuit 624.

A control logic circuit 626 receives command signals from the slave microprocessor 558 via the command register 614. Data to be transmitted to a mobile unit 32 is received from the bidirectional buss driver circuit 592 via a bus 613, the transmit latch 612 and the transmit buffer 610. This data is converted to serial manchester encoded data under the control of the control logic circuit 626 and gates 628 and 630 and applied to an output line 632. Line 632, in turn, is connected to the audio control and interface circuit 572 of FIG. 16 for processing prior to application to the transceiver.

Simultaneously therewith, the control logic circuit 626 applies a transmitter activate signal on line 634. The transmitter activate signal is processed by the slave microprocessor 558 and the microprocessor subsystem 550 to enable both the associated transceiver and power amplifier for operation via the output circuit 556. Received data from a mobile unit is received from the receive processing circuit 576 (FIG. 16) on line 636 and is applied to a clock sync and a data recovery circuit 645. The clock sync and data conversion circuit 645 functions to synchronize the output of recovery circuit 645 with the data rate of the signal of the mobile unit. In addition, the circuit 645, through an exclusive-OR gate 638, also converts the input signal from manchester serial encoded data to serial data.

Synchronization is accomplished by using a variable digital phase lock loop circuit which includes a phase detector 644, a K counter 646, an I/O clock circuit 650 and an N counter circuit 648. The operation of the combination of the K counter 646 and the I/O clock circuit 650 is the digital equivalent of a voltage controlled oscillator of an analog phase lock circuit.

The K counter 646 receives instructions from the control logic circuit 626 via the bus 652 to control the number of counter stages that are to be included in the digital phase lock loop circuit at any time, to thereby control the bandwidth of the phase lock loop circuit. In a specific embodiment, as disclosed, there are two wide acquisition bandwidths (200 Hz) and (100 Hz) and one narrow (4 Hz) tracking bandwidths. The wide bandwidths are used for achieving an initial lock-on to the received signals on line 636. Thereafter the bandwidth is narrowed to provide a more accurate and less noise sensitive tracking system.

The N counter 648, a conjunction with output from the clock circuit 656, controls the center frequency of the phase lock loop. The digital phase lock loop circuit essentially synchronizes and lines up the output of the N counter circuit 648 with the received data signals for proper data detection.

A lock detect circuit 653 receives signals from the N counter 648 and the phase detector 644 and provides an indication on line 655 corresponding to the extent the phase lock loop circuit is properly synchronized to the incoming data signal. A gate 638 receives the input receive signals from the received data terminal 636 and an output from the N counter 648 to convert the data signals from manchester encoded serial form to binary serial form. The output of gate 638 is connected to an intergrate and dump circuit 640 along with signals from the N counter 648 for the integration of noisy data. The received data, in turn, is transferred in serial form via line 662 to the receive buffer circuit 616.

The buffer circuit 616 converts the received serial data into an 18 bit parallel data, 8 selective bits of which are transmitted to the receive latch circuit 618 and 18 bits of which are applied to the sync detect circuit 654. The sync detect circuit 654, under the control of the control logic circuit 626, is used to recognize barker synchronization patterns in the received data to make a determination when valid data is present.

In the command register 614, the bit definitions for controlling the control logic circuit may be as follows:

(1) bit 0 through bit 12—sync select;

(2) bit 3 and bit 4—bandwidth control of the digital phase lock loop for one of three bandwidths;

(3) bit 5—for control the digital phase lock loop bandwidth when receiver is active;

(4) bit 6—provides a sync enable controlling if the receiver can become active or be resynced if it is already active; and (5) bit 7—transmit enable.

The status register 620 bit definitions may define the status of the control logic circuit 626 as follows:

(1) bit 0—receive interrupt signal;

(2) bit 1—transmit interrupt;

(3) bit 2—receive active;

(4) bit 3—transmit active;

(5) bit 4—receiver register load;

(6) bit 5—transmitter register load;

(7) sync latch; and (8) receiver buffer overrun.

In summary, the data control circuit 560 receives from the mobile unit the data, in manchester encoded serial form, to be initially sent to the central control station, becomes synchronized to the data, converts the data to binary serial form, converts the data to parallel form, requires word synchronization by the use of a barker pattern, and converts the data to parallel form for transmission to the slave microprocessor 558 upon command.

The data control circuit 560 reviews data from the slave microprocessor 558 for transmission to a mobile in parallel form which is stored in the transmit shift register 610 via the transmit latch 612. This data, in turn, is converted from parallel form to the manchester encoded serial form.

The operation of the data control circuit 560 is controlled by the instructions written into the command register 614 under the control of the slave microprocessor 558.

The status of the data control circuit 560 is also available to the slave microprocessor 558 at any time upon command from the status register 620.

Figure 18:
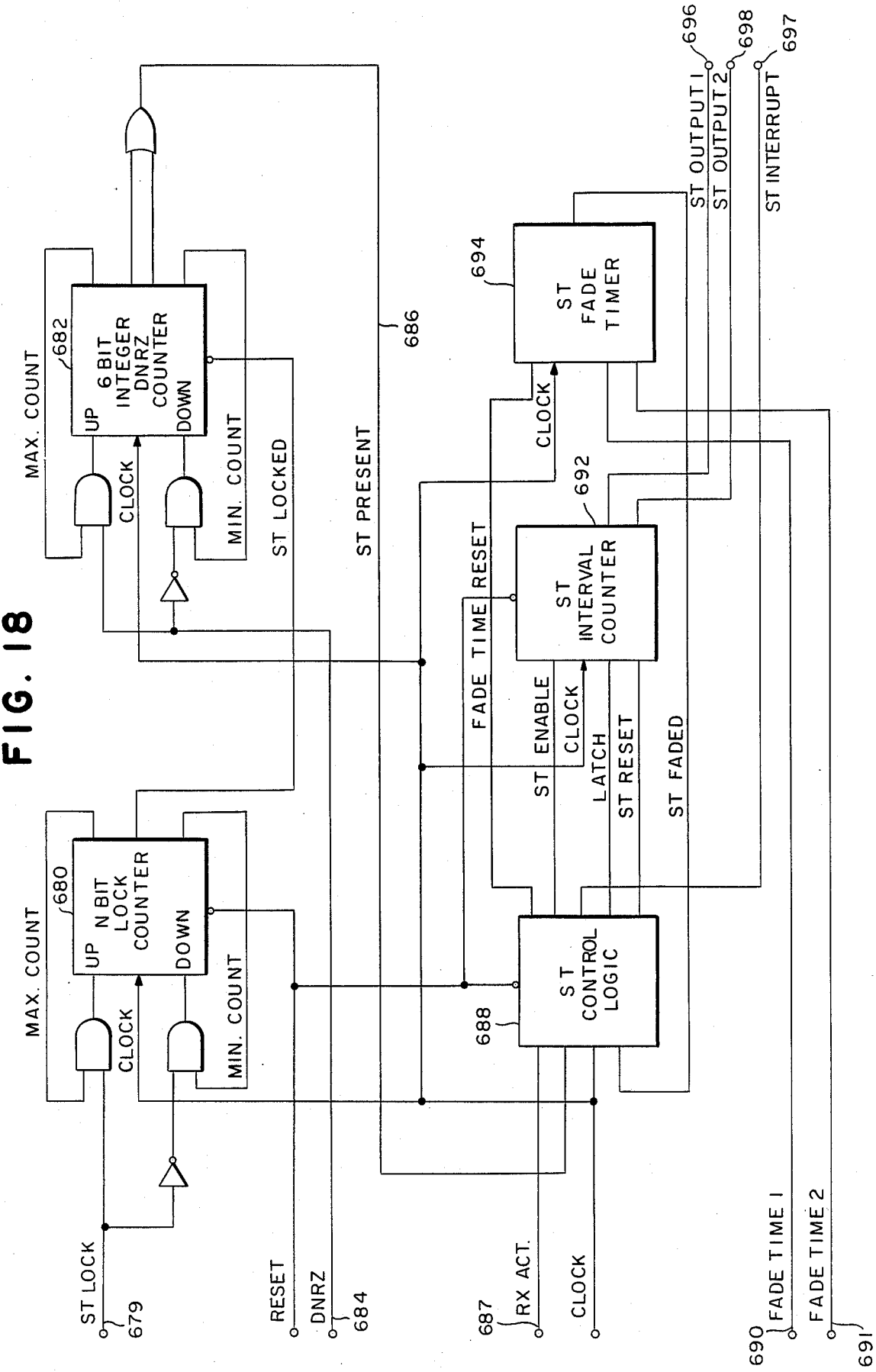
FIG. 18 is a functional block diagram of one embodiment of the signaling tone processing circuit of FIG. 17.

FIG. 18 discloses a block diagram of the signaling tone processing circuit 661 of FIG. 17 used to detect the presence of handoff acknowledge, hook switch flash or disconnect tone bursts, as defined in the standards for cellular mobile telephone systems. The circuit function is to integrate the signaling tone until a fade of a controlled programmed duration is encountered. At this time, the signaling tone interrupt will indicate that signaling tone burst has been received.

4-bit signalling tone lock counter circuit 680 is connected to receive signals from the phase detector 644 of FIG. 17. The 4-bit lock counter circuit integrates the ST lock signal, at which time, it provides an ST LOCKED signal to a 6-bit integer all 1's or 0's counter 682. The serial output data from the integrate and dump circuit 640 of FIG. 17 is applied via line 684 to the all 1's or 0's counter 682, which determines if 12 consecutive 0's or 12 consecutive 1's have been received, indicating the presence of a signal tone. If the signal tone is present, a ST PRESENT signal is transmitted via line 698 to the ST control logic circuit 688.

A ST PRESENT signal on line 686 is applied to the ST control logic 688 indicating that the signaling tone is present at the line 636 of FIG. 17. Fade time input signals FADE TIME 1 and FADE TIME 2 on lines 690 and 691 select the time that the signaling tone is not present at the line 636 before displaying the time that the 10 Khz is present. Fade times are as follows:

| Line 691 | Line 690 | Selected Fade Time (MSEC) |
|---|---|---|
| 0 | 0 | 51.3 |
| 0 | 1 | 102.5 |
| 1 | 0 | 204.9 |
| 1 | 1 | 409.7 |

A signaling tone interrupt signal ST INTERRUPT indicates that the 10 Khz tone burst on line 697 has been detected, timed and that the fade time has expired.

The output signal of ST logic control circuit 688, along with fade time input program signals on line 690 and 691, in conjunction with ST interval timer 692 and the ST fade timer 694, determine the length of the signaling tone. They also provide an indication that a signaling burst has been received and the type of burst that was received as control signals on the pair of lines 696 and 698.

The control signals are provided as follows:

| Terminal 696 | Terminal 698 | 10 Khz Tone Presence (MSEC) |
|---|---|---|
| 0 | 0 | 0–50 |
| 0 | 1 | 50–400 |
| 1 | 1 | 400–1800 |

Figure 19:
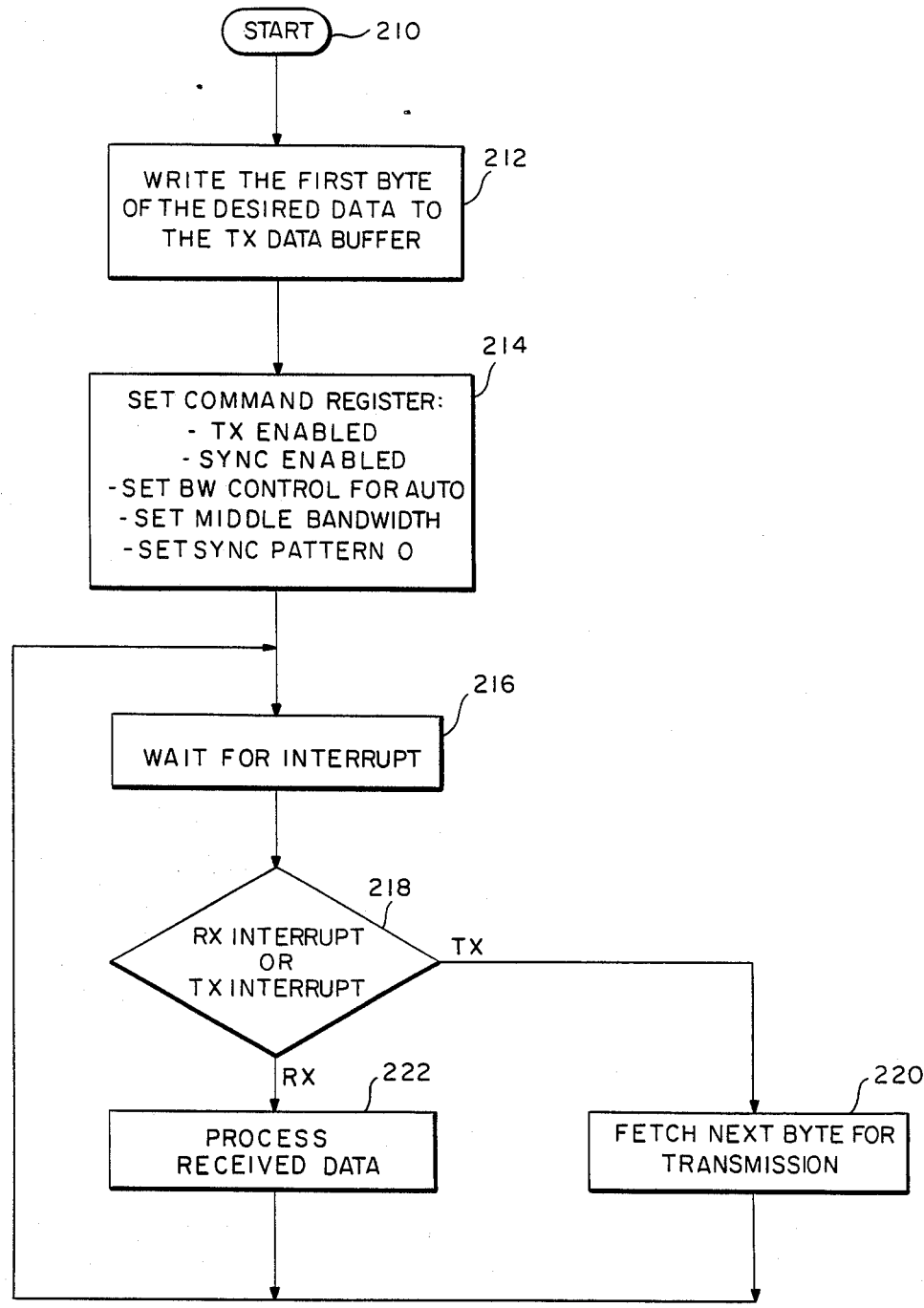
FIGS. 19 and 20 are flow diagrams illustrating the operation of the slave microprocessor of FIG. 16.
Figure 20:
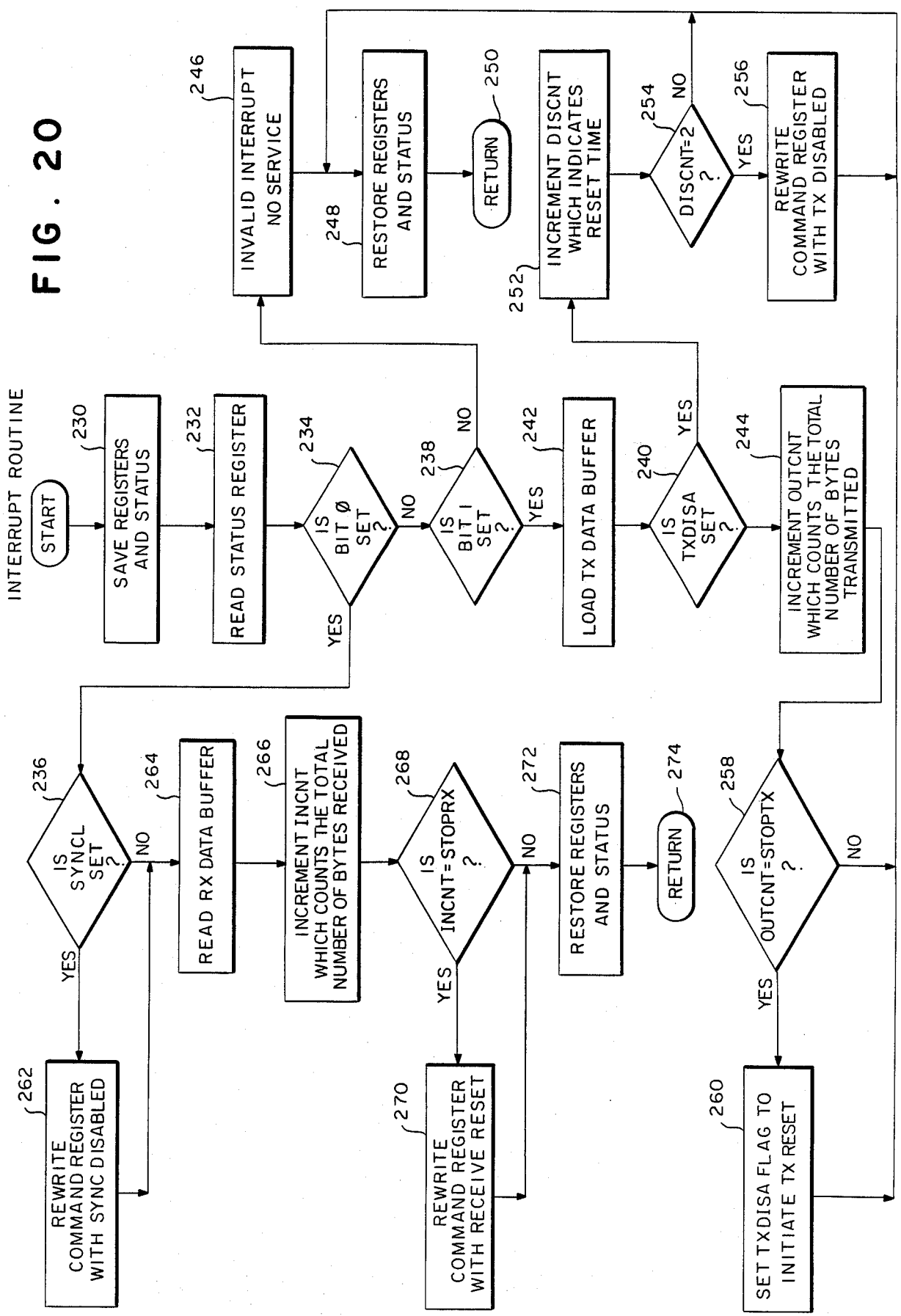

FIGS. 19 and 20 include sample flow diagrams for programs for slave microprocessors 558 with FIG. 19 describing the initialization and main routine.

With reference to FIGS. 19 and 17, the program is started at step 212 by writing the first byte of the desired data into the transmitter shift latch 612 (FIG. 17). Thereafter, the command register 614 is set in step 214 so that the control logic circuit 626: (1) enables the transmitter portion of the associated transceiver, (2) sets the bandwidth control for automatic operation, (3) sets the system for middle bandwidth, and (4) sets the sync pattern to zero.

After a time delay, a check is made for receiver or transmitter interrupt in step 218. If there is a transmit interrupt at step 220, the program fetches the next byte for the transmitter. If there is a receive interrupt, step 222 is conducted to process the received data. Processing from both steps 222 and 220 returns to the wait for interrupt step 216.

The interrupt routine of FIG. 19 starts at step 230 at which data in the registers are saved. Thereafter, in step 232 the status register 620 is read. If in step 234, the bit zero (0) of the status register 620 is set, the program is branched to the step 236 to determine if SYNCL is set. If in step 234 the bit zero (0) is not set, the program moves to step 238. If bit one is not set, the program branches to step 246 indicating that the interrupt is invalid wherein the program step 248 restores all the registers and proceeds to the return step 250. On the other hand, if in step 238 bit one (1) was not set, the program proceeds to load the transmitter shift register 610.

In the following step 240, a determination is made if the TXDISA (Transmit disable) flag is set. If the signal is set, the program branches to step 252 to increment DISCNT (Disable counter), which allows two transmit interrupts before disabling the transmitter, and thereafter proceeds to step 254 determine if DISCNT equals two (2). If not, the program is branched back to step 248, and if "yes", the program proceeds to step 256 to rewrite the command register with the transmitter disabled and thereafter proceeds back to step 248.

If in step 240 the TXDISA is not set, then the program proceeds to step 244 in which the OUTCNT is incremented to count the number bytes transmitted, and thereafter a decision is made in step 258 if OUTCNT equals STOPTX, a counter indicating the end of the transmission. If not, processing from step 258 proceeds back to step 248. If it does, the program proceeds to step 260 at which TXDISA flag is set to initiate a transmitter reset, and then the program proceeds back to step 248.

If bit 0 was set in step 234, then the SYNCL signal is examined in step 236. If the SYNCL signal is set, a selected bit pattern has been detected and the program proceeds to step 262 to rewrite the command register 114 with the sync disabled, and then proceeds on to step 264. If in step 236 the SYNCL signal is not set the program proceeds directly to step 264 where the receiver data register 616 is read. Thereafter, the program proceeds to step 266 to increment INCNT, which counts the total number of bytes received. A decision is made in step 236; is INCNT equal to STOPRX? If "yes", the program proceeds to step 270 and rewrites the command register 614 with receive reset and then proceeds on to step 272. If in step 268 the result is "no", the program proceeds directly to step 272 which restores the registers in status and then proceeds to the return step 274.

Figure 21:
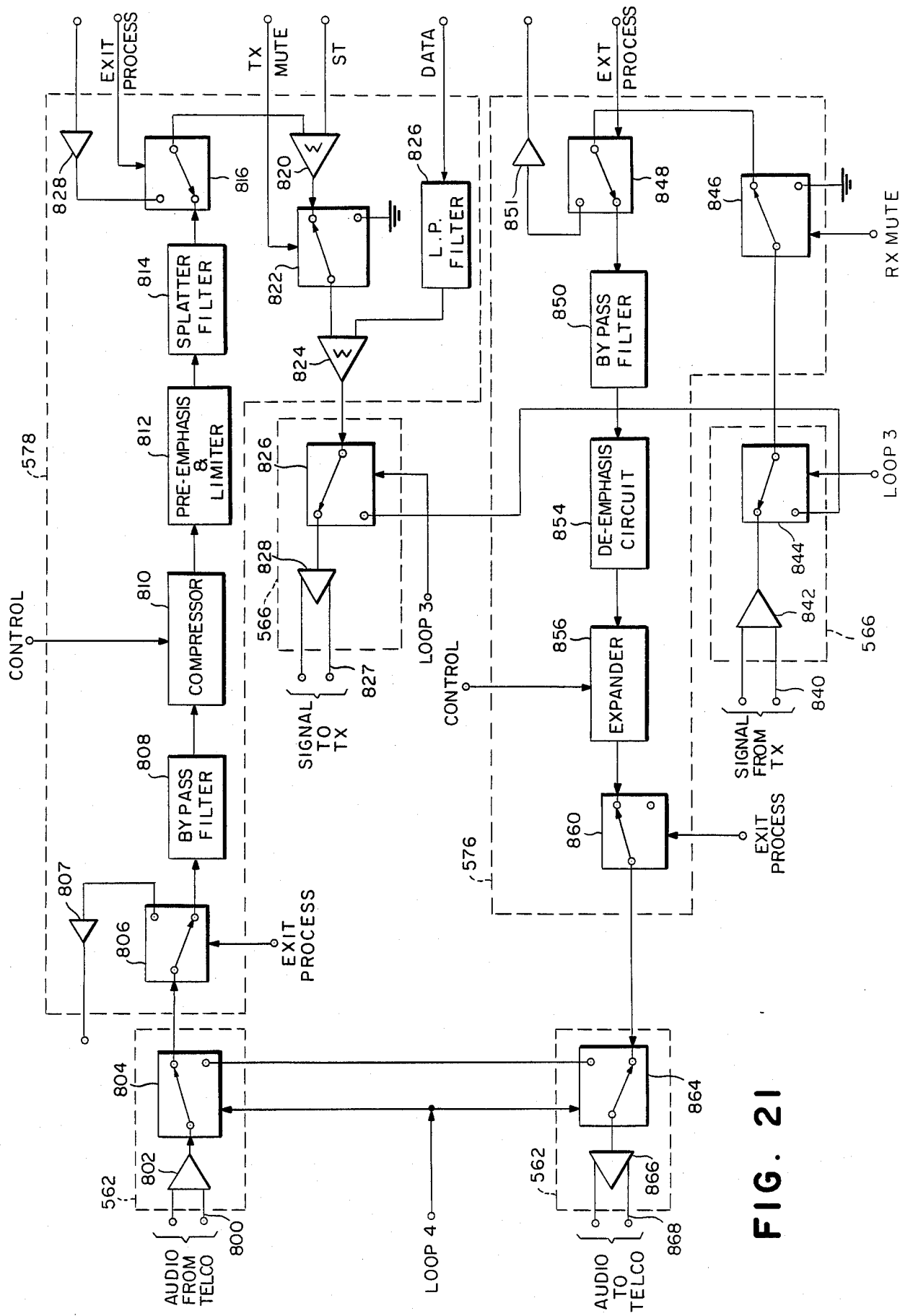
FIG. 21 is an expanded functional block diagram of the transmit and receive audio processors and the I/O circuit of FIG. 16.

FIG. 21 includes an expanded block diagram of the transmitter processor 578, the receiver processor 576, the input/output circuit 566, and the input/output circuit 562 of FIG. 16. All switches are set in the normal operating condition. Audio signals from the central control station are applied via the balance lines 800 through a balance line receiver 802 to a loop around switch 804.

The audio signal is then applied to an external process switch 806. The other input of the switch 806 is connected to the input terminal of a unity gain amplifier 807 used in external signal processing. The audio signal is processed by a bandpass filter 808, a compandor circuit 810, a pre-emphasis and deviation limiter circuit 812 and a splatter filter 814 and applied to a second external process switch 816. The second input of the switch 816 is connected to a unity-gain amplifier 818 for use with external signal processing along with amplifier 807. The output terminal of the switch 816 is connected to an input circuit of a summing circuit 820 for summing the audio signal with signal tone, and then transmitted through a transmitter mute switch 822 to a second summing circuit 824 for summing the combined audio and signalling tone signal with a data signal received from a low pass filter 826. The output of the mixer 824 is applied via a loop 3 switch 826 to a balanced line driver 828 which is connected to the transmitter signal input lines 827.

Received signals from the transceiver are applied via balanced lines 840 to a balanced line receiver 842, which in turn applies the signals to a loop 3 switch 844. A second input to the loop switch 844 is connected to the output terminal of the loop switch 826. The output from the switch 844 is applied via a receive mute switch 846 through an external processing switch 848 to a bypass filter 850. The second input of the external bypass switch 848 is connected to a unity gain buffer 852 for use with external signal processing.

The output signal from the switch 848 is processed by the bypass filter 850, and applied to de-emphasis circuit 854 and an expander circuit 856, the output of which is connected to an external process switch 860. The other input of the external process switch 860 is connected to a unity-gain amplifier 862 for external processing along with buffer 812. The output from the external processing switch 860 is applied via a loop 4 switch 864 and a balanced line driver 866 providing the signals to the central control station 20 via lines 868.

Under normal operating conditions, audio signals from the central control station 20 are received by a balanced line receiver 802 and are transmitted by the balanced line receiver 802, filtered, companded, modified in accordance with the pre-emphasis and limiter circuit, filtered, mixed with the signal tone input and data, and transmitted via the balanced line driver 828 to the transceiver audio signal input. In the event that the compressor 810 function is to be modified, or eliminated, a control signal is applied thereto from the audio control and interface circuit 572 of FIG. 16.

Received signals from the transceiver are transmitted by the balanced line receiver 842, filtered, de-emphasized, expanded and applied via the balanced line driver 866 to the transmit input lines 868 to the central control station 20. In the event that the effect of the expander circuit 856 is to be modified, or bypassed, a control signal is applied thereto from the audio and interface and control circuit 572 (FIG. 16).

With continued reference to FIG. 21, a transmitter and/or receiver mute test can be achieved by applying switching signals to switches 822 and/or 846 from the audio control interface circuit 572. Should the receiver and/or transmitter processing function be accomplished by external means, the pairs of switches 806 and 816 for the transmit processing circuit, and/or the switchs 848 and 860 for the receive processor circuit, can be actuated in pairs or all simultaneously, to allow the processing to be accomplished by input circuits via the unity-gain amplifiers 805 and 828 for the transmit processor, and amplifiers 852 and 862 for the receive processor.

In addition for a loop back test, a signal can be sent on the line 870 to actuate the switches 804 and 864 simultaneously which allows the signal received from the central control station 20 on lines 800 to be fed back via the balanced driver 866 to the central control station 20 to test the operation of the system between the central control station 20 and the input/output circuits 562 and 566.

Thereafter, as a further loop test, the loop 3 switches 826 and 834 can be actuated simultaneously allowing the output of the mixer circuit 824 to be connected to the input circuit of the switch 846, resulting in the transmission of the telephone audio signals through the transmit processing circuit and through the receive processing circuit to allow a separate test of the transmit and receive processing circuits 578 and 576.

Figure 28:
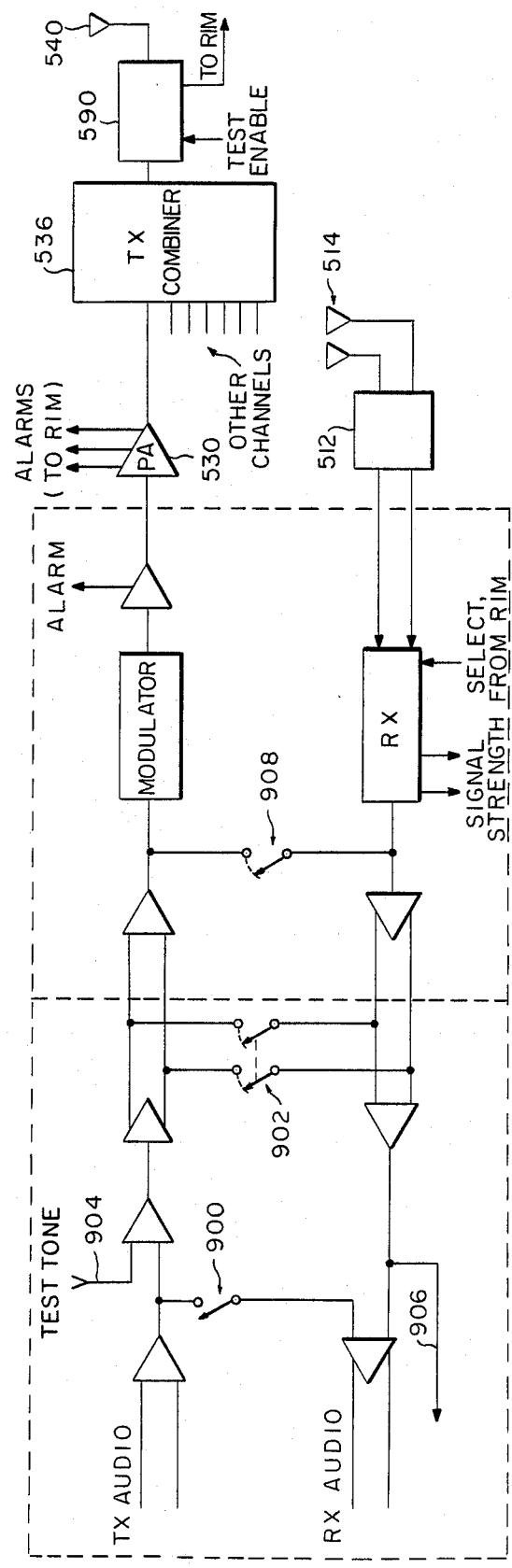
FIG. 28 is a simplified functional block diagram of one embodiment of the test circuitry of the cell stations of FIG. 15.

Because a mobile radio telephone system includes elements which are physically remote from each other, and may be many miles distant from each other, the ability to remotely test the elements of the system to provide an indication of element failure and to isolate the failure prior to sending repair crews, may be of considerable advantage. The system of the present invention includes numerous tests, which may be executed automatically and/or upon command. With reference to FIG. 28 wherein is shown a simplified functional block diagram of certain portions of a cell station, loop around circuits may be included to test the various elements of the system. A RIM unit 518 may include two loop around switches 900, 902 both of which return the signal on the transmit audio path to the receive audio path. The first loop around switch 900 returns the transmit audio signal to the receive signal path via the loop around switch 900. When the looped around receive signal is received at the central control station 20, the control station 20 may examine the signal to determine whether or not the system is complete and functioning between the central control station 20 and the RIM 518. Additionally, the RIM 518 contains the second loop around switch 902 which may be used to further isolate malfunctions occurring between the central control station 20 and the RIM 518. The RIM unit 518 contains a test tone 904 which may be injected into the transmit voice path at the RIM 518 and looped around by the second loop around switch 902 to the receive path and returned to the central control station 20. By testing for the presence of an accurate test tone, the central control station 20 can isolate a malfunction to either the transmit or receive circuitry between the central control station 20 and the RIM unit 518.

The malfunction isolation can be assisted by the use of a test point which is located in the RIM unit 518 on the receive path and returned to the central control station 20 by test point lead 906.

The system may be further tested by a third loop around switch 908 contained within the transceiver 516. By selective operation of the third loop around switch 908, the audio circuitry can be tested using test tones generated either by the test tone circuit 904 of the RIM unit 518 or by the central control station 20. In either case, the test tone can be looped back to the receive circuitry through the third loop around switch 908. Again, the central control station 20 is able to isolate a fault in the audio circuitry by use of the test tones, the third loop around 908 and the test point 906. The central control station 20 is also able to invoke a fourth loop around test through the radio frequency link as explained in more detail below.

The RIM unit 518 and the transceiver 516 have been designed to have numerous automatic verification and alarm generators to allow early detection of failures within the system. For example, each power amplifier 530 contains circuitry which monitors the temperature of the unit, the forward power and the reflected power of the transmitted signal. If any of these parameters exceed or fall below the predetermined limits, an alarm signal is sent to the RIM unit 518 for relay to the central control station 20. The exciter of the transceiver 516, similarly, contains circuitry for detecting whether or not the power output from the exciter is above or below predetermined limits and for signalling an alarm to the RIM unit 518 if the limits are exceeded.

Figure 6:
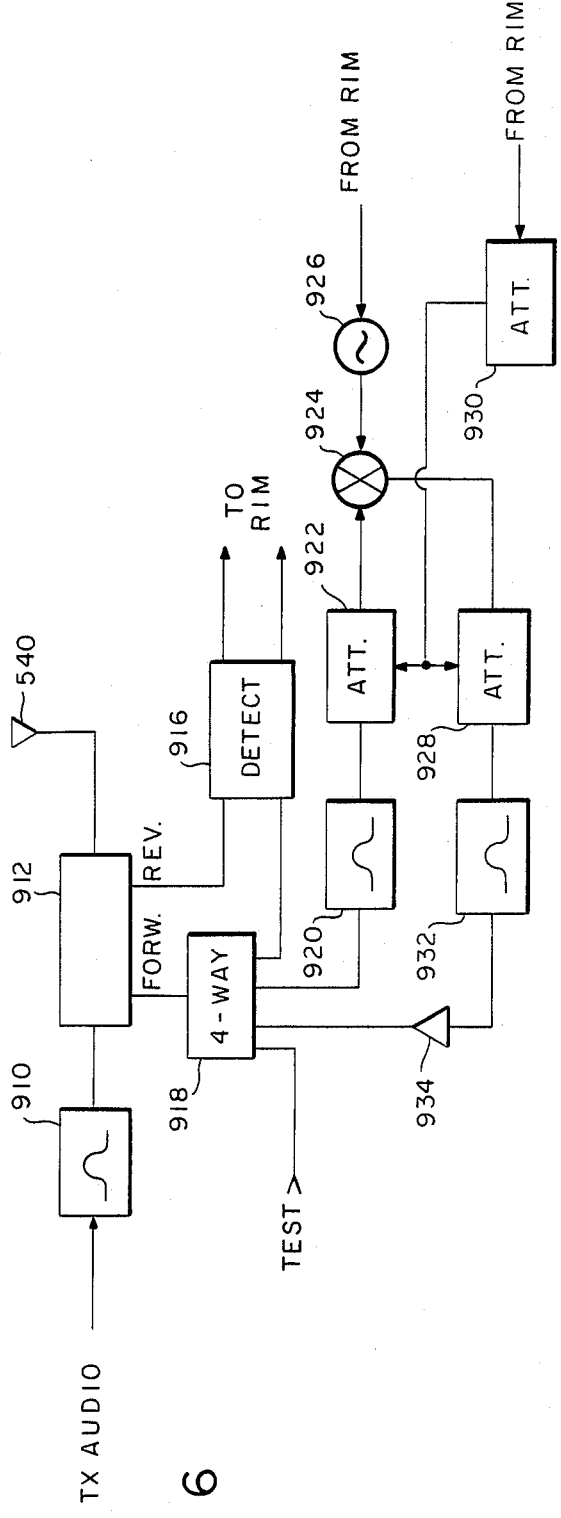
FIG. 6 is a functional block diagram of one embodiment of the filter-coupler of FIG. 5.

With reference to FIG. 6, the filter coupler 538 performs two functions, i.e., band pass filtering by a filter unit 910 and diagnostic testing using a directional coupler 912. The band pass filtering accomplished by band pass filter circuit 910 ensures the purity of the transmitted RF signals on the channels. The second function, diagnostic testing using the directional coupler 912, uses diagnostic routines at the central control station 20 and signals sent from the central control station 20 through the monitor 526 (FIG. 15) to conduct tests over the radio frequency link. The directional coupler 912 provides measurement of both the forward and reflected signals of the signal transmitted by the antenna. The measured reflected signal is sented via a lead 914 to a detection circuit 916 which provides DC signals in the range of 0–5 volts which are proportional to the radio frequency reflected energy from the antenna and its lead line. The measured forward signal from the directional coupler 912 is split by a four-way splitter 918 into four equal radio signals. The first split signal is processed through the detector circuit 916 and converted to a voltage range, similarly to the reflected signal. The second split signal provides a test port for examining or injecting signals on the transmit antenna feed line. The two remaining split signals are used to perform an RF loop around function. The third split signal is filtered by a band pass filter 920 and the filtered signal is attenuated by attenuator 922 and provided to a mixer 924. Additionally, the output of an oscillator 926 is applied to the mixer 924 and the output of the mixer 924 is applied to a second attenuator 928. The level of attenuation of attenuators 922 and 928 may be controlled by an attenuator driver 930 to two or more different attenuation levels. The output of the second attenuator 928 is provided via a band pass filter 932 and an amplifier 934 to the second port of the four way splitter.

In operation, a forward transmit signal is detected by the detector 912 and split by the four way splitter 918 and applied via the band pass filter 920 and attenuator 922 to the mixer 924. By mixing the forward transmit signal with the output signal from the oscillator, a signal which is 120 khz away from the receive frequency of the channel is generated. This signal is fed through the second attenuator 928, band pass filter 932, and amplifier 934 back to the four way splitter 918 and from the splitter back to the coupler 912 onto the transmit antenna feed line. The modified signal is then transmitted by the transmit antenna 540 and is received on the nearby cell site receive antennas 514 into the receive system of the cell station.

During the set up of a cell station, the two attenuation levels of the attenuation driver 530 may be alternately be set and a test of circuit conducted. If a known signal is supplied by the central control station 20 for transmission through the transmit antenna and the loop circuitry energized, a baseline reading of received signal strength along with readings of forward and reflected signal strengths may be detected by the receiver section of the cell station and transmitted to the central control station 20. During actual operation of the system, when it becomes necessary to check the operational level of the radio frequency system or to diagnose/isolate a failure, the test circuitry may be commanded to activate and measurements of the received signals can be compared with the baseline measurements. By using this loop around radio frequency test, any of the channels at the cell station may be tested to verify its performance.

IV. MOBILE UNIT DESCRIPTION

A preferred embodiment of the mobileunit 32 of the system of FIG. 1 is illustrated and described hereinafter in connection with FIGS. 22–27.

Figure 22:
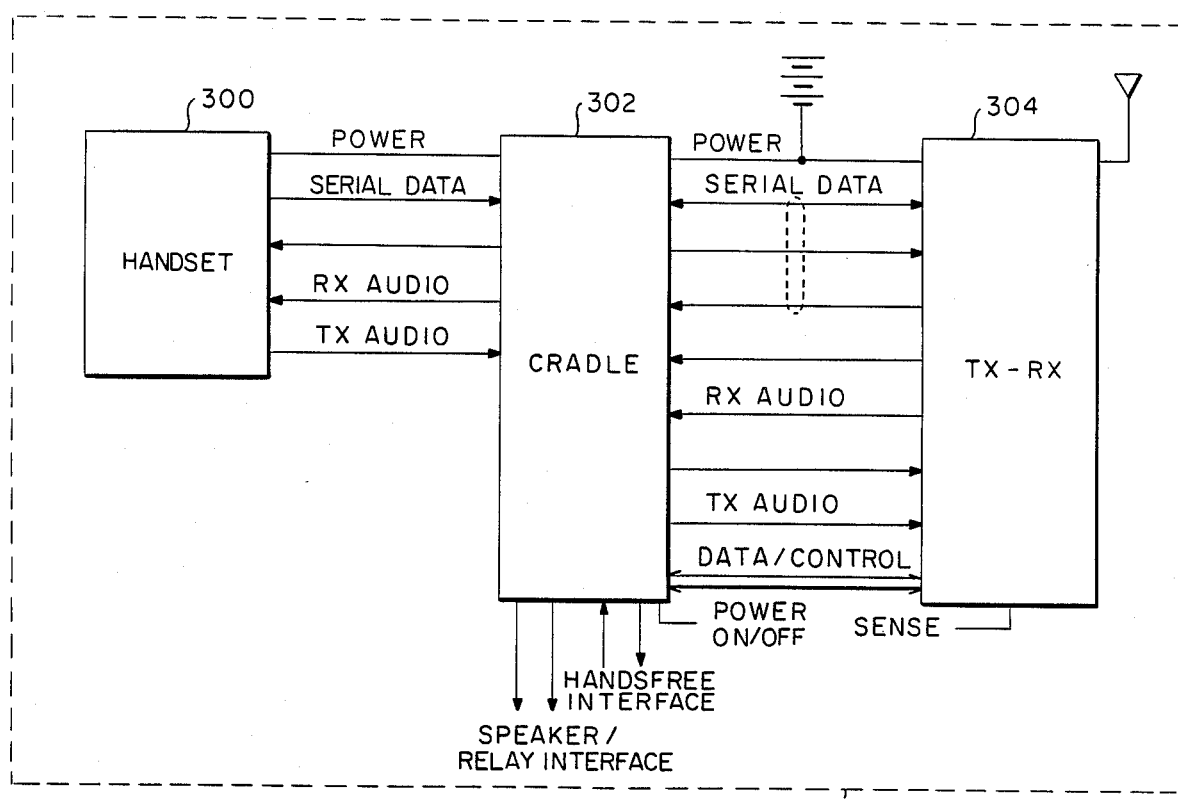
FIG. 22 is a functional block diagram of one embodiment of the mobile unit of FIG. 1.

With reference to FIG. 22, each mobile unit 32 includes a handset 300, a cradle 302 and an RF transmitter/receiver or transceiver 304. The handset 300, as further explained below, permits the keying of certain information by the user of the mobile unit 32 and provides a terminus for the audio signal forming a telephone call and for displaying certain status information to the mobile unit user. The transceiver 304 receives and broadcasts voice signals and encoded messages at the appropriate frequencies of the plurality of communication channels. The cradle 302 serves as an intermediary between the handset 300 and the transceiver 304, formatting signals to be broadcast by the encoded message portions of the transceiver, providing adjustment for the audio signals being sent to and from the handset and providing interface to optional devices to be used with the mobile unit, such as a unit for conducting hands free communications and/or for remote signalling of an incoming telephone call.

The cradle 302 connects to the transceiver 304 for power, data/control and audio signals. The handset 300, powered from the cradle 302, contains the receive audio earpiece 330 and transmit audio microphone 328 and audio amplifying circuits. The handset 300 sends keypad data to the cradle 302 and receives data for display from the cradle 302.

Figure 23:
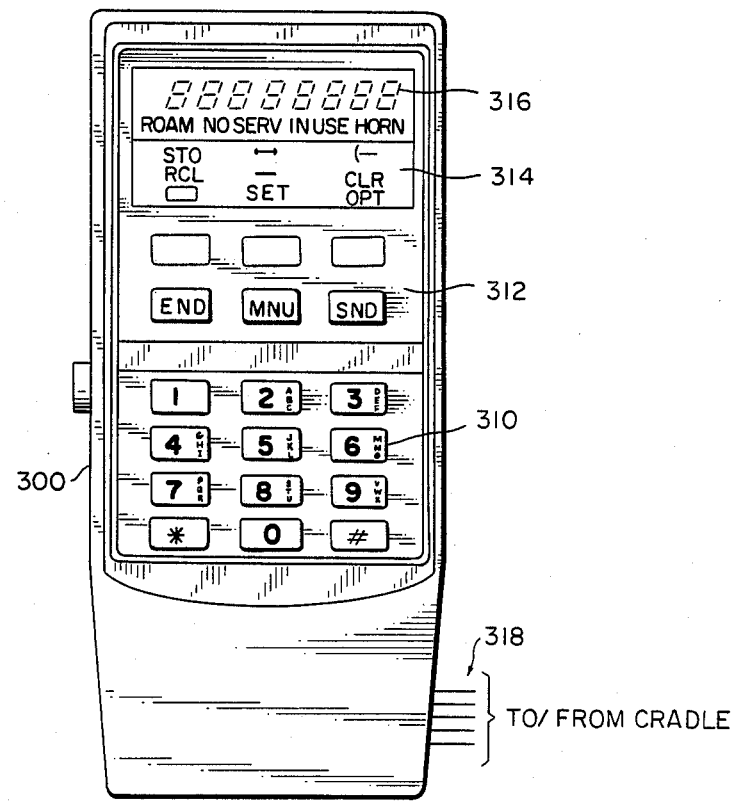
FIG. 23 is a pictorial representation of the exterior of the handset of FIG. 22.

Refer to FIG. 23 for a pictorial representation of an embodiment of the handset of FIG. 22. The handset 300 may include a keyset or keyboard 310, plural funcion keys 312, a plurality of function indicators 314, an indicator panel 316 comprising a plurality of variable disply digits, and an interface cord 318 (a) to carry power from the cradle 302 and to the cradle (b) to carry communication lines for the transmission of both serial digital data signals and voice communication signals between the handset 300 and the cradle 302. A microphone and earpiece, not shown, for the receipt and origination of audio signals, are also included within the handset 300.

The function indicators 314 may be activated to show the current function or status. By use of conventional switch/selection circuitry, one or more of the functions indicators 314 may be illuminated simultaneously. The lighting of the function indicators may be controlled by a microprocessor circuit whereby the selection of a particular function indicator to be illuminated is determined by the status of the mobile unit 32 and a normal sequence of operating the mobile unit 32. For example, when the mobile unit 32 is being turned off, a function indicator 314 depicting a key may be illuminated to remind the mobile unit user to lock the unit 32 and to save the user one or more steps in establishing the mobile unit in a correct condition to accept a command to lock.

Figure 24:
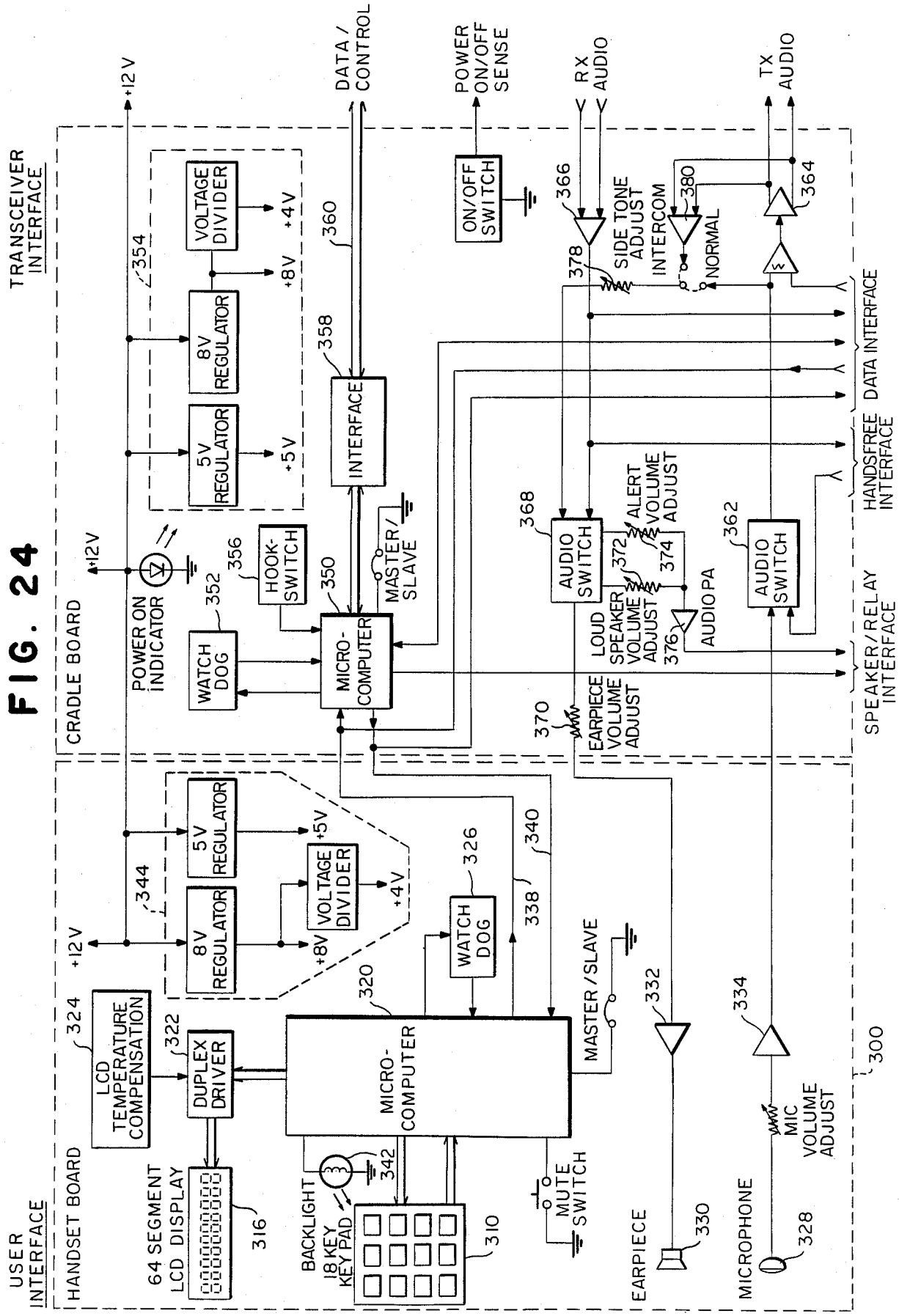
FIG. 24 is a functional block diagram of the handset and cradle of FIG. 22.

The operation of the handset of FIG. 23 may be more clearly understood with continued reference to FIG. 23 and with reference to FIG. 24. FIG. 24 shows a functional block diagram of the electrical circuit of the handset 300 and of the cradle 302 of the mobile unit 32.

When the mobile unit 32 is energized, a microcomputer 320 monitors signals from the keypad 310 to determine when the user of the mobile unit 32 has depressed one of the keys of the keypad 310. The status of the mobile unit and echoing of the keypad entries may be communicated to the user by displays in the indicator panel 316, which is driven by the microcomputer 320 through a duplex driver circuit 322.

Because the brilliance of a liquid crystal diode display digit such as may be used In the inicator panel 316 is related to the ambient temperature surrounding the display, the driver circuit 322 may include a temperature compensation circuit 324 which adjusts the voltage supply to the indicator panel 316 as a function of the temperature.

The control circuitry of the handset 300 also includes a watchdog circuit 326 which will reset the microcomputer 320 if the microcomputer 320 is not correctly cycling. Audio signal processing is accomplished through a microphone 328 and an earpiece 330. The earpiece 330 is driven by an amplifying circuit 332 from a signal received from the cradle 302. The signal from the microphone 328 is adjusted by a volume adjust circuit 334 and amplified by a amplifying circuit 336 before being provided to the cradle 302.

Communication regarding the operation of the keypad 310 by the mobile unit user is provided by the microcomputer 320 of the handset 300 to the cradle 302 by way of a serial data line 338. Similarly, commands from the cradle 302 to the microcomputer 320 of the handset 300 are received via a second serial data line 340. The microcomputer 320 also controls a backlight 342 which illuminates portions of the keyboard 310 the function indicators 314 and keyboard 310. All supply voltages required for the circuitry of the handset 300 are provided by a regulator and divider circuit 344.

With continued reference to FIG. 24, the cradle 302 serves as both a support for the handset and as an electronic interface between the handset 300 and the transceiver 304. However, it is understood that the electrical circuitry described in association with the cradle 302 could be included in association with the handset 300, or the transceiver 304, or split between both the handset 300 and transceiver 304. Thus the specification herein of certain components or circuits being in a physical location is by way of example only and not by way of limitation.

The cradle 302 is controlled by a microcomputer 350 which has associated with it a watchdog circuit 352 to reset the microcomputer 350 if the microcomputer 350 fails to properly cycle. Power to the circuit is provided by d.c. an external power source, such as an automobile battery, not shown, and regulated by a regulator and divider circuit 354. Electrically connected to the microcomputer 350 is a switch 356 indicating the status of the handset, i.e., on-hook or off-hook.

Communication from the microcomputer 350 to the transceiver 304 is conducted through an interface 358 via a data bus 360. Audio signals received from the handset 300 are applied to one of the input terminals of an audio switch 362. The other input terminal of the audio switch 362 may be connected to the audio signal from a hands free interface device, not shown. The output signal from the audio switch 362 is buffered and converted into a balanced transmission audio signal by a transmit audio buffer 364 and sent to the transceiver 304.

Received audio data from the transceiver 304 is buffered by a receive audio buffer 366 and converted into a single wire unbalanced received audio signal which is applied to one of the input terminals of an audio switch 368. The other input terminal of the audio switch 368 is connected to a circuit to provide sidetone, as explained below.

The output signal of the audio switch 368 is adjusted by an earpiece volume adjust circuit 370 and provided to the handset 300. The signal from the audio switch is also provided through adjustment circuits 372, 374 to an audio power amplifier 376 and then to a speaker/relay interface, not shown.

Sidetone may be provided to the receive audio switch 368 through one of two circuits. Conventionally, the sidetone may be tapped from the unbalanced transmit audio signal appearing immediately prior to the transmit audio buffer 364 through a sidetone adjustment circuit 378. Alternatively, sidetone may be obtained from the balanced transmit audio signal side of the transmit audio buffer 364 by providing the balanced transmit audio signal to the input terminals of an operational amplifier 380. The output signal from the operational amplifier 380 is applied through the sidetone adjustment circuit 378 to the receive audio switch 368.

With continued reference to FIG. 24, the microcomputer 350 of the cradle 302 controls whether the earpiece 330 and microphone 328 of the handset 300, or a detachable hands free device, will be used for the receipt and transmission of audio signals. If no hands free device is attached to the cradle 302, the microcomputer 350 controls the transmit audio switch 362 so that the audio signal received at the microphone 328 is transmitted to the transmit audio buffer 364 and onto the transceiver. Likewise, received audio signals received by the received audio buffer 366 are provided to the received audio switch 368. Again, the microcomputer 350 controls whether or not the audio switch 368 sends the received audio signal to the earpiece 330 of the handset 300, or to a speaker of a hands free device.

Figure 25:
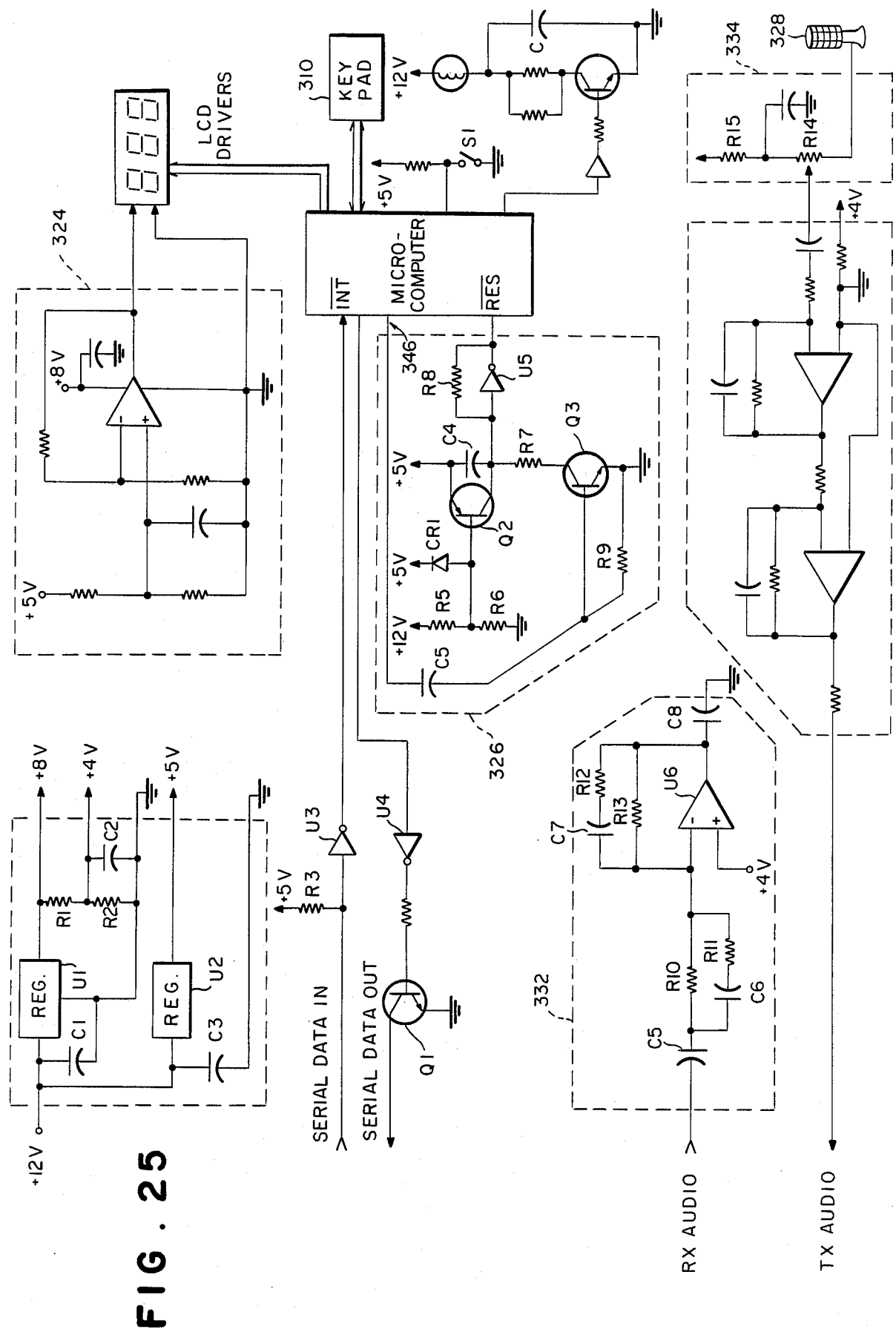
FIG. 25 is a circuit diagram of one embodiment of the handset of FIG. 22.

One embodiment of a logic circuit for performing the previously described functions of the handset 300 of FIG. 24 is functionally illustrated in the circuit of FIG. 25 and may facilitate a better understanding of the present invention.

Referring now to FIG. 25, power is supplied to the handset from a conventional direct current source such as a car battery which provides a 12 volt power signal to the mobile unit 32. The 12 volt power signal may be applied to a regulator and divider circuit 344 to obtain the voltages needed for the various circuit elements within the handset 300. The 12 volt signal may be filtered by a capacitor C1 to remove irreguulatories therefrom and may be applied to a first voltage regulator U1 which provides an eight volt signal at its output terminal.

The voltage signal appearing at the output of the regulator may be applied to a voltage divider comprising resistors R1 and R2 connected between the output terminal of the voltage regulator E1 and ground. If the resistive values of each of the resistors R1 and R2 are the same, a signal equal to one-half the voltage appearing at the output terminal of the voltage regulator will appear at the junction of the two resistors R1 and R2, providing a four volt signal. The four volt signal may be filtered by a filtering capacitor C2 to further remove any perturbances therefrom.

The 12 volt signal may also be applied to a second voltage regulator U2 which provides at its output terminal a five volt signal. Prior to the application of the 12 volt signal to the second voltage regulator U2, the signal may be filtered by a capacitor C3 between the signal and ground.

Overall operation of the handset 300 is controlled by a microcomputer 320. The microcomputer 320 controls the various input and output leads to and from the handset and communicates the status of the handset 300 to the cradle 302 via serial data lines 338, 340. Signals received on the second serial data line 340 are pulled up to a five volt reference via a pullup resistor R3 and are applied through a Schmitt trigger U3 to the interrupt port of the microcomputer 320.

Data being sent from the handset 300 to the cradle 302 is sent via the first serial data line 338 through a second Schmitt trigger U4 and resistor R4 to a transistor Q1 which drives the first serial data line 338 leading to the cradle 302.

The user of the handset 300 communicates to the system via the keypad 310. When one of the keys on the keypad 310 is depressed, signals indicating the row and column of the key within the keypad 310 are communicated to and interpreted by the microcomputer 320.

To insure that the microcomputer is operating correctly, a watchdog circuit 326 is provided. The watchdog circuit 326 comprises a voltage divider having dividing resistors R5 and R6 connected between the 12 volt power signal and logic ground. By appropriate selection of the resistive values of the dividing resistors R5 and R6, a signal having a voltage of approximately five volts can be provided to the base of a transistor Q2. In parallel to the voltage signal from the voltage divider, the base of the transistor Qz can also be provided with a five volt signal from the five volt power supply through a diode CR1. The emitter of the transistor Q2 may be connected to the five volt supply and a capacitor C4 connected between the emitter and collector electrodes of the transistor Q2. The collector of the transistor may also be connected to a Schmitt trigger U5 which is in turn connected to the reset lead RES of the microcomputer 320. The collector of the transistor Q2 may also be connected to the collector of a second transistor Q3 through a resistor R7. The base of the resistor Q3 is connected through a resistor R9 to the emitter which is, in turn, connected to the logic ground of the circuit. The base of the second transistor Q3 is also connected through a capacitor C5 to a detection port of the microcomputer 320.

In operation, the programming of the microcomputer provides an output signal to the detection port 346 on a periodic basis. As long as the microcomputer 320 is cycling properly, the output signal will be supplied to the detection port 346 and thus to the watchdog circuit 326. If too great an interval of time passes between the receipt of output signals on the detection port 346, the watchdog circuitry 326 activates the reset lead RES of the microcomputer 320, causing the microcomputer 320 to restart its processing.

Audio signals received from the cradle 302 are received by an amplifying circuit 332 which includes a DC blocking capacitor C5 and shaping/amplifying circuitry including a resistor R10 in parallel with a capacitor C6 and a resistor R11, and a shaping amplifier U6 with a parallel feedback circuit including resistor R13 in parallel with a capacitor C7 and a resistor R12. The signal from the shaping amplifier U6 is applied through a DC blocking capacitor C8 to an earpiece 330.

Audio signals generated at the handset are received by a microphone 328, are adjusted in volume by a microphone volume adjust circuit 334 comprising a variable resistor R14 pulled up to the eight volt power signal through a pullup resistor R15. The adjusted audio signal is preamplified and shaped by a conventional amplifying circuit 336 and provided to the cradle 302 via the transmit audio line.

Figure 26:
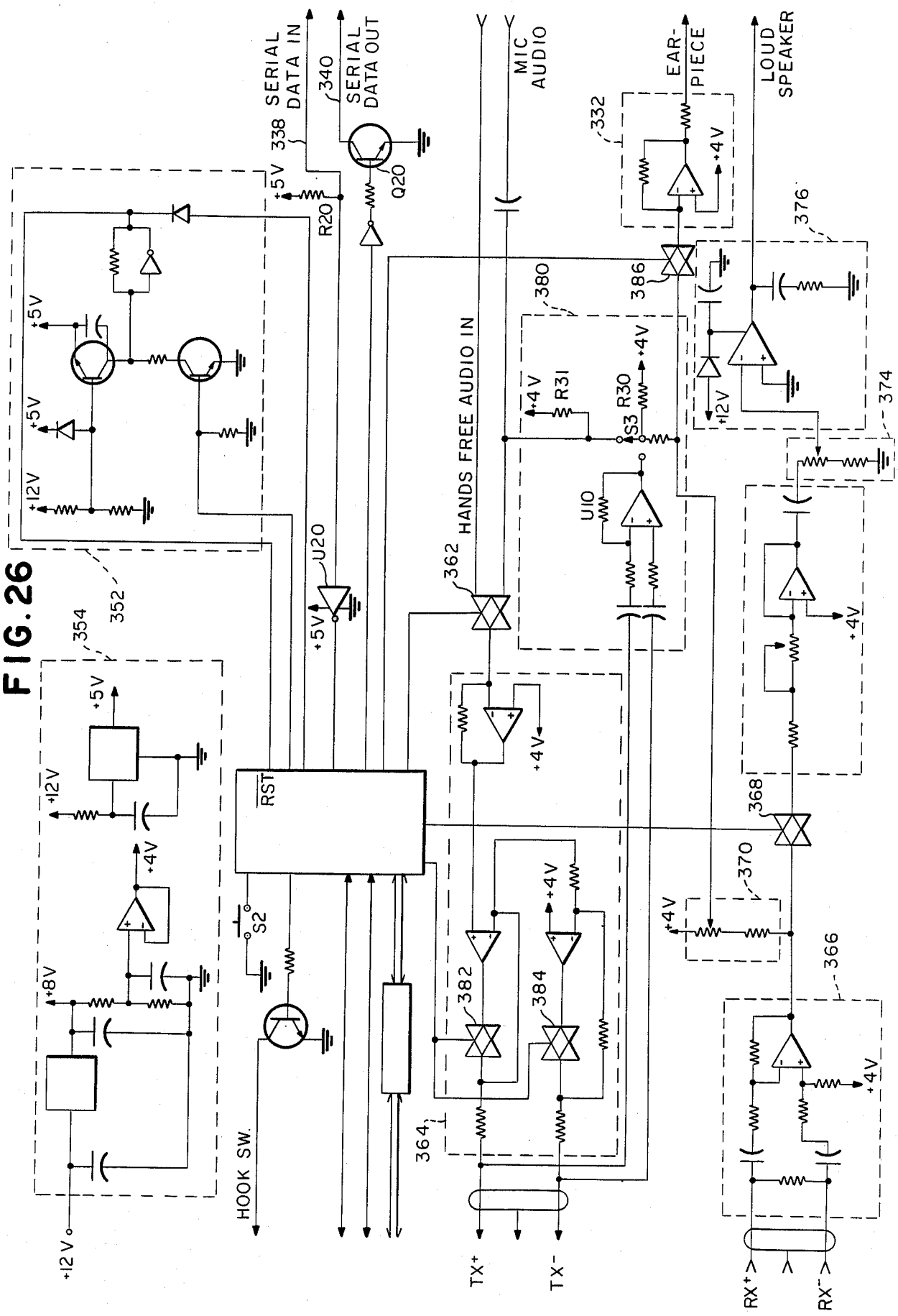
FIG. 26 is a circuit diagram of one embodiment of the cradle of FIG. 22.

The operation of the cradle circuit of FIG. 24 may be more clearly understood with continued reference to FIG. 24 and with reference to the circuit diagram of FIG. 26. Referring now to FIG. 26, power is supplied to the voltage regulator and divider circuit 354 when the mobile unit is energized to provide the various supply voltages needed by the other components of the cradle 302. In the system of the preferred embodiment, voltage supplies of +8, +5, and +4 volts are derived by the voltage regulator and divider circuitry 54 and are utilized by the various components.

The cradle 303 is controlled primarily by a microcomputer 350. The microcomputer 350 has associated with it a watchdog circuit 352 which, if periodic signals are not received from the microcomputer 350, resets the microcomputer by toggling the resets lead RES on the microcomputer 350. In this way, the microcomputer can be reset and restarted in an attempt to keep the cradle operational should the microcomputer become stuck in an infinite loop or be affected by some other processing error.

As mentioned previously, the handset 300 when not in use is supported by the cradle 302. When the handset 300 is being supported by the cradle 302, a hook switch S2 is operated. The hook switch is connected to one of the ports of the microcomputer 350 so that the microcomputer 350 is informed of the status of the handset 300. When the hook switch S2 indicates that the handset 300 has been removed from the cradle 302, a hook switch signal is sent by the microcomputer 350 to the transceiver 304. The microcomputer 350 also communicates with the transceiver via a bidirectional data bus 360. The use of the data bus is controlled by a data direction signal which indicates in which direction the data is flowing and the data is clocked with a data clock to assist in its decoding.

Serial data being transferred to/from the handset 300 from/to the microcomputer 350 of the cradle 302 is sent via a set of conventional serial data lines 338, 340. The first serial data line 338 is pulled up to the five volt logic level by a pullup resistor R20 and applied through a Schmitt trigger U20 to the microcomputer 350. Data signals being sent by the microcomputer 350 to the handset 300 may be applied through a Schmitt trigger U21 to the base of a transistor Q20. Transistor Q20 supplies sufficient power to transmit the data signals on the second serial data line 340 to the handset 300.

Provision is made in the cradle 302 to permit the received audio signals to terminate ih either the earpiece 330 or in an optional hands free control unit. Similarly, the originating signal may originate in the microphone 328 of the handset 300 or in an optional hands free control unit. The determination of which set of audio signals are transmitted and where the received audio signals are directed is under the control of the microcomputer 350 through use of audio switches 362, 368, 382, 384, 386.

The cradle 302 may receive two alternative audio transmit signals, one from the microphone 328 and the other from a hands free device. Under the control of the microcomputer 350, the audio switch 362 can select either audio transmit signal for transmission. Regardless of which audio transmit signal is selected by audio switch 362 for transmission, the signal is amplified by an operational amplifier 334 and converted to a balanced transmission audio signal, i.e., an audio signal with its two conductors 180 degrees out of phase with each other (balanced with respect to ground) by the transmit audio buffer 364.

Similarly, the received signal is converted from a balanced receive audio signal to an unbalanced signal by a receive audio buffer 366 and provided to either the earpiece of the handset or to the loudspeaker by means of the audio switches 368, 386 under the control of the microcomputer 350. The audio signals supplied to the earpiece and to the loudspeaker of the hands free audio unit may be adjusted in a conventional manner by volume adjustment circuits 370, 372 and 374.

Because the audio transmit and receive signals from the handset 300 through the cradle 302 are independent of each other, a user of the handset 300 is not able to "hear" his voice through the earpiece 330. Unless a provision is made to provide some of the voice signal transmitted by the handset user to the receive audio signal, the user is not provided with an indication that the mobile unit is functioning properly and that he is speaking at a proper level. Accordingly, provision is made in the system of the present invention to apply sidetone, i.e., a portion of the transmit audio signal, to the receive audio signal. Conventionally, sidetone is provided in mobile telephone units either through circuitry at the cell site or through a simple cross tying arrangement between the unbalanced transmit audio signal and receive audio signal.

With reference again to FIG. 26, the system of the present invention provides alternative sidetone circuitry, one conventional and one novel circuit. The conventional alternative circuit of the sidetone circuit 380 taps the MIC AUDIO lead (an unbalanced signal) and applies the signal through a switch S3 and a variable resistor R30, used to provide volume adjustment, to the unbalanced receive audio signal. The signal tapped from the MIC AUDIO lead is pulled up to a four volt potential through a pullup resistor R31. Alternatively, the balanced transmit audio signal which exists on the buffered side of the transmit audio buffer 364 may be tapped and applied to a differential amplifier U10 to provide an unbalanced transmit audio sidetone signal. The unbalanced transmit audio sidetone signal may then be applied to the volume adjustment resistor R30 through the other setting of the switch S3 and then supplied to the unbalanced receive audio signal.

By the use of the switch S3, the user of the mobile instrument is permitted to select which of the two sidetone generation circuits he desires to utilize. Use of the second sidetone circuit, which taps the balanced transmit audio signal, permits a simplified attachment of an extension control unit, i.e., a handset and cradle, to the transceiver 304. The second control unit can fully participate in the audio communication between transceiver 304 and between the control units, because it can hear all communication received and transmitted by the cradle 302.

With reference to FIG. 24, both the handset 300 and cradle 302 contain master/slave circuits 398, 399 comprising a wire line attached between logic ground and an input port of the respective microcomputers 320, 350. By cutting the wire line of the master/slave circuits 398, 399 any control unit, comprising a handset 300 and associated cradle 302, can be assigned as a slave unit. Slave units are utilized only in those configurations in which multiple control units are connected to a single transceiver 304.

In multiple control unit configurations, the user of any master control unit may enter a command via the keypad 310 to deactivate all slave control units. The transceiver 304 will relay the deactivation to all control units and, in response, the slave control units will deactivate. When activation of the slave control unit is desired, a user of a master control unit may command activation in a similar manner. Any number of control units may be master control units. Use of the master/slave circuits 398, 399 allows the master control unit to obtain privacy by deactivating all slave control units.

Figure 27:
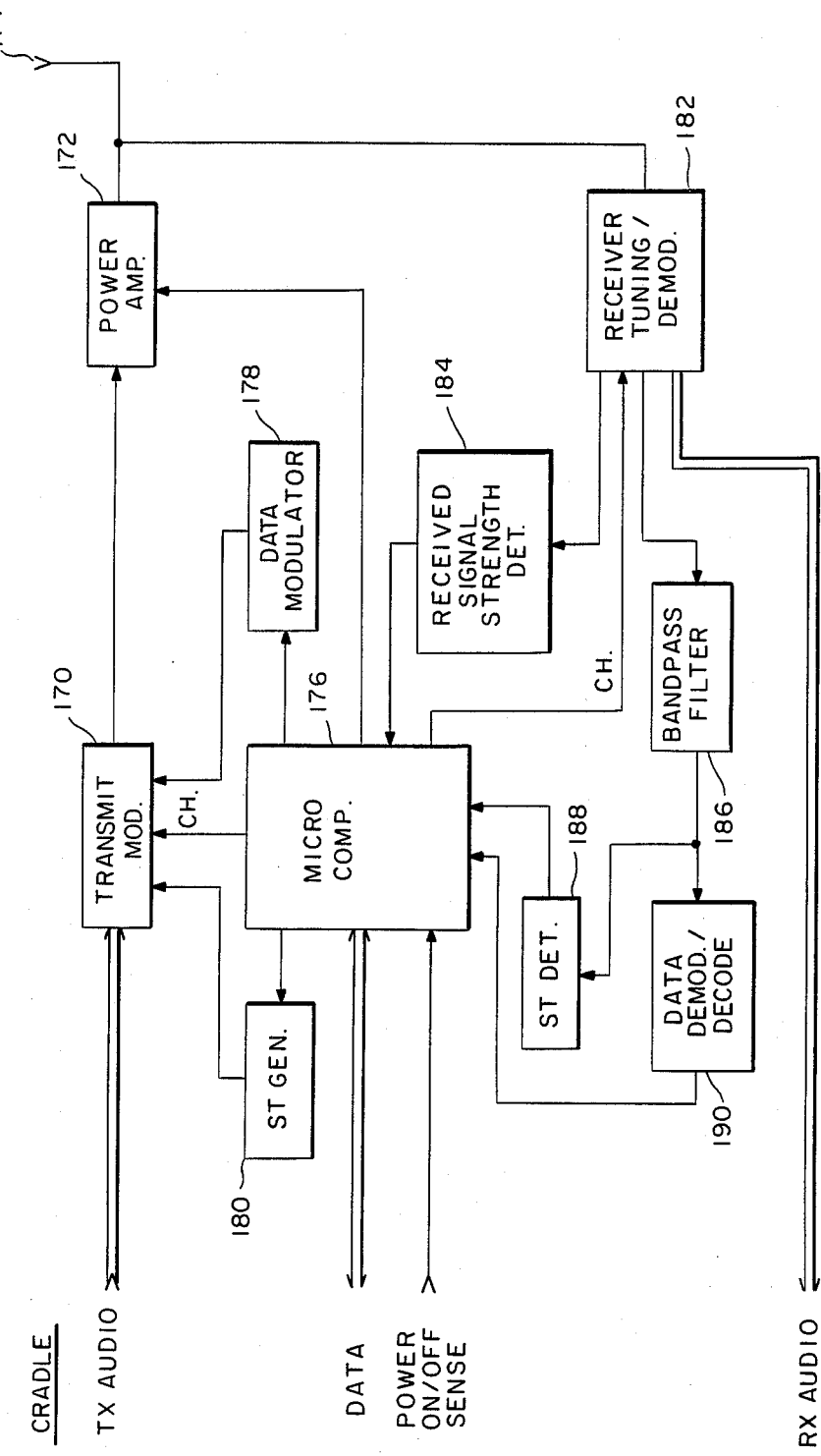
FIG. 27 is a functional block diagram of one embodiment of the transceiver of FIG. 22.

The transceiver of FIG. 24 may be more clearly understood with reference to FIG. 27. As explained previously, the transceiver receives audio signals to be transmitted and data to be transmitted from the cradle 302. The audio signal to be transmitted may be applied to a modulator 170 which is connected through a power amplifier 172 to an antenna 174. Data signals from the cradle are received on a bidirectional data bus by a microcomputer 176 which controls a data modulator 178 and a signal tone generator 180.

Radio signals received by the antenna 174 are applied to a receiver tuning and demodulator circuit 182 for tuning to and subsequently removing the RF signal carrier from the received signal. The demodulated signal may be applied to a received signal strength circuit 184 which measures the amplitude of the received signal and provides an indication therof to the microcomputer 176. The demodulated signal may also be filtered by a bandpass filter and applied to a signal tone detector 188 and a data modulator/decoder circuit 190. The demodulated signal may also be sent to the cradle for subsequent application to the earpiece of the handset or the loudspeaker of a hands free device.

In operation, data signals received from the cradle 302 may be used to modulate a 10 kilobit per second data carrier and the modulated data signal applied to the transmit modulator 170 where it is mixed with the transmit audio signal and modulated by a transmit carrier signal. The transmit carrier signal utilized by the transmit modulator 170 may be determined by the microcomputer 176 from control messages sent from the cell station 26. If the data signals received from the cradle 302 indicate that signal tone is to be transmitted, the microcomputer 176 may provide a signal tone to the transmit modulator by operation of the signal tone generator 180. At the transmit modulator 170, the signal tone is combined with the transmit audio signal and the modulated data and the combined signal modulated for transmission. The power with which the transmit signal is transmitted by the power amplifier 172 may be varied and is controlled by the microcomputer 176 through a control line to the power amplifier 172.

Signals received from the cell station 26 are tuned and demodulated by the receiver tuning/demodulated circuit 182. The identification of which frequency is to be tuned is provided by the microcomputer 176 from control messages sent from the cell station 26. During the tuning, the receiver tuning/demodulation circuit 182 may provide a portion of the received signal to the received signal strength circuit which, in the preferred embodiment, includes an analog to digital converter for measuring the analog strength of the received signal, converting the measurements to a digital signal and applying the digital signal to the microcomputer 176. As explained previously, the received signal strength measurements are used by the mobile unit 32 to determine which cell station 26 to select to monitor.

Additionally, the demodulated signal may be filtered by a bandpass filter 186 and detected by the signal tone detector 188. If signal tone is present on the filtered signal, the signal tone detector 188 transmits a signal to the microcomputer 176 informing the microcomputer of the presence of signal tone. The filtered signal may also be demodulated and decoded to obtain any digital data which may be present thereon. If digital data are present, the data may be sent from the microcomputer 176 to the cradle via the bidirectional data lines.

Each transceiver 304 has a unique serial number which can be requested by a central control station 20 to avoid the billing fraud and mobile unit theft. In the system of the present invention, the serial number is contained in a Read Only Memory (ROM) unit which communicates with the microcomputer of the transceiver 304.

To ensure that no attempt has been made to alter the serial number of the transceiver 304, some of the programs used by the microcomputer contain special instructions which are operative only with a transceiver having a predetermined serial number. When microcomputer of the transceiver 304 attempts to execute the special instructions, if the correct serial number is not obtained from the serial number ROM, the transceiver will not operate. Thus, attempts to change the serial number may result in a non-functioning transceiver 304.

With reference to FIG. 24, a mobile unit subscriber operates the mobile unit 32 in a manner similar to the operation of a wire line telephone instrument. Calls are placed by entering the telephone number of the subscriber to be called on the keyboard 310 followed by depression of one of the function keys 312 indicating to the mobile unit 32 that a call is to be placed. Alternatively, and to avoid the repeated entry of commonly used telephone numbers, the mobile unit 32 may store telephone dialing sequences entered by the mobile unit user for later recall for use in dialing. When the user desires to dial one of the previously stored sequences, the user can indicate to the mobile unit 32 via the keyboard 310 and functions keys 312 that he wishes to dial a previously stored telephone dialing sequence.

In response, the mobile unit 32 retrieves the previously stored sequence and places the telephone call. Often, a user desires to place a call to a private long distance carrier and utilize the circuits of the private long distance carrier to place a call to another telephone instrument. Typically, in using such long distance private carriers, a mobile unit user must first dial a telephone number to establish a telephone call between the mobile unit and a local telephone number assigned to the long distance carrier. Once the user has gained access to the long distance carrier, the user is provided with a dial tone from the long distance carrier to inform the user that the carrier is available and ready for operation. Thereupon, the user is often required to key in a five digit billing code followed by a seven digit to ten digit telephone number of the remote location with which communication is desired.

Thus, the dialing from a mobile telephone of a long distance telephone number through a private long distance carrier may entail the dialing of three or more sets of numbers. Since many mobile telephones are installed in automobiles that are used while the telephone operators driving the automobile, it is often difficult for the telephone user to divert his attention from the traffic in order to dial the many digits required. Additionally, the sets of numbers may be stopped and be redialed after receiving an acknowledgement signal from the system being dialed that the system is ready for further dialing. To assist the mobile unit user in placing calls to such a private telephone networks, a mobile unit in accordance with the present invention includes the ability to automatically dial a chain or sequence of previously stored numbers, and if appropriate, to wait for dialing tones between searching of the sequences. A system and method for such a capability in a mobile unit is disclosed and claimed in the co-pending U.S. patent application No. 651,712, filed Sept. 18, 1984, for "Method and Apparatus for Automatic Dialing in Mobile Radio Telephone Systems" by Paul L. Monet and assigned to the assignee of the present application, and is incorporated herein by reference.

It is often desirable to limit the access of unauthorized persons to use of an installed mobile unit 32 or to restrict the use of authorized persons to certain dialing capabilities, the mobile unit 32 of the present invention also includes a multi-level lock system.

When the mobile unit 32 is energized, it is electronically locked, i.e., it will not accept any dialing commands until a predetermined sequence of numbers has been entered via the keyboard in an unlocking sequence. Additionally, the unlocking sequence may be a multi-level code to provide differeing degrees of access to different users. For example, three differeing unlock sequences may be utilized and users having knowledge of the first sequence may be permitted only to place local calls, users with knowledge of the second unlocking sequence may be permitted to place telephone calls within the same number planning area (i.e., area code), and users with knowledge of the third unlocking sequence may be permitted to place telephone calls without restriction.

Persons having knowledge of none of the unlocking sequences would not be permitted to place calls but may be permitted to receive calls on the mobile unit 32. Additionally, the mobile unit 32 may place emergency calls, e.g., calls to the 911 emergency number, without requiring the entry of an unlocking sequence.

To prevent unauthorized or inadvertent locking of the mobile unit 32, the mobile unit 32 may require that the unlocking sequence be performed prior to locking the mobile unit. Such a method of controlling the use of a mobile unit is disclosed and claimed in the co-pending U.S. patent application Ser. No. 651,711, filed Sept. 18, 1984 by Paul L. Monet for "Method and Apparatus for Managing the Use of an Electronic Lock for a Mobile Radio Telephone", assigned to the assignee of the present application, and is incorporated herein by reference.

As explained above in connection with the description of the cradle, 302, the mobile unit 32 may be energized with reference to a on/off switch located on the cradle 302. In addition, the mobile unit 32 may be energized with reference to an external switch, such as the ignition switch of an automobile in which the mobile unit is installed. Regardless of which switch is used to deenergize the mobile unit 32, it is advantageous to permit the user of the mobile unit 32 to continue to operate the mobile unit 32 for a brief period after deenergization. Accordingly, when the mobile unit 32 detects any one of its energization switches has been thrown to the deenergization position, the mobile unit 32 may initiate a timer and maintain power to the circuits of the mobile unit 32.

If the mobile unit 32 is engaged in a telephone call, when its energization switch is turned off, the mobile unit 32 may continue to remain energized until the call has terminated and the timing circuit has expired. Preferably, the length of time that the timing circuit maintains the mobile unit 32 in an energized state after the energization switch has been thrown and an on-going call terminated is a brief period of approximately 30 seconds. This brief period permits the user sufficient time to lock the mobile unit 32 as described above.

During an ongoing telephone call using the mobile unit 32, the user may request certain additonal services which require the transmission of a control signal to the cell station 26 or to the central control station 20. For example, the user may desire to add another party to the call, i.e., conference, to transfer the call to another telephone instrument, or to request a specific routing for a transferred call. To indicate to the mobile unit 32 his desire to implement one of the additonal services, the user may depress one or more of the keys of the keyboard.

For example, if the user wants to transfer an ongoing call to another telephone instrument, the user may depress the asterisk key, a key associated with the transfer function, and the keys of the keyboard corresponding to the number of the telephone instrument to which the call should be transferred. When the mobile unit 32 receives a request from the user, the mobile unit 32 transmits a special data signal, i.e., a flash pause, on the communication channel which is detected by and interpreted by the cell station 26. The flash pause signal may be transmitted by the mobile unit using out-of-band signalling in which the voice signal is muted by the mobile unit 32 while digital data specifying the type of service requested and other needed information are transmitted on the voice channel modulated by a ten thousand bit-per-second signal. As explained previously, the cell station 26 detects the presence of the out-of-band digital data signal, interprets the digital data, and sends a message to the central control station 20 informing the control station 20 of the message from the mobile unit 32.

Through the use of out-of-band digital data signalling on the voice channel, the system of the present invention is able to provide the system user with a variety of features which may be implemented by use of the switching and memory capabilities of the central control station 20. These features include:

Call transfer/consultation hold. The call transfer/consultation hold feature provides the user who is engaged in a conversation the capability to signal the control station 20 to set up a call to a third party. Once the call is set up by the central control station 20, the user of the mobile unit 32 may toggle back and forth between the third party and the original other party or the ability to release from the call leaving the original other party and the third party connected.

Channel retention. The channel retention features allows a mobile unit user who is involved in a call to indicate to the central control station 20 that the user wants the current call released and a new call established. This features allows a user to establish a new call without having to release and re-originate a call via the control channel.

Progressive conference. The progressive (or add-on) conference feature allows a mobile unit user to sequentially dial an add-on conferee telephone instrument to create a conference and to add parties to an existing conference. For each telephone instrument added to the converence, the control station 20 places a call to the added party and connects the call to the conference by use of its conference bridges.

Preset conference. The preset (or preprogrammed) conference feature allows a mobile unit user to dial one of the set of predetermined preset conference codes to create a conference whose membership is predetermined and has been stored in the central control station 20. When the preset conference feature is requested by the mobile unit user, the central control station 20 automatically sets up calls to each of the members listed for that conference call. Busy or no answer conferees are detected by the central control station 20 and may be automatically dropped from the conference.

Meet-me conference. The meet-me (or scheduled) conference speech allows a mobile unit user to reserve, via the central control station 20, conference facilities for use at a specific time. The operator of the cellular mobile telephone system may provide the mobile user with a telephone number that each member of the conference will use to gain access to the conference. As each conference member's call arrives at the central control station 20, the caller is connected to the specific conference indicated by the dialed telephone number. The telephone numbers used for access may be assigned as needed and may be invalidated after a predetermined time period to permit reuse.

Camp-on busy. The camp-on busy feature allows a call to a busy mobile unit to remain in the system, i.e., not to be released. When the called party releases from the current call, the central control station 20 completes the awaiting call by signalling the mobile unit 32 in the same manner as it does for any incoming call.

Call waiting. The call waiting indication feature allows a mobile unit user who is busy on an existing call to be informed of the fact that a call is camped on, i.e., waiting. When the feature is implemented and the central control station 20 detects a call waiting for a mobile unit, the central control station 20 may send a low level audible tone signal on the communication path to the mobile unit. The audible tone signal may be a "tone under speech signal", i.e., it is a low-level audible tone that is added to the speech signal having an amplitude high enough to be audible under normal circumstances and low enough not to interfere with the intelligibility of the speech signal.

Executive override. The executive override features allows a mobile unit to barge-in on an existing call within the cellular mobile telephone system when encountering a busy signal for a call to one of a specific set of mobile units. The barge-in is implemented by the central control station 20 by conferencing the barge-in call with the existing call and occurs only if the busy, called mobile unit is a member of a specific, predetermined set of mobile units.

Message waiting. The message waiting feature allows a mobile unit user to be informed that a message for the mobile unit user has been stored in the central control station 20 and allows the user to signal the central control station to retrieve the message. When the mobile unit user desires to retrieve the message, the user may signal the central control station by dialing a predetermined feature code. The message waiting indication may be a distinctive message waiting tone or a recorded announcement sent to the mobile unit by the central control station 20 in the form of a telephone call.

Call forwarding. The call forwarding feature allows an incoming call intended for a mobile unit 32 to be automatically redirected to a different destination. When the feature is implemented, a central control station 20 will automatically transfer the call, as described previously, to the previously specified telephone instrument.

V. ADVANTAGES AND SCOPE OF THE INVENTION

The system of the present invention is particularly advantageous in that a user need install only such equipment as is necessary to meet current subscriber requirements thus reducing the initial cost and making the system commercially feasible.

The modular design permits infinite expansion without unnecessary duplication or obsolescence.

In operation, the functions of detecting incoming calls, assigning voice circuits and communication channels, operating the control channel to the mobile units, reassigning the voice circuit and/or communication channel, monitoring the power level of the mobile unit, and maintaining synchronization with the mobile unit are split between the central control station and the RIMs of the cell stations to provide a system which can be adapted to meet various geographic and demographic configurations of a service area with a reduction in the amount of common equipment which is unused in less dense telephone traffic service areas. The controlling of the mobile unit communications on a per channel basis, i.e., by the RIM, reduces the processing burden on the central control station, and permits a system in which the communication control capability need not be installed before a communication channel is needed.

Redundancy at the central control station and the dynamic assignment of RIMs provide extraordinary flexibility and security from service interruptions.

Flexibility in design of systems is also available from substantially centralized to wholly decentralized embodiments and the ability to modify an installed and operational system to meet changing community needs.

The novel central control station makes readily available to mobile unit subscribers a number of service features such as conferencing, call transfer, and messages waiting indications which utilize the switching and conference bridge capabilities of the central control station so that additional hardware is not required.

The mobile unit also includes many advantageous features such as sidetone coupling to permit the use of plural telephones at the same mobile units, a multi-level electronic locking system, and automatic menu selection to reduce the need for an automobile driver to look at the unit while dialing or requesting features.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A mobile radio telephone systemm including a central control station, a plurality of cell stations, and a plurality of mobile telephone units for establishing telephonic communications between a telephone in a public telephone exchange and the mobile telephone unit within a plural communication zone service area wherein:
   (a) said central control station for said service area comprises:
      (1) exchange signal detection means for detecting supervisory and address signals received from of the public telephone exchange,
      (2) exchange signalling means for generating and transmitting supervisory and address signals over the public telephone exchange,
      (3) voice communication means for communicating over a plurality of voice circuits,
      (4) data link communication means for communicating over a data link, and
      (5) routing control means (i) for selectively connecting any one or more of said plurality of voice circuits to one of the trunk circuits of the public telephone exchange, and (ii) for selectively communicating with a cell station over said data link for cell station supervision;
   (b) said cell station for each of the plurality of communication zones within said service area comprises:
      (1) data link communicating means for selectively communicating with said central control station over said data link,
      (2) a plurality of transmitters and receivers capable of respectively transmitting and receiving signals over a plurality of radio communication channels, including a plurality of voice channels and at least one control channel, and
      (3) a radio interface module ("RIM") associated with each of said communication channels, each RIM including:
         (i) voice communications means for communicating with said central control station over the associated one of said plurality of voice circuits,
         (ii) means for determining the power of signals received by said receivers,
         (iii) means for detecting control signals received by said receivers, and
         (iv) means for reformatting control signals received over said control channels into messages for transmission over said data link;
         (v) control signal means for providing control signals for transmission by said transmitters to said mobile units, said control signal means being responsive to supervisory signals received from said central control station over said data link and being responsive to control signals received from a mobile unit;
   (c) each of said plurality of mobile telephone units comprising:
      (1) a transmitter and receiver capable of transmitting and receiving signals over a plurality of said communication channels,
      (2) power detection means for determining the power of signals received from said cell stations on said control channels,
      (3) control signal detecting means for detecting control signals received from said cell stations over one of said communication channels,
      (4) control signal providing means for providing control signals to said transmitter for transmission to said cell stations over one of said communication channels, (5) voice providing means for providing voice signals to said transmitter for transmission to said cell stations over one of said voice channels, and (6) voice detecting means for detecting voice signals received by said receiver over one of said voice channels.

2. The mobile radio telephone system of claim 1 wherein the control channels assigned to adjacent said cell stations are non-interfering and wherein at least some of said communication channels are common to more than one of said cell stations; and wherein each of said mobile units includes means for selecting the one of said control channels having the greatest received signal strength; and wherein said mobile unit includes means for monitoring the selected control channel for signals indicating that a telephone call has been placed to the mobile unit and for transmitting a signal on said selected control channel indicating readiness for the call to be established.

3. The mobile radio telephone system of claim 2 including:

test signal providing means at one of said cell stations for providing a test signal;

test signal transmitter means at said one of said cell stations responsive to said test signal providing means for transmitting said test signal over one of said voice channels to the one of said mobile telephone units ready for the call to be established;

transponding means at said one mobile telephone unit for transponding said test signal over said one of said voice channels;

test signal detecting means at said cell station for detecting the reception of said transponded test signal on said one voice channel and for supplying an alarm signal when said transponded test signal is not detected within a predetermined interval of time after the transmission of said test signal.

4. The mobile radio telephone system of claim 3, wherein said test signal is transmitted by said cell station during a period of time prior to the interconnection of said voice channel to one of said trunk circuits by said routing control means.

5. The mobile radio telephone system of claim 4, wherein the frequency of said test signal is within the bandwidth of said transmitting means, said transponding means and said detecting means, but outside the speech bandwidth.

6. The mobile radio telephone system of claim 5 wherein said routing control means includes means for detecting signals from a trunk circuit indicating the existence of a telephone call addressed to a specified mobile unit and for transmitting a call initiating signal to said cell station indicating the existence of a telephone call for said specified mobile unit; and wherein said RIM is responsive to said call initiating signal channel for transmitting a paging signal over said control channel.

7. The mobile radio telephone system of claim 6, including means at each of the cell stations adjacent to the cell stations engaged in an established call with a mobile unit over a radio communication channel in a first one of a plurality of overlapping zones for monitoring the level of the signal received from the mobile unit on the established call;

means at said central control station:

for determining from the monitored signal levels that said mobile unit is leaving said first zone and entering a second zone, for selecting a second and idle voice channel and its associated voice circuit in said second zone;

for switching said established call onto two ports of a conference bridge circuit;

for switching said second voice circuit onto a third port of said conference bridge circuit;

for transmitting a signal over said data link to said first cell station to direct said mobile unit to re-establish the call through said second cell station on said second voice channel;

for monitoring the signals transmitted by said mobile unit on said second voice channel to determine when the mobile has re-established the call;

for idling the first voice channel; and for disconnecting said first voice circuit from the conference bridge circuit.

8. The mobile radio telephone system of claim 7 wherein said second voice channel is muted until the mobile has re-established the call on said second voice channel.

9. The telephone communication system of claim 7 wherein said first voice channel is muted after said mobile unit has received and acknowledged the signal to re-establish the call on said second channel.

10. The mobile radio telephone system of claim 9 wherein said mobile unit includes:

a mouthpiece for converting voice into electrical signals in a single wire transmission system, an earpiece for converting electrical signals in a single wire receiver system into voice, a transmitter buss buffer electrically connected to said mouthpiece for converting a single wire transmission system into a two wire transmission system, and a receiver buss buffer electrically connected to said earpiece for converting a single wire receiver system into a two wire receiver system, an operational amplifier;

means for electrically connecting the two wires of the two wire transmission system to the input terminals of said operational amplifier; and means for electrically connecting the output terminal of said operational amplifier to said earpiece, to thereby provide a sidetone signal to the earpiece.

11. The mobile radio telephone system of claim 9 wherein said mobile unit comprises:

a microphone for converting voice signals into unbalanced electrical voice signals;

a speaker for converting unbalanced electrical voice signals into voice signals;

means electrically connected to said microphone for converting said unbalanced electrical voice signals to balanced electrical signals; and means for applying a predetermined portion of said balanced electrical voice signal to said speaker so that a predetermined portion of said voice signal appears at said speaker.

12. The mobile radio telephone system of claim 4 wherein said cell station includes a communication channel designated as a control channel;

a RIM for interconnecting one of said transceivers to one of said voice circuits and for supplying paging signals for said mobile units; and means at said central control station for dynamically assigning and reassigning one of said RIMs to supply paging signals.

13. The mobile radio telephone system of claim 12 wherein said cell station includes:
control means for dynamically selecting one of said RIMs to apply paging signals to its associated transceiver,
control means for dynamically selecting one of said RIMS to monitor the strength of signals received on its associated transceiver over the radio communication channels;
a plurality of tuning means for tuning the output signal from one of said transceivers to a predetermined frequency;
a combiner for combining the plurality of tuned signals into a single transmission signal;
a transmission antenna for transmitting said single transmission signal, and
switching means for dynamically switching the signal output from one of said transceivers from one to another of said tuning means to provide a backup for the control channel.

14. The mobile communication system of claim 12 wherein said cell station includes means for applying to one of said voice circuits a signal indicating that a requested mobile unit is ringing; and
wherein said mobile units include means for generating a ringing signal indicating that a telephone call is waiting.

15. The mobile radio telephone system of claim 1 including:
test signal providing means at one of said cell stations for providing a test signal;
test signal transmitter means at said one of said cell stations responsive to said test signal providing means for transmitting said test signal over one of said voice channels to the one of said mobile telephone units ready for the call to be established;
transponding means at said one mobile telephone unit for transponding said test signal over said one of said voice channels;
test signal detecting means at said cell station for detecting the reception of said transponded test signal on said one voice channel and for supplying an alarm signal when said transponded test signal is not detected within a predetermined interval of time after the transmission of said test signal.

16. The mobile radio telephone system of claim 15, wherein said test signal is transmitted by said cell station during a period of time prior to the interconnection of said voice channel to one of said trunk circuits by said routing control means.

17. The mobile radio telephone system of claim 16, wherein the frequency of said test signal is within the bandwidth of said transmitting means, said transponding means and said detecting means, but outside the speech bandwidth.

18. The mobile radio telephone system of claim 17 wherein said cell station includes a communication channel designated as a control channel;
a RIM for interconnecting one of said transceivers to one of said voice circuits and for supplying paging signals for said mobile units; and
means at said central control station for dynamically assigning and reassigning one of said RIMs to supply paging signals.

19. The mobile radio telephone system of claim 18 wherein said cell station includes:
control means for dynamically selecting one of said RIMs to apply paging signals to its associated transceiver,
control means for dynamically selecting one of said RIMs to monitor the strength of signals received on its associated transceiver over the radio communication channels;
a plurality of tuning means for tuning the output signal from one of said transceivers to a predetermined frequency;
a combiner for combining the plurality of tuned signals into a single transmission signal;
a transmission antenna for transmitting said single transmission signal, and
switching means for dynamically switching the signal output from one of said transceivers from one to another of said tuning means to provide a backup for the control channel.

20. The mobile communication system of claim 18 wherein said cell station includes means for applying to one of said voice circuits a signal indicating that a requested mobile unit is ringing; and
wherein said mobile units include means for generating a ringing signal indicating that a telephone call is waiting.

21. The mobile radio telephone system of claim 1 wherein said routing control means includes means for detecing signals from a trunk circuit indicating the existence of a telephone call addressed to a specified mobile unit and for transmitting a call initiating signal to said cell station indicating the existence of a telephone call for said specified mobile unit; and
wherein said RIM is responsive to said call initiating signal channel for transmitting a paging signal over said control channel.

22. The mobile radio telephone system of claim 21, including
means at each of the cell stations adjacent to the cell stations engaged in an established call with a mobile unit over a radio communication channel in a first one of a plurality of overlapping zones for monitoring the level of the signal received from the mobile unit on the established call;
means at said central control station:
for determining from the monitored signal levels that said mobile unit is leaving said first zone and entering a second zone,
for selecting a second and idle voice channel and its associated voice circuit in said second zone;
for switching said established call onto two ports of a conference bridge circuit;
for switching said second voice circuit onto a third port of said conference bridge circuit;
for transmitting a signal over said data link to said first cell station to direct said mobile unit to reestablish the call through said second cell station on said second voice channel;
for monitoring the signals transmitted by said mobile unit on said second voice channel to determine when the mobile has re-established the call;
for idling the first voice channel; and
for disconnecting said first voice circuit from the conference bridge circuit.

23. The mobile ratio telephone system of claim 21 wherein said second voice channel is muted until the mobile has re-established the call on said second voice channel.

24. The telephone communication system of claim 21 wherein said first voice channel is muted after said mobile unit has received and acknowledged the signal to re-established the call on said second channel.

25. The mobile radio telephone system of claim 21 including:
test signal providing means at one of said cell stations for providing a test signal;
test signal transmitter means at said one of said cell stations responsive to said test signal providing means for transmitting said test signal over one of said voice channels to the one of said mobile telephone units ready for the call to be established;
transponding means at said one mobile telephone unit for transponding said test signal over said one of said voice channels;
test signal detecting means at said cell station for detecting the reception of said transponded test signal on said one voice channel and for supplying an alarm signal when said transponded test signal is not detected within a predetermined interval of time after the transmission of said test signal.

26. The mobile radio telephone system of claim 25, wherein said test signal is transmitted by said cell station during a period of time prior to the interconnection of said voice channel to one of said trunk circuits by said routing control means.

27. The mobile radio telephone system of claim 26, wherein the frequency of said test signal is within the bandwidth of said transmitting means, said transponding means and said detecting means, but outside the speech bandwidth.

28. The mobile radio telephone system of claim 1 wherein said cell station includes a communication channel designated as a control channel;
a RIM for interconnecting one of said transceivers to one of said voice circuits and for supplying paging signals for said mobile units; and
means at said central control station for dynamically assigning and reassigning one of said RIMs to supply paging signals.

29. The mobile radio telephone system of claim 28 wherein said cell station includes:
control means for dynamically selecting one of said RIMs to apply paging signals to its associated transceiver,
control means for dynamically selecting one of said RIMs to monitor the strength of signals received on its associated transceiver over the radio communication channels;
a plurality of tuning means for tuning the output signal from one of said transceivers to a predetermined frequency;
a combiner for combining the plurality of tuned signals into a single transmission signal;
a transmission antenna for transmitting said single transmission signal, and
switching means for dynamically switching the signal output from one of said transceivers from one to another of said tuning means to provide a backup for the control channel.

30. The mobile communication system of claim 29 wherein said cell station includes means for applying to one of said voice circuits a signal indicating that a requested mobile unit is ringing; and
wherein said mobile units include means for generating a ringing signal indicating that a telephone call is waiting.

31. A mobile communication system for establishing telephone communication between a station in a telephone exchange and a mobile telephone unit, comprising:
a central control station including switching means to interconnect a plurality of voice circuits to the trunk circuits of a telephone exchange;
a plurality of cell stations each serving one of a plurality of zones which together define a service area and each having a plurality of communication channels assigned thereto, said communication channels including a plurality of voice channels and at least one central channel,
each of said cell stations having a plurality of radio transceivers capable of communicating on the plurality of communication channels and capable of providing paging signals for mobile units,
each of said transceivers having an associated radio interface module ("RIM") for interconnecting said transceiver and one of said voice circuits, for supplying paging signals for said mobile units, and for enabling dynamic assignment of one of said RIMs to supply paging commands.

32. A cell station for a cellular mobile radio telephone system for establishing and maintaining communications between a telephone switch and a plurality of mobile radio telephone units over radio frequency channels within the cell station range of operation, the cell station comprising:
a plurality of radio frequency channels of different frequencies,
each radio frequency channel including a separate transceiver connected between transmit and receiver antenna means common to all of the channels,
each channel having a separate control circuit that is adapted to control the operation of its associated transceiver to complete radio frequency communication paths to mobile units as instructed by the telephone switch;
means in each of said control circuits for receiving instructions from said telephone switch for presetting the operation mode of said control circuit as a control channel used to establish initial communications with a mobile unit or as a voice channel over which continuous communication is maintained with the mobile unit once an initial communication path is established; and
means in each of the said control circuits for processing voice signals and converting data signals into form to be communicated between the telephone switch and an associated transceiver.

33. The cell station as defined in claim 32 including:
a receiver connected to said receiver antenna means,
a control circuit adapted to control the operation of said receiver,
means in said control circuit for receiving instructions from said telephone switch for tuning the receiver to selected channels for continuously monitoring the radio frequency signal strength of such channels, and
means in said control circuit for transmitting signals indicating the signal strength of such channels to said telephone switch.

34. The cell station as defined in claim 33 wherein:

each of said control means includes separate means for continuously monitoring the radio frequency signal strength of the communication paths involved in such channel and separate means for transmitting signals indicating such signal strength to said telephone switch.

35. The cell station as defined in claim 34 wherein: one said control circuit means receives instructions from said telephone switch to control the operation of the associated channel to initially establish communication with said mobile units and to provide information to the telephone switch for transferring such calls to one of said other channels.

36. The cell station as defined in claim 32 wherein said means for converting data signals includes:
synchronization circuit means for developing timing signals for synchronizing the operation of the control circuit means with the signals received via the associated transceiver from said mobile units;
received signal conversion means responsive to said timing signals for converting serial digital data signals received from the mobile units to parallel digital form;
transmit signal conversion means responsive to said timing signals for converting parallel digital signals into serial digital form for transmission by said transceiver to said mobile units; and
circuit means for transmitting parallel digital signals from said received signal conversion means to said telephone switch and for transmitting parallel digital signals from said telephone switch to said transmit signal conversion means.

37. The cell station as defined in claim 36 wherein the synchronization circuit means includes:
a digital phase lock loop, and
control means for a modifying the bandwidth of said digital phase lock loop circuit so that said phase lock loop circuit operates with a preset bandwidth in the acquisition mode in attempting to synchronize timing pulses with that of the signals received from the mobile unit, and operates with a reduced bandwidth once synchronization has been achieved, so that the digital phase lock loop follows the receiver signals with a significantly narrower bandwidth than said preset bandwidth.

38. The cell station as defined in claim 32 wherein said means for processing voice signals includes:
received signal processor means for receiving audio signals from the associated transceiver and converting the audio signals to a form suitable for transmission to said telephone switch; and
transmit signal processor means for receiving audio signals from the telephone switch and converting the audio to a form suitable for transmission by the associated transceiver to said mobile units.

39. In a cell station for mobile radio telephone systems having a plurality of RF communication channels to be involved in establishing and maintaining communication paths between a telephone switch and any of a plurality of mobile units, the improvement wherein each channel includes a separate transceiver and a separate control circuit responsive to digital signals for controlling the operation of the associated transceiver, and wherein said control circuit comprises:
interface circuit means adapted to be connected to a telephone switch for receiving digital signals in parallel form;
means for receiving digital signals from the associated receiver in serial form;
first converting means for converting parallel digital signals to serial form for transmission by said transmitter to a mobile unit;
second converting means for converting signals in serial digital form into parallel form for transmission to the telephone switch; and
microprocessor means connected to said interface circuit for translating digital signals in parallel form therebetween into serial form for controlling the transmission of digital signals in parallel form from said first converting means to said interface circuit, and controlling the transmission of digital signals in parallel form from said interface to said second converting means.

40. A mobile radio telephone system including plural central control stations, a plurality of cell stations, and a plurality of mobile telephone units for establishing telephonic communications between a telephone in a public telephone exchange and a mobile telephone unit within a plural communication zone service area wherein:
(a) each of said central control stations controls a portion of said service area comprises:
 (1) exchange signal detection means for detecting supervisory and address signals received from the public telephone exchange,
 (2) exchange signalling means for generating and transmitting supervisory and address signals over the public telephone exchange,
 (3) voice communication means for communicating over a plurality of voice circuits,
 (4) data link communication means for communicating over a data link,
 (5) routing control means (i) for selectively connecting any one or more of said plurality of voice circuits to one of the trunk circuits of the public telephone exchange, and (ii) for selectively communicating with a cell station over said data link for cell station supervision, and
 (6) data line communication means for communicating with other central control stations over a data link;
(b) said cell station for each of the plurality of communication zones within said service area comprises:
 (1) data link communicating means for selectively communicating with one of said central control stations over said data link,
 (2) a plurality of transmitters and receivers capable of respectively transmitting and receiving signals over a plurality of radio communication channels, including a plurality of voice channels and at least one control channel, and
 (3) a radio interface module ("RIM") associated with each of said communication channels, each RIM including:
  (i) voice communication means for communicating with said one of the central control stations over the associated one of said plurality of voice circuits,
  (ii) means for determining the power of signals received by said receivers,
  (iii) means for detecting control signals received by said receivers,
  (iv) means for reformatting control signals received over said control channels into messages for transmission over said data link; and (v) control signal means for providing control signals for transmission by said transmitters to said mobile units, said control signal means being responsive to supervisory signals received from said one of the central control stations over said data link and being responsive to control signals received from a mobile unit;

(c) each of said plurality of mobile telephone units comprising:
  (1) a transmitter and receiver capable of transmitting and receiving signals over a plurality of said communication channels,
  (2) power detection means for determining the power of signals received from said cell stations on said control channels,
  (3) control signal detecting means for detecting control signals received from said cell stations over one of said communication channels,
  (4) control signal providing means for providing control signals to said transmitter for transmission to said cell stations over one of said communication channels,
  (5) voice providing means for providing voice signals to said transmitter for transmission to said cell stations over one of said voice channels, and
  (6) voice detecting means for detecting voice signals received by said receiver over one of said voice channels.

41. The system as defined in claim 40 further comprising means at the central control stations for communicating over an interstation voice circuit.

42. A cellular mobile radio telephone system for connecting mobile radio telephone units to a public telephone network comprising:
  a central control station adapted to be connected through the public telephone network via trunk circuits for receiving calls therefrom and placing calls thereto, said station placing call requests from mobile units for connection to the public network; and
  at least one cell station connected through voice and data lines to said central control station for receiving said call requests and for placing call requests from mobile units to the central control station for connection to the public network;
  sub-cell station including a plurality of radio frequency communications channels, at least one of such channels being operative as a control channel for initially establishing radio frequency communications with the mobile units; and
  a plurality of said channels being operative as communication channels for establishing and maintaining communications with the mobile units after communication is established over a control channel;
  each of said channels including separate control circuits responsive to control signals from said central control station over said data lines and responsive to control signals from the mobile units over said radio frequency communication for independently establishing and maintaining both control and communications between the mobile unit and the data and voice lines of said sub-cell station.

43. The cell station as defined in claim 32 wherein:
said control channel has a separate tuning means for tuning the predetermined radio frequency on which the control channel is to broadcast; and switching means connected to said tuning means and to at least two of said control circuit means, one of which is the control circuit means associated with said control channel, for selectively connecting a control circuit means to the tuning means associated with said control channel.

44. The cell station as defined in claim 32 including a radio frequency link test circuit comprising:
  detection means to detect the forward and reflected signal from said transmit antenna means;
  first measuring means to measure the forward signal strength of said transmit antenna means;
  second measuring means to measure the reflected signal strength of said transmit antenna means,
  said first and second measuring means responding to directions from said telephone switch and providing measurements of said forward and reflected signal strengths to said telephone switch;
  oscillator means providing an output signal;
  means to combine said output signal from the oscillator and said forward signal of said transmit antenna means to form a new signal,
  said new signal being transmitted from said transmit antenna means and received on said receiver antenna means;
  third measuring means to measure the signal strength of said new signal received on said receiver antenna means,
  whereby when said transmit antenna transmits with said radio frequency link test circuit engaged, readings or forward and reflected signal strength and of received signal strength are available to said telephone switch.

45. The cell station as defined in claim 32 including:
  generator means for generating a signal tone;
  an audio control circuit to provide control signals;
  a transmit audio processor for receiving first voice signals from said telephone switch and for processing said first voice signals in accordance with predetermined specifications;
  combining means for adding said signal tone and said control signals to the processed voice signals and for providing the summed signal to said transceiver;
  a receive audio processor for receiving second voice signals from said transceiver, and for processing said second voice signals in accordance with predetermined specifications; and
  driver means to provide said second voice signals to said telephone switch.

46. The cell station as defined in claim 32 including a test circuit comprising:
  first switching means to bypass said means in each of the said control circuits for processing voice signals, whereby the radio frequency communication paths for voice signals between said telephone switch and said control circuit may be tested.

47. The cell station as defined in claim 46 wherein said test circuit further comprises:
  means to introduce a test tone into said means in each of said control circuits for processing voice signals, said means to introduce a test tone being controlled by said telephone switch; and
  second switching means for creating a communication path within said control circuit for said test tone, whereby the means in each of said control circuits for processing voice signals is tested in response to direction from said telephone switch.

48. The cell station as defined in claim 47 wherein said test circuit further comprises:
   means to introduce a second test tone into said transceiver, said means to introduce a second test tone being controlled by said telephone switch; and
   third switching means to create a communications path within said transceiver for said second test tone, whereby the transceiver is tested in response to directions from said telephone switch.

49. The mobile telephone system of claim 1 wherein one of said mobile units comprises:
   a microphone for converting voice into unbalanced electrical voice signals;
   means electrically connected to said microphone for converting said unbalanced electrical voice signals into balanced electrical voice signals;
   a first and a second control unit, said first and second control units each having means for receiving and transmitting voice signals;
   first switching means for electrically connecting said first control unit to one of said unbalanced electrical voice signals and said balanced electrical voice signals; and
   second switching means for electrically connecting said second control unit to said balanced electrical voice signals when said first control unit is connected to said balanced electrical voice signals, whereby said second control unit can selectively receive voice signals received or transmitted by said first control unit.

50. The mobile telephone system of claim 1 wherein one of said mobile telephone units comprises:
   switching means to selectively deenergize said mobile telephone unit;
   a timer operatively connected to said switching means for delaying denergization until said timer indicates a predetermined time period has elapsed.

51. The mobile radio telephone system as defined in claim 1 wherein said control signal providing means of said mobile telephone units comprises:
   means for muting a voice signal being transmitted over one of said communication channels; and
   means to transmit digital data on the muted one of said communication channels, said digital data comprising information specifying a service to be provided by said central control station.

52. The mobile telephone system of claim 1 wherein one of said mobile telephone units comprises:
   computer means for processing control signals communicating with said control signal providing means and said control signal detecting means;
   memory in said computer means for storing a sequence of figures; and
   abort means for terminating said computer means processing unless said sequence of figures is input by one of said control signal providing means and said control signal detecting means.

53. The mobile telephone system as defined in claim 1 wherein said control signal providing means includes:
   processor means for controlling said control signal providing means,
   processor monitoring circuit for determining whether said processor means is operating normally; and
   restart circuit for restarting said processor means when said processor monitoring circuit determines said processor means is not operating normally.

54. The mobile telephone system as defined in claim 1 wherein said control signal providing means includes:
   signal tone generating means for providing a signal tone for indicating the status of said mobile telephone unit,
   said signal tone comprising an out-of-band signal; and
   said voice providing means includes:
   modulator means for combining said voice signal and said signal tone, whereby said transmitter transmits the combined signal to said cell station over one of said voice channels.

55. The mobile telephone system as defined in claim 1 wherein said power detection means includes:
   measuring means for measuring the strengths of the signals received from said cell stations,
   an analog to digital converter for converting the measurements of said strengths of the signals received to digital signals, and
   processor means for providing said digital signals to said control signal providing means, whereby said digital signals are transmitted to said cell stations over one of said communication channels.

* * * * *